US012794621B2

(12) United States Patent
Ma et al.

(10) Patent No.: US 12,794,621 B2
(45) Date of Patent: Nov. 10, 2026

(54) CONFIGURABLE TIMING ADVANCE COMMAND GRANULARITY

(71) Applicant: QUALCOMM Incorporated, San Diego, CA (US)

(72) Inventors: Liangping Ma, San Diego, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 803 days.

(21) Appl. No.: 18/170,486

(22) Filed: Feb. 16, 2023

(65) Prior Publication Data

US 2024/0283594 A1 Aug. 22, 2024

(51) Int. Cl.
*H04L 5/00* (2006.01)

(52) U.S. Cl.
CPC .................................. *H04L 5/0048* (2013.01)

(58) Field of Classification Search
CPC .................................................... H04L 5/0048
See application file for complete search history.

(56) References Cited

U.S. PATENT DOCUMENTS

2009/0238366 A1* 9/2009 Park .................. H04W 74/0833
2019/0053228 A1 2/2019 Akkarakaran et al.
2020/0322908 A1 10/2020 Prakash et al.
2021/0168749 A1* 6/2021 Turtinen ........... H04L 27/26025
2022/0400459 A1 12/2022 Turtinen et al.
2024/0292468 A1* 8/2024 Xu .................... H04W 56/0045
2025/0240825 A1* 7/2025 Manolakis ........... H04B 7/1851

FOREIGN PATENT DOCUMENTS

WO 2022077144 A1 4/2022
WO 2022078920 A1 4/2022

OTHER PUBLICATIONS

International Search Report and Written Opinion—PCT/US2024/014422—ISA/EPO—Jun. 18, 2024.
3GPP: "3rd Generation Partnership Project, Technical Specification Group Radio Access Network, NR, Medium Access Control (MAC) Protocol Specification (Release 17)", TS 38.321 V17.2.0, Sep. 2022, pp. 1-246, Section 6.2.1.
3GPP: "3rd Generation Partnership Project, Technical Specification Group Radio Access Network, NR, Requirements for Support of Radio Resource Management Release 17)", TS 38.133 V17.7.0, Sep. 2022, 993 Pages, Sections 7, 7.2C, 7.3 Including 7.3C and 13.5.

* cited by examiner

*Primary Examiner* — Ronald B Abelson
(74) *Attorney, Agent, or Firm* — Procopio, Cory, Hargreaves & Savitch LLP/QUALCOMM

(57) ABSTRACT

A user equipment (UE) may transmit a first message comprising a first indication associated with a timing advance command (TAC) granularity. A network node may receive the first message. The network node may transmit a second message comprising a TAC configuration associated with the TAC granularity based on the first indication. The network node may transmit the second message in response to receiving the first message. The UE may receive the second message. The network node may transmit a TAC. The UE may receive the TAC. The UE may transmit a third message based on the TAC configuration. The UE may transmit the third message in response to receiving the TAC. The network node may receive the third message. The network node may be a non-terrestrial network node, such as a satellite or a low-Earth orbit device.

30 Claims, 18 Drawing Sheets

900

CONFIGURABLE TIMING ADVANCE COMMAND GRANULARITY

INTRODUCTION

The present disclosure relates generally to communication systems, and more particularly, to a system that configures timing for transmissions between wireless devices.

Wireless communication systems are widely deployed to provide various telecommunication services such as telephony, video, data, messaging, and broadcasts. Typical wireless communication systems may employ multiple-access technologies that have the capability to support communication with multiple users by sharing available system resources. Non-limiting examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. A non-limiting example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method of wireless communication at a user equipment (UE) is provided. The method may include transmitting a first message including a first indication associated with a timing advance command (TAC) granularity. The method may include receiving a second message including a TAC configuration associated with the TAC granularity. The method may include transmitting a third message based on the TAC configuration.

In another aspect of the disclosure, an apparatus for wireless communication is provided. The apparatus may be a UE that includes a memory and at least one processor coupled to the memory. The at least one processor may be configured to transmit a first message including a first indication associated with a TAC granularity. The at least one processor may also be configured to receive a second message including a TAC configuration associated with the TAC granularity. The at least one processor may also be configured to transmit a third message based on the TAC configuration.

In another aspect of the disclosure, an apparatus for wireless communication at a UE is provided. The apparatus may include means for transmitting a first message including a first indication associated with a TAC granularity. The apparatus may include means for receiving a second message including a TAC configuration associated with the TAC granularity. The apparatus may include means for transmitting a third message based on the TAC configuration.

In another aspect of the disclosure, a non-transitory computer-readable storage medium storing computer executable code for wireless communication at a UE is provided. The code, when executed, may cause a processor to transmit a first message including a first indication associated with a TAC granularity. The code, when executed, may cause a processor to receive a second message including a TAC configuration associated with the TAC granularity. The code, when executed, may cause a processor to transmit a third message based on the TAC configuration.

In an aspect of the disclosure, a method, a computer-readable medium, and an apparatus are provided. The apparatus may include a UE. The apparatus may transmit a first message including a first indication associated with a TAC granularity. The apparatus may receive a second message including a TAC configuration associated with the TAC granularity. The apparatus may transmit a third message based on the TAC configuration.

In an aspect of the disclosure, a method of wireless communication at a network node is provided. The method may include receiving a first message including a first indication associated with a TAC granularity. The method may include transmitting second message including a TAC configuration associated with the TAC granularity based on the first indication. The method may include transmitting a TAC. The method may include receiving a third message based on the TAC configuration in response to receiving the TAC.

In another aspect of the disclosure, an apparatus for wireless communication is provided. The apparatus may be a network node that includes a memory and at least one processor coupled to the memory. The at least one processor may be configured to receive a first message including a first indication associated with a TAC granularity. The at least one processor may also be configured to transmit second message including a TAC configuration associated with the TAC granularity based on the first indication. The at least one processor may also be configured to transmit a TAC. The at least one processor may also be configured to receive a third message based on the TAC configuration in response to receiving the TAC.

In another aspect of the disclosure, an apparatus for wireless communication at a network node is provided. The apparatus may include means for receiving a first message including a first indication associated with a TAC granularity. The apparatus may include means for transmitting second message including a TAC configuration associated with the TAC granularity based on the first indication. The apparatus may include means for transmitting a TAC. The apparatus may include means for receiving a third message based on the TAC configuration in response to receiving the TAC.

In another aspect of the disclosure, a non-transitory computer-readable storage medium storing computer executable code for wireless communication at a UE is provided. The code, when executed, may cause a processor to receive a first message including a first indication associated with a TAC granularity. The code, when executed, may cause a processor to transmit second message including a TAC configuration associated with the TAC granularity based on the first indication. The code, when executed, may cause a processor to transmit a TAC. The code, when executed, may cause a processor to receive a third message based on the TAC configuration in response to receiving the TAC.

In an aspect of the disclosure, a method, a computer-readable medium, and an apparatus are provided. The network node may be a base station that communicates with a UE via a NTN node. The apparatus may receive a first message including a first indication associated with a TAC granularity. The apparatus may transmit second message including a TAC configuration associated with the TAC granularity based on the first indication. The apparatus may transmit a TAC. The apparatus may receive a third message based on the TAC configuration in response to receiving the TAC.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
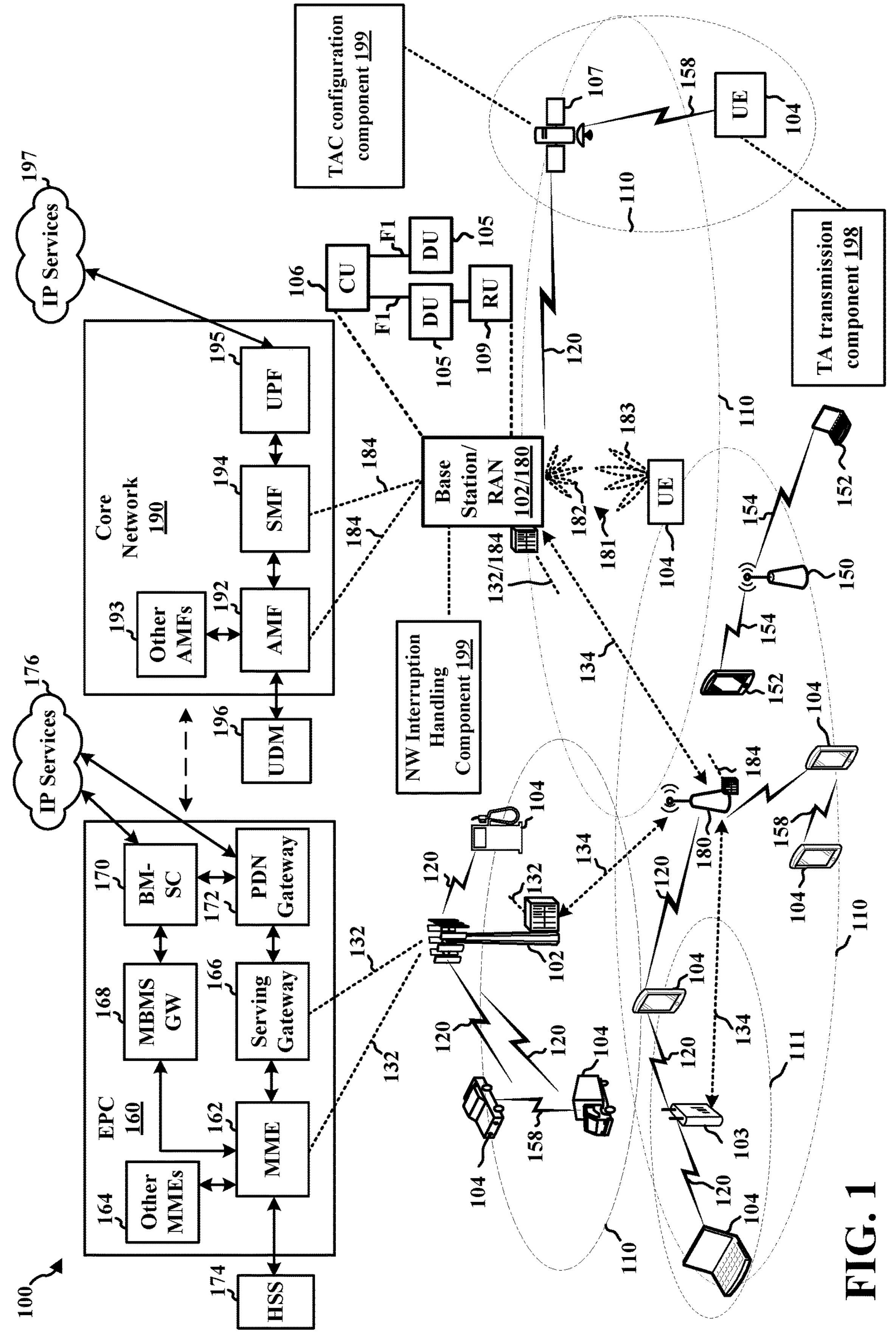
FIG. 1 is a diagram illustrating A non-limiting example of a wireless communications system and an access network (NW).

Some wireless communication may be between a terrestrial device, e.g., a device at or near ground level, and another device at a higher altitude, such as a non-terrestrial network node (NTN). As a non-limiting example, a UE may exchange communication with a network node having a high altitude (e.g., above 20 meters) relative to the UE, such as a geostationary earth orbit (GEO) device, a medium earth orbit (MEO) device, a low earth orbit (LEO) device, an airplane device, a balloon device, or an unmanned aerial vehicle (UAV) device. Some aspects more specifically relate to satellite-based communication with a UE. A non-limiting example may be via an NTN node.

In some aspects, a UE that communicates with another wireless device via a network node having a high altitude, such as an NTN node, may transmit uplink (UL) transmissions to the wireless device with a timing error. A timing error may be a difference between a time when a UE transmission is received by a wireless device (e.g., a symbol or a frame) of a transmission, and a time when the UE transmission is scheduled to be received by the wireless device. Such timing errors may cause a transmission of the UE to the wireless device to interfere with another transmission to the same wireless device if the actual start of a time period for the wireless device to receive the UE transmission is later than the scheduled start of the time period for the wireless device to receive the UE transmission (interfering with a later transmission to the wireless device) or if the actual start of the time period for the wireless device to receive the UE transmission is earlier than the scheduled start of the time period for the wireless device to receive the UE transmission (interfering with an earlier transmission to the wireless device). Such timing errors may occur when either the UE or the network node travel in an unexpected direction or at an unexpected differential speed, causing the transmission from the UE to the wireless device to be received in a shorter time period (i.e., earlier) or longer time period (i.e., later) than expected at the wireless device.

As a timing error increases, a chance that UL transmissions from the UE may interfere with other transmissions from other wireless devices (e.g., other UEs, other network nodes) to the same network node also increases. The network node may detect a timing error with a UE using a timing error threshold. A timing error threshold may be a timing error value that the network node uses to determine whether to request the UE to adjust its TA offset for transmissions to the network node. When the UE adjusts its TA offset, the UE reduces the timing error to zero by ensuring that the UE's transmission to the wireless device is received at the time when the UE transmission is scheduled to be received by the wireless device. The network node may transmit a timing advance command (TAC) to the UE in response to the timing error with the UE meeting or exceeding a timing error threshold. In response to receiving the TAC, the UE may adjust the timing of UL transmissions using a timing advance (TA) offset, also referred to as a TA. The UE may use the TA to align a transmission from the UE with the reception schedule at the network node and prevent interference with other transmissions to the network node that may share the same frequency band. While the UE may use a small TA if the UE is at a first distance from the network node, the UE may use a larger TA if the UE is at a second distance from the network node, where the first distance is smaller than the second distance.

In one aspect, a network node may be associated with a timing error limit, which may represent the maximum error range that the network node may tolerate before UL transmissions from the UE interfere with other transmissions to the network node. In other words, if the timing error exceeds the timing error limit in either direction (e.g., if the UE transmission is received earlier than it was scheduled to be received or is received later than it was scheduled to be received), UL transmissions from the UE may interfere with other transmissions to the network node. The network node may use a timing error threshold to minimize the likelihood of the timing error between the UE and the network node meeting or exceeding the timing error limit. As a non-limiting example, in response to the timing error exceeding the timing error threshold, the network node may transmit a timing advance command (TAC) to the UE. In response to receiving the TAC, the UE may adjust its TA to reduce the timing error between the UE and the network node to zero. The TAC may include an integer that the UE may use to calculate a new TA value. As a non-limiting example, the integer may indicate a difference between when the network node expected to receive a transmission from the UE, and when the network node received the transmission from the UE. The UE may multiply the integer included in the TAC by a TAC granularity value to calculate the time difference. Since the UE may calculate a time period indicated in a TAC based on an integer multiplied by the TAC granularity value, the TAC granularity value may be viewed as representing the smallest time difference that the network node may use to indicate a timing error to the UE. In other words, the smaller the TAC granularity value, the more accurate the length of the time period the network node may indicate to the UE via integers indicated in the TAC.

In some aspects, the size of the timing error threshold may be associated with the TAC granularity value. As a non-limiting example, in some aspects, the network node may set the value of its timing error threshold to be equal to the TAC granularity value. Thus, a large TAC granularity value may represent a large timing error threshold, and a small TAC granularity value may represent a small timing error threshold. If the timing error threshold is too high, the timing error between the network node and the UE may easily exceed the timing error limit, causing some of the UL transmissions from the UE to interfere with other transmissions to the network node. As a non-limiting example, if the timing error threshold is greater than the timing error limit, then the network node may transmit the TAC to the UE after the timing error has exceeded the timing error limit. Even if the timing error threshold is greater than half of the timing error limit, the network node may not transmit the TAC to the UE early enough for the UE to correct the timing error before the timing error exceeds the timing error limit. Moreover, since the TAC granularity value may represent the smallest time difference that the network node may use to indicate a timing error to the UE, the size of the TAC granularity value may be associated with the accuracy of the network node to indicate a timing error to the UE. Given a choice, the network node may select a TAC granularity value smaller than half of the timing error limit to allow for a greater margin of error when indicating a timing error to the UE. However, not all network nodes or UEs may be able to select more than one TAC granularity value to use to calculate a timing error, or to calculate a TA. Some UEs and network nodes may be configured to use one TAC granularity value-a default TAC granularity value. Other UEs and network nodes may be configured to use multiple TAC granularity values. If both a UE and a network node are configured to use any of a plurality of TAC granularity values, the network node may select an optimal TAC granularity value from the plurality of TAC granularity values for the UE and network node to use. In some aspects, a UE may request that the network node use a finer TAC granularity value, which may convey a preference of the UE for the network node to select a TAC granularity value that is smaller than the default TAC granularity value.

Aspects presented herein enable a network node and a UE to use different TAC granularity values based on support and/or conditions experienced by the UE. If the TAC granularity value is too large or too small, the TAC granularity value may negatively affect the performance of transmissions from the UE to the network node. In one aspect, a network node and a UE using a first TAC granularity may cause the timing error between the UE and the network node to exceed the timing error limit of the network node. As a non-limiting example, the TAC granularity value may exceed the timing error limit of the network node, and since the timing error threshold may be equal to the TAC granularity, the network node may not transmit a TAC until after the timing error exceeds the timing error limit. In another aspect, a network node and a UE using a second TAC granularity may waste resources at the UE, causing the UE to readjust its transmission timing more often than is optimal. As a non-limiting example, a third TAC granularity value larger than the second TAC granularity value may be small enough to ensure that the timing error between the UE and the network node does not exceed the timing error limit of the network node. However, the network node will transmit a TAC more often using the third TAC granularity value than using the second TAC granularity value where the TAC granularity value equals the timing error threshold. Thus, selecting the third TAC granularity value may be more optimal than selecting the second TAC granularity value, since selecting the third TAC granularity value ensures that the timing error between the UE and the network node does not exceed the timing error limit of the network node without transmitting a TAC to the UE as often as if the network node/UE selects the second TAC granularity value. The ability to select between different TAC granularities, e.g., as presented herein, improves communication between the UE and the network by allowing for a more dynamic TAC granularity to address individual requests of a UE.

A network node that has the capability to use a plurality of TAC granularity values may be configured to indicate to the UE has the capability to use a plurality of TAC granularity values. The UE may indicate to the network node its request for, and/or capability of, supporting one or more TAC granularity values other than a single TAC granularity value. As a non-limiting example, the UE may indicate to the network node a request for a subset of TAC granularity values from a set of TAC granularity values that the network node may have the capability to support. In another non-limiting example, the UE may indicate to the network node that the UE is capable of supporting more than one TAC granularity values. In response to the indication, the network node may configure the TAC granularity for the UE to ensure that the timing error between the UE and the network node does not meet or exceed the timing error limit of the network node, without wasting too many UE resources. The UE may then use the new TAC granularity configuration to calculate its TA.

In some aspects, a UE may transmit a first message including a first indication associated with a TAC granularity. A network node may receive the first message. The network node may transmit a second message including a TAC configuration associated with the TAC granularity based on the first indication. The network node may transmit the second message in response to receiving the first message. The UE may receive the second message. The network node may transmit a TAC. The UE may receive the TAC. The UE may transmit a third message based on the TAC configuration. The UE may transmit the third message in response to receiving the TAC. The network node may receive the third message.

Particular aspects of the subject matter described in this disclosure can be implemented to realize one or more of the following potential advantages. Aspects disclosed herein facilitate a UE and a network node to use a smaller or a larger TAC granularity depending upon the requests and/or capability of the UE and the network node, while ensuring that such wireless devices are also backward compatible. Such flexibility may be useful for a UE that communicates with an NTN node, as it may be optimal for the UE to use a larger TAC granularity if the UE is closer to the NTN node, and it may be optimal for the UE to use a smaller TAC granularity if the UE is further away from the NTN node. By optimizing the size of the TAC granularity, the network may maintain a low timing error between a UE and a network node, which may reduce the number of times the UE readjusts the timing of its TA offset (e.g., by performing a Global Navigation Satellite System (GNSS) fix). Readjusting the timing of the UE's TA offset may consume a lot of energy, so reducing the number of times the UE readjusts the timing of its TA offset may reduce power consumption particularly for low-power devices (e.g., Internet of things (IoT) devices).

Although the following description provides non-limiting examples directed to 5G NR, the concepts described herein may be applicable to other similar areas, such as 6G, 5G-advanced, LTE, LTE-A, CDMA, GSM, and/or other wireless technologies.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of a non-limiting example, an element, or any portion of an element, or any combination of elements may be implemented as a "processing system" that includes one or more processors. Non-limiting examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more non-limiting example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of a non-limiting example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some non-limiting examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. As a non-limiting example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some non-limiting examples may or may not be specifically directed to use cases or applications, a wide assortment of applicability of described non-limiting examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. As a non-limiting example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. As a non-limiting example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. As a non-limiting example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram illustrating A non-limiting example of a wireless communications system and an access network 100. The wireless communications system (also referred to as a wireless wide area network (WWAN)) includes base stations 102, UEs 104, an Evolved Packet Core (e.g., an EPC 160), and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station (e.g., one of the base stations 102 or one of base stations 180) may be referred to as a RAN and may include aggregated or disaggregated components. As a non-limiting example of a disaggregated RAN, a base station may include a central unit (CU) (e.g., a CU 106), one or more distributed units (DU) (e.g., a DU 105), and/or one or more remote units (RU) (e.g., an RU 109), as illustrated in FIG. 1. A RAN may be disaggregated with a split between the RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs may be connected via an F1 interface. A DU 105 and an RU 109 may be connected via a fronthaul interface. A connection between the CU 106 and a DU 105 may be referred to as a midhaul, and a connection between a DU 105 and the RU 109 may be referred to as a fronthaul. The connection between the CU 106 and the core network 190 may be referred to as the backhaul.

The RAN may be based on a functional split between various components of the RAN, e.g., between the CU 106, the DU 105, or the RU 109. The CU 106 may be configured to perform one or more aspects of a wireless communication protocol, e.g., handling one or more layers of a protocol stack, and the one or more DUs may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 106 may host higher layer functions, e.g., above the RLC layer, such as a service data adaptation protocol (SDAP) layer, a packet data convergence protocol (PDCP) layer, and/or an upper layer. In other implementations, the split between the layer functions provided by the CU, the DU, or the RU may be different.

The base stations 102 may wirelessly communicate with the UEs 104. Each of the base stations 102 may provide communication coverage for a respective geographic coverage area 110. There may be overlapping geographic coverage areas. As a non-limiting example, a small cell 103 may have a coverage area 111 that overlaps the respective geographic coverage area 110 of one or more base stations (e.g., one or more macro base stations, such as the base stations 102). A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE to a base station and/or downlink (DL) (also referred to as forward link) transmissions from a base station to a UE. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication links, such as a D2D communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as, as a non-limiting example, WiMedia, Bluetooth, ZigBee, Wi-Fi based on the Institute of Electrical and Electronics Engineers (IEEE) 902.11 standard, LTE, or NR.

The wireless communications system may further include a Wi-Fi access point (AP), such as an AP 150, in communication with Wi-Fi stations (STAs), such as STAs 152, via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 103 may operate in a licensed and/or an unlicensed frequency spectrum. When operating in an unlicensed frequency spectrum, the small cell 103 may employ NR and use the same unlicensed frequency spectrum (e.g., 5 GHZ, or the like) as used by the Wi-Fi AP 150. The small cell 103, employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. As a non-limiting example, three higher operating bands have been identified as frequency range designations FR2-2 (52.6 GHz-71 GHz), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station, whether a small cell 103 or a large cell (e.g., a macro base station), may include and/or be referred to as an eNB, gNodeB (gNB), or another type of base station. Some base stations, such as a gNB, may operate in a traditional sub 6 GHz spectrum, in millimeter wave frequencies, and/or near millimeter wave frequencies in communication with the UEs 104. When the gNB operates in millimeter wave or near millimeter wave frequencies, the base stations 180 may be referred to as a millimeter wave base station. A millimeter wave base station may utilize beamforming 181 with the UEs 104 to compensate for the path loss and short range. The base stations 180 and the UEs 104 may each include a plurality of antennas, such as antenna elements, antenna panels, and/or antenna arrays to facilitate the beamforming.

The base stations 180 may transmit a beamformed signal to the UEs 104 in one or more transmit directions 182. The UEs 104 may receive the beamformed signal from the base stations 180 in one or more receive directions 183. The UEs 104 may also transmit a beamformed signal to the base stations 180 in one or more transmit directions. The base stations 180 may receive the beamformed signal from the UEs 104 in one or more receive directions. The base stations 180/UEs 104 may perform beam training to determine the best receive and transmit directions for each of the base stations 180/UEs 104. The transmit and receive directions for the base stations 180 may or may not be the same. The transmit and receive directions for the UEs 104 may or may not be the same.

The EPC 160 may include a Mobility Management Entity (e.g., an MME 162), other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway (e.g., a PDN Gateway 172). The MME 162 may be in communication with a Home Subscriber Server (HSS) (e.g., an HSS 174). The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) (e.g., an AMF 192), other AMFs 193, a Session Management Function (SMF) 194, and a User Plane Function (UPF) (e.g., a UPF 195). The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base stations 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base stations 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN). The base stations 102 provide an access point to the EPC 160 or core network 190 for the UEs 104.

Non-limiting examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). An IoT device may be a device connected to a network, capable of wireless connection to other wireless device, such as routers, base stations, and other RF communication devices. The UEs may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device in communication with a network entity, such as one of the UEs 104 in communication with one of the base stations 102 or a component of a base station (e.g., a CU 106, a DU 105, and/or an RU 109), may be configured to manage one or more aspects of wireless communication. As a non-limiting example, the UEs 104 may have a timing advance (TA) transmission component 198 that may be configured to transmit a first message including a first indication associated with a timing advance command (TAC) granularity.

The TA transmission component 198 may be configured to receive a second message including a TAC configuration associated with the TAC granularity. The TA transmission component 198 may be configured to transmit a third message based on the TAC configuration.

In another configuration, a network entity, such as a satellite 107, one of the base stations 102, or a component of a base station (e.g., a CU 106, a DU 105, and/or an RU 109), may be configured to manage or more aspects of wireless communication. As a non-limiting example, one of the base stations 102 or the satellite 107 may have an TAC configuration component 199 that may be configured to receive a first message including a first indication associated with a TAC granularity. The TAC configuration component 199 may be configured to transmit second message including a TAC configuration associated with the TAC granularity based on the first indication. The TAC configuration component 199 may be configured to transmit a TAC. The TAC configuration component 199 may be configured to receive a third message based on the TAC configuration in response to receiving the TAC.

It should be understood that FIG. 1 does not convey altitudes for the satellite 107 with respect to the base station 102 and the UE 104. The satellite 107 may be located above both the UE 104 and the UE 102 in FIG. 1.

Aspects disclosed herein facilitate a network node to select a TAC granularity for a UE and the network node to use for transmissions from the UE to the network node. The UE may indicate a request for a subset of TAC granularity values that the network node may support. The TA transmission component 198 may indicate to the TAC configuration component 199 what types of TAC granularities the UE 204 may have the capability to use, which may be different than a default TAC granularity associated with the UE 204. The TAC configuration component 199 may then configure a TAC configuration for the UE 204 based on the TAC granularities associated with the UE 204. The UE 204 may then calculate its TA for transmissions to the base station 202 using the new TAC granularity when the UE 204 receives a TAC from the base station 202. This may maintain low timing errors at the UE 204 by leveraging TAC granularities that the UE 204 may have the capability to use.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. As a non-limiting example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. As a non-limiting example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
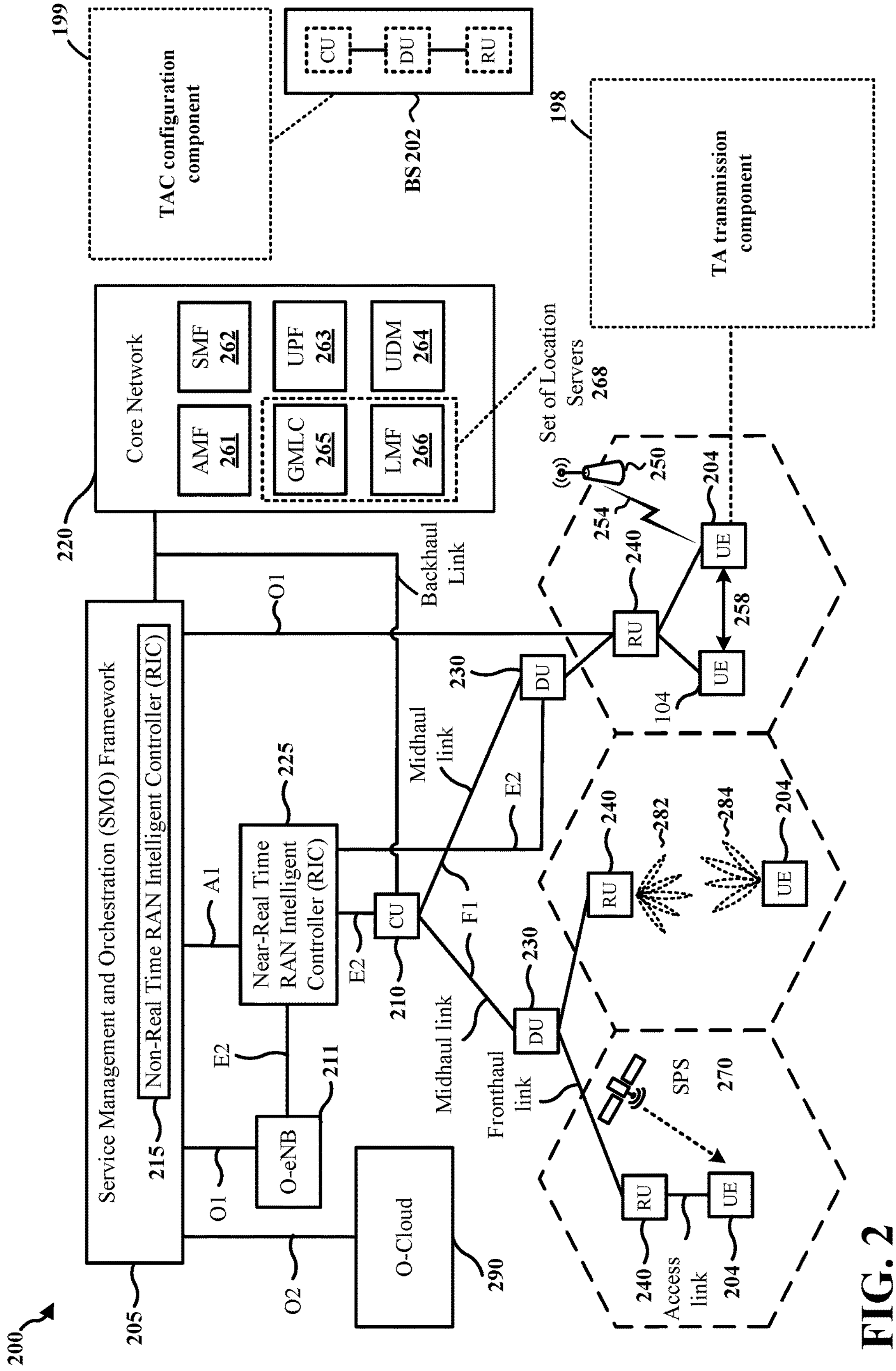
FIG. 2 is a diagram illustrating A non-limiting example of a wireless communications system and an access network.

As a non-limiting example, FIG. 2 shows a diagram 200 illustrating A non-limiting example of a wireless communications system and an access network with a base station that may be disaggregated. The illustrated wireless communications system includes a disaggregated base station architecture. The disaggregated base station architecture may include one or more of the CUs 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 204 via one or more radio frequency (RF) access links. In some implementations, the UE 204 may be simultaneously served by multiple RUs 240.

Each of the units, i.e., the CUS 210, the DUs 230, the RUs 240, as well as the Near-RT RICs 225, the Non-RT RICs 215, and the SMO Framework 205, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. As a non-limiting example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as an E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 204. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements that may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more of the CUS 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some non-limiting examples, the Non-RT RIC 215 or the Near-RT RIC 225 may be configured to tune RAN behavior or performance. As a non-limiting example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

At least one of the CU 210, the DU 230, and the RU 240 may be referred to as a base station 202. Accordingly, a base station 202 may include one or more of the CU 210, the DU 230, and the RU 240 (each component indicated with dotted lines to signify that each component may or may not be included in the base station 202). The base station 202 provides an access point to the core network 220 for a UE 204. The base station 202 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 240 and the UEs 204 may include uplink (UL) (also referred to as reverse link) transmissions from a UE 204 to an RU 240 and/or downlink (DL) (also referred to as forward link) transmissions from an RU 240 to a UE 204. The communication links may use multiple-input and multiple-output (MIMO) antenna technology, including spatial multiplexing, beamforming, and/or transmit diversity. The communication links may be through one or more carriers. The base station 202/UEs 204 may use spectrum up to Y MHz (e.g., 5, 10, 15, 20, 200, 500, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 204 may communicate with each other using device-to-device (D2D) communication link 258. The D2D communication link 258 may use the DL/UL wireless wide area network (WWAN) spectrum. The D2D communication link 258 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as, as a non-limiting example, Bluetooth, Wi-Fi based on the Institute of Electrical and Electronics Engineers (IEEE) 902.11 standard, LTE, or NR.

The wireless communications system may further include a Wi-Fi AP 250 in communication with UEs 204 (also referred to as Wi-Fi stations (STAs)) via communication link 254, e.g., in a 5 GHz unlicensed frequency spectrum or the like. When communicating in an unlicensed frequency spectrum, the UEs 204/AP 250 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (510 MHz-7.225 GHz) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-400 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.225 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. As a non-limiting example, three higher operating bands have been identified as frequency range designations FR2-2 (52.6 GHz-71 GHZ), FR4 (71 GHZ-214.25 GHZ), and FR5 (214.25 GHz-400 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 202 and the UE 204 may each include a plurality of antennas, such as antenna elements, antenna panels, and/or antenna arrays to facilitate beamforming. The base station 202 may transmit a beamformed signal 282 to the UE 204 in one or more transmit directions. The UE 204 may receive the beamformed signal from the base station 202 in one or more receive directions. The UE 204 may also transmit a beamformed signal 284 to the base station 202 in one or more transmit directions. The base station 202 may receive the beamformed signal from the UE 204 in one or more receive directions. The base station 202/UE 204 may perform beam training to determine the best receive and transmit directions for each of the base station 202/UE 204. The transmit and receive directions for the base station 202 may or may not be the same. The transmit and receive directions for the UE 204 may or may not be the same.

The base station 202 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 202 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 220 may include an Access and Mobility Management Function (AMF) 261, a Session Management Function (SMF) 262, a User Plane Function (UPF) 263, a Unified Data Management (UDM) 264, one or more location servers 268, and other functional entities. The AMF 261 is the control node that processes the signaling between the UEs 204 and the core network 220. The AMF 261 supports registration management, connection management, mobility management, and other functions. The SMF 262 supports session management and other functions. The UPF 263 supports packet routing, packet forwarding, and other functions. The UDM 264 supports the generation of authentication and key agreement (AKA) credentials, user identification handling, access authorization, and subscription management. The one or more location servers 268 are illustrated as including a Gateway Mobile Location Center (GMLC) 265 and a Location Management Function (LMF) 266. However, generally, the one or more location servers 268 may include one or more location/positioning servers, which may include one or more of the GMLC 265, the LMF 266, a position determination entity (PDE), a serving mobile location center (SMLC), a mobile positioning center (MPC), or the like. The GMLC 265 and the LMF 266 support UE location services. The GMLC 265 provides an interface for clients/applications (e.g., emergency services) for accessing UE positioning information. The LMF 266 receives measurements and assistance information from the NG-RAN and the UE 204 via the AMF 261 to compute the position of the UE 204. The NG-RAN may utilize one or more positioning methods in order to determine the position of the UE 204. Positioning the UE 204 may involve signal measurements, a position estimate, and an optional velocity computation based on the measurements. The signal measurements may be made by the UE 204 and/or the base station 202 serving the UE 204. The signals measured may be based on one or more of a satellite positioning system (SPS) 270 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Non-limiting examples of UEs 204 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 204 may be referred to as IoT devices (e.g., parking meter, gas pump, toaster, vehicles, heart monitor, etc.). The UE 204 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 2, in certain aspects, the UE 204 may have a TA transmission component 198 that may be configured to transmit a first message including a first indication associated with a TAC granularity. The TA transmission component 198 may be configured to receive a second message including a TAC configuration associated with the TAC granularity. The TA transmission component 198 may be configured to transmit a third message based on the TAC configuration. In certain aspects, the base station 202 may have a TAC configuration component 199 that may be configured to receive a first message including a first indication associated with a TAC granularity. The TAC configuration component 199 may be configured to transmit second message including a TAC configuration associated with the TAC granularity based on the first indication. The TAC configuration component 199 may be configured to transmit a TAC. The TAC configuration component 199 may be configured to receive a third message based on the TAC configuration in response to receiving the TAC. The TA transmission component 198 may indicate to the TAC configuration component 199 what types of TAC granularities the UE 204 may have the capability to use, which may be different than a default TAC granularity associated with the UE 204. The TAC configuration component 199 may then configure a TAC configuration for the UE 204 based on the TAC granularities associated with the UE 204. The UE 204 may then calculate its TA for transmissions to the base station 202 using the new TAC granularity when the UE 204 receives a TAC from the base station 202. This may maintain low timing errors at the UE 204 by leveraging TAC granularities that the UE 204 may have the capability to use.

Figures 3A, 3B, 3C, 3D:
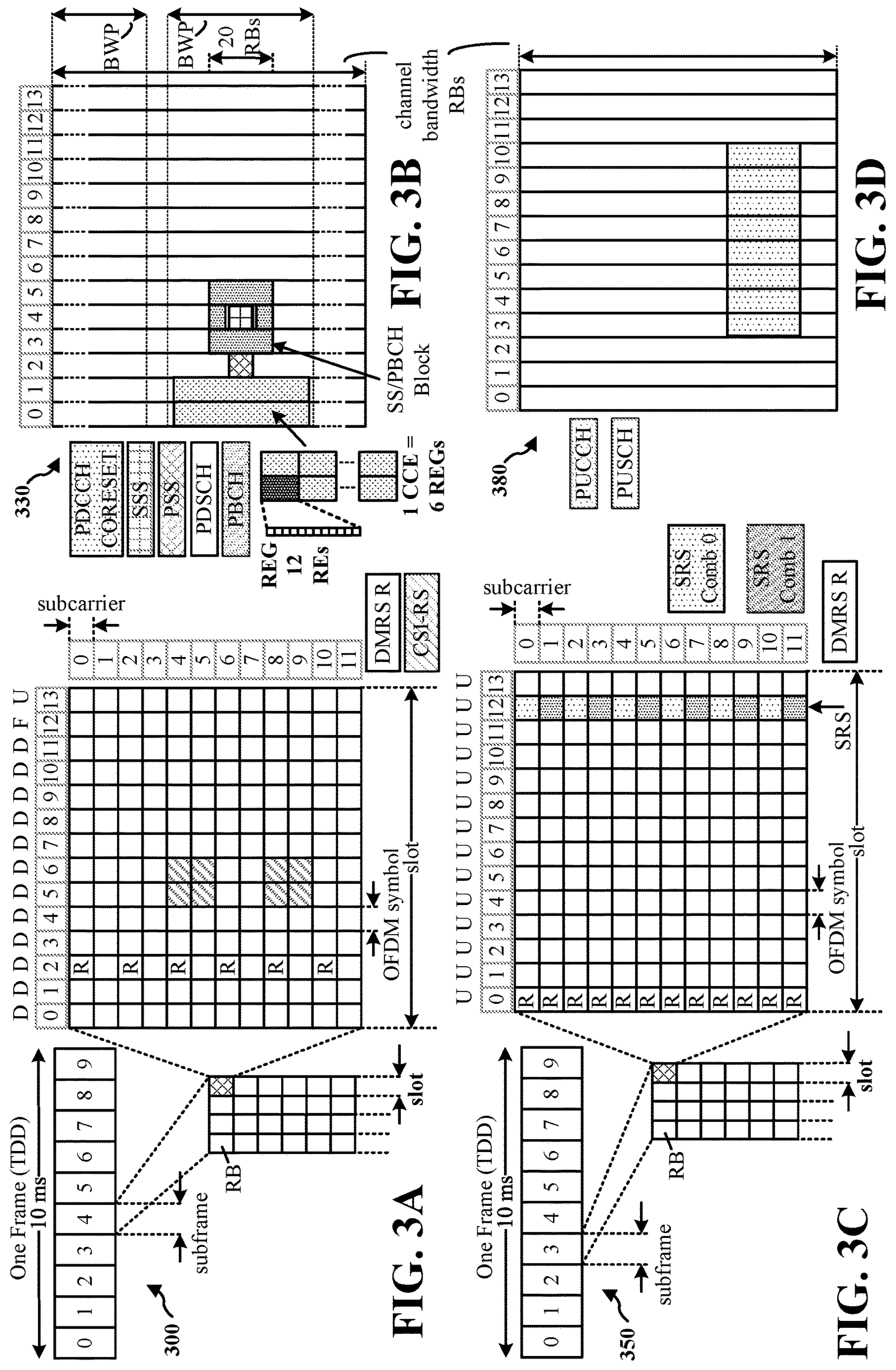
FIG. 3A is a diagram illustrating A non-limiting example of a first frame, in accordance with various aspects of the present disclosure.
FIG. 3B is a diagram illustrating A non-limiting example of downlink (DL) channels within a subframe, in accordance with various aspects of the present disclosure.
FIG. 3C is a diagram illustrating A non-limiting example of a second frame, in accordance with various aspects of the present disclosure.
FIG. 3D is a diagram illustrating A non-limiting example of uplink (UL) channels within a subframe, in accordance with various aspects of the present disclosure.

FIG. 3A is a diagram 300 illustrating A non-limiting example of a first subframe within a 5G NR frame structure. FIG. 3B is a diagram 330 illustrating A non-limiting example of DL channels within a 5G NR subframe. FIG. 3C is a diagram 350 illustrating A non-limiting example of a second subframe within a 5G NR frame structure. FIG. 3D is a diagram 380 illustrating A non-limiting example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the non-limiting examples provided by FIGS. 3A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 220 | Normal |
| 4 | 340 | Normal |
| 5 | 580 | Normal |
| 6 | 1060 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2\mu$*15 kHz, where $\mu$ is the numerology 0 to 4. As such, the numerology $\mu$=0 has a subcarrier spacing of 15 kHz and the numerology $\mu$=4 has a subcarrier spacing of 340 kHz. The symbol length/duration is inversely related to the subcarrier spacing. FIGS. 3A-3D provide A non-limiting example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates A non-limiting example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 204 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates A non-limiting example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
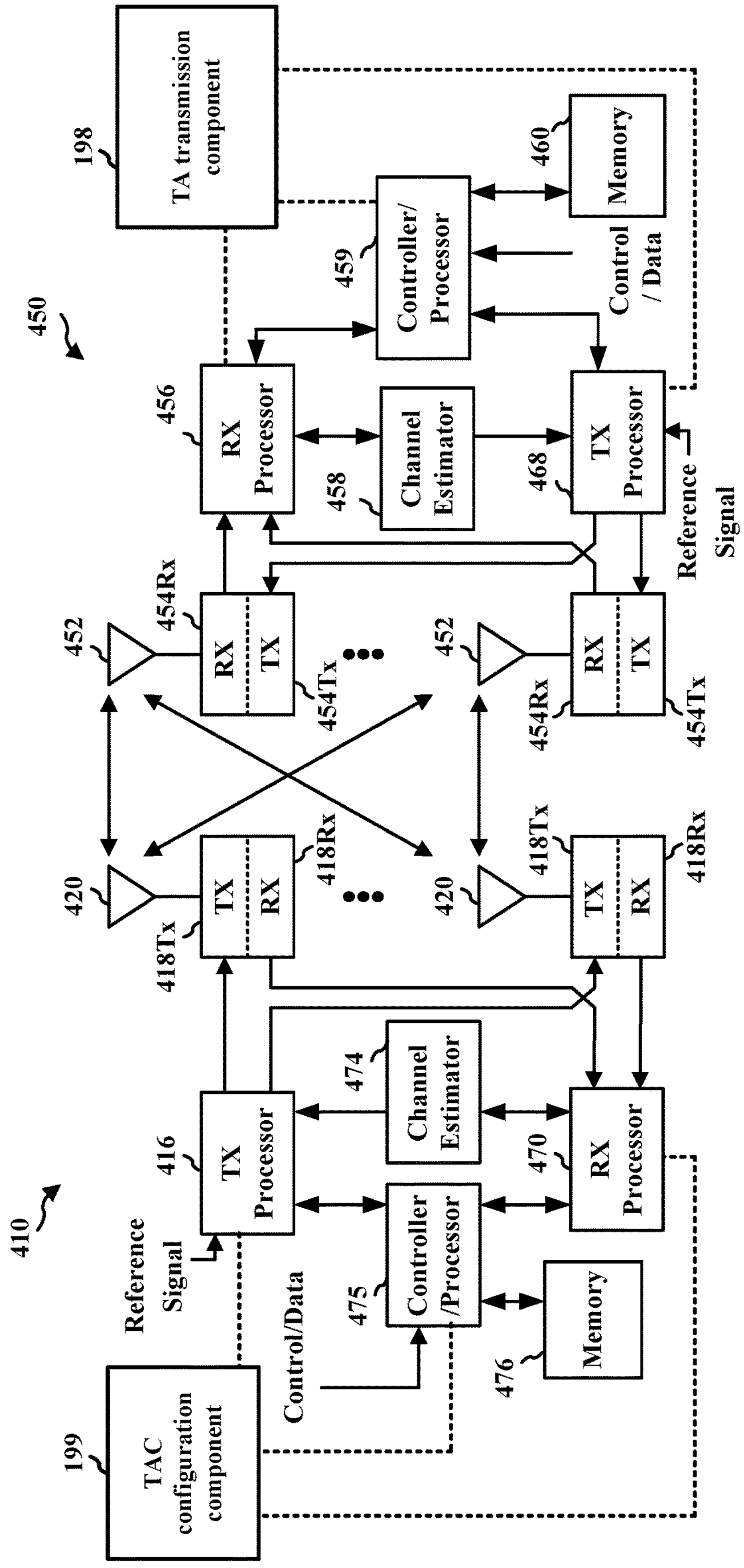
FIG. 4 is a diagram illustrating A non-limiting example of a base station and user equipment (UE) in an access network.

FIG. 4 is a block diagram of a base station 410 in communication with a UE 450 in an access network. In the DL, Internet protocol (IP) packets may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418Tx. Each transmitter 418Tx may modulate a radio frequency (RF) carrier with a respective spatial stream for transmission.

At the UE 450, each receiver 454Rx receives a signal through its respective antenna 452. Each receiver 454Rx recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454Tx. Each transmitter 454Tx may modulate an RF carrier with a respective spatial stream for transmission.

The UL transmission is processed at the base station 410 in a manner similar to that described in connection with the receiver function at the UE 450. Each receiver 418Rx receives a signal through its respective antenna 420. Each receiver 418Rx recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets. The controller/processor 475 is also responsible for error detection using an ACK and/or NACK protocol to support HARQ operations.

At least one of the TX processor 468, the RX processor 456, and the controller/processor 459 may be configured to perform aspects in connection with the TA transmission component 198 of FIG. 2.

At least one of the TX processor 416, the RX processor 470, and the controller/processor 475 may be configured to perform aspects in connection with the TAC configuration component 199 of FIG. 2.

Figure 5A:
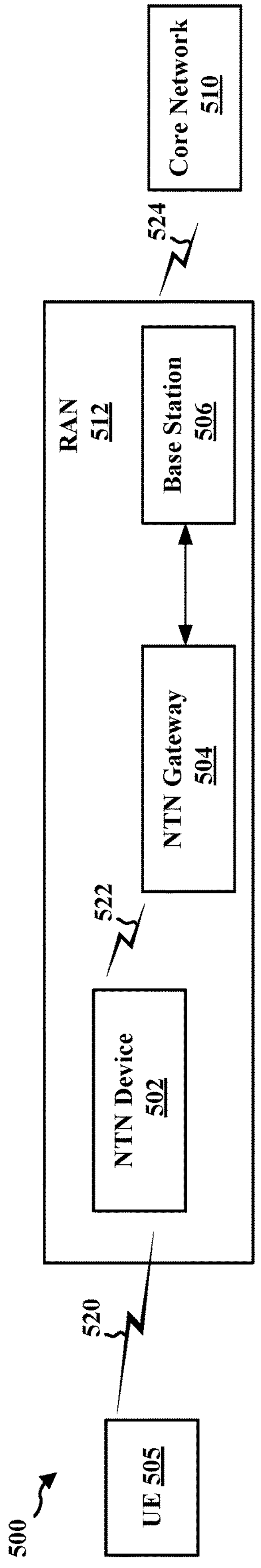
FIGS. 5A, 5B, and 5C illustrate non-limiting example aspects of a network architecture that supports communication via an NTN device, in accordance with various aspects of the present disclosure.

FIG. 5A illustrates A non-limiting example network architecture 500 that may have the capability to support NTN access, e.g., using 5G NR, as presented herein. Although the aspects are described using the non-limiting example of 5G NR, the concepts presented herein may also be applied for other types of core networks. FIG. 5A illustrates a network architecture with transparent payloads. While aspects of FIG. 5A illustrate a 5G-based network, similar network implementations and configurations may be used for other communication technologies, such as 3G, 5G LTE, etc.

The network architecture 500 of FIG. 5A includes a UE 505, an NTN device 502, an NTN gateway 504 (sometimes referred to as "gateways," "earth stations," or "ground stations"), and a base station 506 having the capability to communicate with the UE 505 via the NTN device 502. The NTN device 502, the NTN gateway 504, and the base station 506 may be part of a RAN 512 (e.g., an NG RAN). An NTN gateway may be a gateway to connect a public data network to a non-terrestrial network. An NTN gateway may support functions to forward a signal from an NTN device to a Uu interface, such as an NR-Uu interface. An NTN gateway may provide a transport network layer node, and may support transport protocols, such as acting as an IP router. In some aspects, a base station may include an NTN gateway. As a non-limiting example, the base station 102 may include an NTN gateway for communication with the satellite 107, or the satellite 107 may include an NTN gateway for communication with the base station 102. In some aspects, both the base station 102 and the satellite 107 may include components of an NTN gateway.

The base station 506 may be a network node that corresponds to the base station 202 in FIG. 2. The network architecture 500 is illustrated as further including a network device 510. In some aspects, the network device 510 may include a number of Fifth Generation (5G) networks including 5G Core Networks (5GCNs) and may correspond to the core network 220 described in connection with FIG. 2. The network device 510 may be public land mobile networks (PLMN). In some aspects, the core network may be 5GCNs.

Permitted connections in the network architecture 500 with transparent payloads illustrated in FIG. 5A, allow the base station 506 to access the NTN gateway 504 and the network device 510. In some non-limiting examples, the base station 506 may be shared by multiple PLMNs. Similarly, the NTN gateway 504 may be shared by more than one base station.

FIG. 5A provides a generalized illustration of various components, any or all of which may be utilized as appropriate, and each of which may be duplicated or omitted, as necessary. Specifically, although the non-limiting example of FIG. 5A includes one UE 505, it should be understood that many UEs (e.g., hundreds, thousands, millions, etc.) may utilize the network architecture 500. As a non-limiting example, a plurality of UEs may connect with the NTN device 502 via a plurality of service links similar to service link 520. Similarly, the network architecture 500 may include a larger (or smaller) number of NTN devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 is configured to communicate with the network device 510 via the NTN device 502, the NTN gateway 504, and the base station 506. As illustrated by the RAN 512, one or more RANs associated with the network device 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the network device 510 on behalf of the UE 505, e.g., using 5G NR.

The base station 506 may be referred to by other names such as a network entity, a gNB, a "satellite node", a satellite NodeB (sNB), "satellite access node", etc. The base station 506 may not be the same as terrestrial network gNBs, but may be based on a terrestrial network gNB with additional capability. As a non-limiting example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-geostationary (non-GEO) devices) and associated mobility of the UE 505. The base station 506 may assist in the handover (or transfer) of the NTN device 502 between different NTN gateways or different base stations. In some non-limiting examples, the base station 506 may be separate from the NTN gateway 504, e.g., as illustrated in the non-limiting example of FIG. 5A. In other non-limiting examples, the base station 506 may include or may be combined with one or more NTN gateways, e.g., using a split architecture. As a non-limiting example, with a split architecture, the base station 506 may include a Central Unit (CU), such as the non-limiting example CU 210 of FIG. 2, and the NTN gateway 504 may include or act as Distributed Unit (DU), such as the non-limiting example DU 230 of FIG. 2. The base station 506 may be fixed on the ground with transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502 may: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

Support of transparent payloads with the network architecture 500 shown in FIG. 5A may impact the communication system as follows. The network device 510 may treat a satellite RAT as a new type of RAT with longer delay, reduced bandwidth and/or higher error rate. Consequently, there may be some impact to PDU session establishment and mobility management (MM) and connection management (CM) procedures. The NTN device 502 may be shared with other services (e.g., satellite television, fixed Internet access) with 5G NR mobile access for UEs added in a transparent manner. This may enable legacy NTN devices to be used and may avoid deploying a new type of NTN device. The base station 506 may assist assignment and transfer of the NTN device 502 and radio cells between the base station 506 and the NTN gateway 504 and support handover of the UE 505 between radio cells, NTN devices, and other base stations. Thus, the base station 506 may differ from a terrestrial network gNB. Additionally, a coverage area of the base station 506 may be much larger than the coverage area of a terrestrial network base station.

In the illustrated non-limiting example of FIG. 5A, a service link 520 may facilitate communication between the UE 505 and the NTN device 502, a feeder link 522 may facilitate communication between the NTN device 502 and the NTN gateway 504, and an interface 524 may facilitate communication between the base station 506 and the network device 510. The service link 520 and the feeder link 522 may be implemented by a same radio interface (e.g., the NR-Uu interface). The interface 524 may be implemented by the NG interface.

Figure 5B:
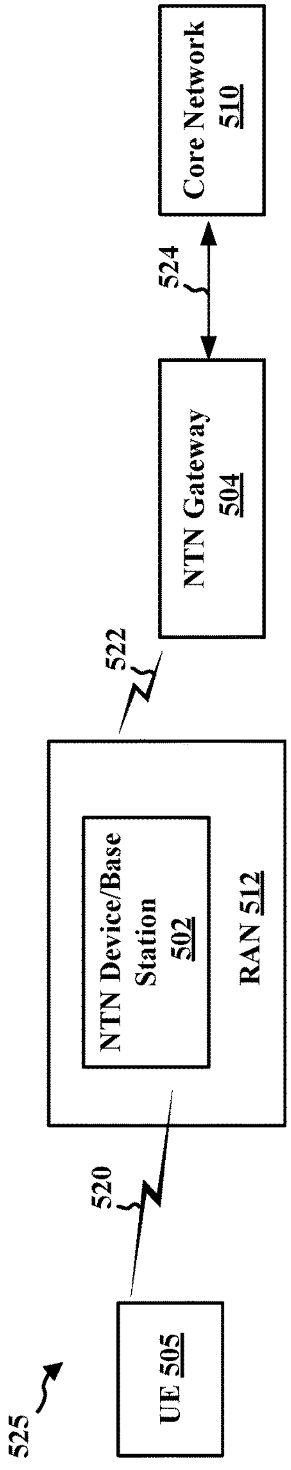

FIG. 5B shows a diagram of a network architecture 525 that may have the capability to support NTN access, e.g., using 5G NR, as presented herein. The network architecture 525 shown in FIG. 5B is similar to that shown in FIG. 5A, like designated elements being similar or the same. FIG. 5B, however, illustrates a network architecture with regenerative payloads, as opposed to transparent payloads shown in FIG. 5A. A regenerative payload, unlike a transparent payload, includes an on-board base station (e.g., includes the functional capability of a base station), and is referred to herein as an NTN device 502/base station. The on-board base station may be a network node that corresponds to the base station 202 in FIG. 2. The RAN 512 is illustrated as including the NTN device 502/base station. Reference to the NTN device 502/base station may refer to functions related to communication with the UE 505 and the network device 510 and/or to functions related to communication with the NTN gateway 504 and with the UE 505 at a physical radio frequency level.

An on-board base station may perform many of the same functions as the base station 506 as described previously. As a non-limiting example, the NTN device 502/base station may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device 502/base station may also support signaling connections and voice and data bearers to the UE 505 and may support handover of the UE 505 between different radio cells for the NTN device 502/base station and between or among different NTN device/base stations. The NTN device 502/base station may assist in the handover (or transfer) of the UE 505 between different NTN gateways and different control networks. The NTN device 502/base station may hide or obscure specific aspects of the NTN device 502/base station from the network device 510, e.g., by interfacing to the network device 510 in the same way or in a similar way to a terrestrial network base station. The NTN device 502/base station may further assist in sharing of the NTN device 502/base station. The NTN device 502/base station may communicate with one or more NTN gateways and with one or more core networks via the NTN gateway 504. In some aspects, the NTN device 502/base station may communicate directly with other NTN device/base stations using Inter-Satellite Links (ISLs), which may support an Xn interface between any pair of NTN device/base stations.

With NTN devices or satellites, the NTN device 502/base station may manage moving radio cells with coverage at different times. The NTN gateway 504 may be connected directly to the network device 510, as illustrated. The NTN gateway 504 may be shared by multiple core networks, as a non-limiting example, if NTN gateways are limited. In some non-limiting examples, the network device 510 may be aware of coverage area(s) of the NTN device 502/base station in order to page the UE 505 and to manage handover. Thus, as can be seen, the network architecture 525 with regenerative payloads may have more impact and complexity with respect to both the NTN device 502/base station and the network device 510 than the network architecture 500 including transparent payloads, as shown in FIG. 5A.

Support of regenerative payloads with the network architecture 525 shown in FIG. 5B may impact the network architecture 525 as follows. The network device 510 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 505). If fixed tracking areas and fixed cells are supported, the network device 510 may map any fixed tracking area to one or more NTN device/base stations with current radio coverage of the fixed tracking area when performing paging of the UE 505 that is located in this fixed tracking area. This could include configuration in the network device 510 of long term orbital data for the NTN device 502/base station (e.g., obtained from an operator of the NTN device 502/base station) and could add significant new impact to network device 510.

In the illustrated non-limiting example of FIG. 5B, a service link 520 may facilitate communication between the UE 505 and the NTN device 502/base station, a feeder link 522 may facilitate communication between the NTN device 502/base station and the NTN gateway 504, and an interface 524 may facilitate communication between the NTN gateway 504 and the network device 510. The service link 520 may be implemented by the NR-Uu interface. The feeder link 522 may be implemented by the NG interface over SRI. The interface 524 may be implemented by the NG interface.

Figure 5C:
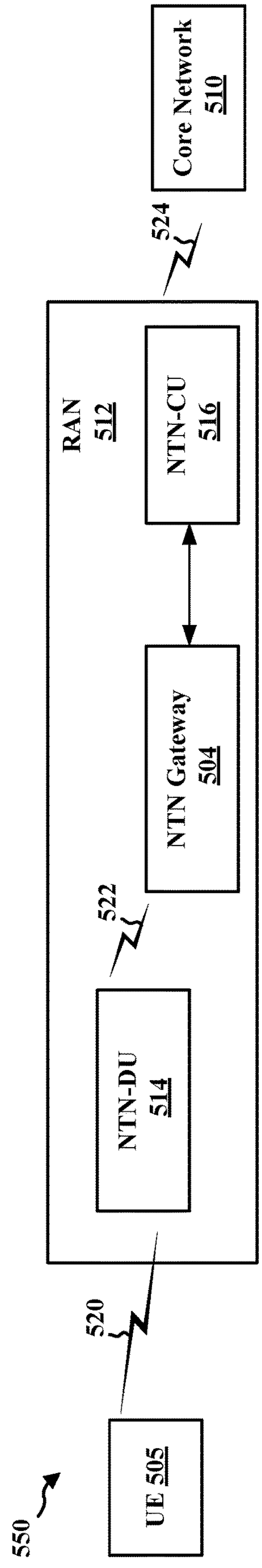

FIG. 5C shows a diagram of a network architecture 550 that may have the capability to support NTN access, e.g., using 5G NR, as presented herein. The network architecture shown in FIG. 5C is similar to that shown in FIGS. 5A and 5B, like designated elements being similar or the same. FIG. 5C, however, illustrates a network architecture with regenerative payloads, as opposed to transparent payloads, as shown in FIG. 5A, and with a split architecture for the base station. As a non-limiting example, the base station may be split between a Central Unit (CU), such as the CU 210 of FIG. 2, and a Distributed Unit (DU), such as the DU 230 of FIG. 2. In the illustrated non-limiting example of FIG. 5C, the network architecture 550 includes an NTN-CU 516, which may be a ground-based base station or a terrestrial base station. The regenerative payloads include an on-board base station DU, and is referred to herein as an NTN-DU 514. The NTN-CU 516 and the NTN-DU 514, collectively or individually, may correspond to the network node associated with the base station 202 in FIG. 2.

The NTN-DU 514 communicates with the NTN-CU 516 via the NTN gateway 504. The NTN-CU 516 together with the NTN-DU 514 perform functions, and may use internal communication protocols, which are similar to or the same as a gNB with a split architecture. In the non-limiting example, the NTN-DU 514 may correspond to and perform functions similar to or the same as a gNB Distributed Unit (gNB-DU), while the NTN-CU 516 may correspond to and perform functions similar to or the same as a gNB Central Unit (gNB-CU). However, the NTN-CU 516 and the NTN-DU 514 may each include additional capability to support the UE 505 access using NTN devices.

The NTN-DU 514 and the NTN-CU 516 may communicate with one another using an F1 Application Protocol (F1AP), and together may perform some or all of the same functions as the base station 506 or the NTN device 502/base station as described in connection with FIGS. 5B and 5C, respectively.

The NTN-DU 514 may terminate the radio interface and associated lower level radio interface protocols to the UE 505 and may transmit DL signals to the UE 505 and receive UL signals from the UE 505, which may include encoding and modulation of transmitted signals and demodulation and decoding of received signals. The operation of the NTN-DU 514 may be partly controlled by the NTN-CU 516. The NTN-DU 514 may support one or more NR radio cells for the UE 505. The NTN-CU 516 may also be split into separate control plane (CP) (NTN-CU-CP) and user plane (UP) (NTN-CU-UP) portions. The NTN-DU 514 and the NTN-CU 516 may communicate over an F1 interface to (a) support control plane signaling for the UE 505 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

The NTN-CU 516 may communicate with one or more other NTN-CUs and/or with one more other terrestrial base stations using terrestrial links to support an Xn interface between any pair of NTN-CUs and/or between the NTN-CU 516 and any terrestrial base station.

The NTN-DU 514 together with the NTN-CU 516 may: (i) support signaling connections and voice and data bearers to the UE 505; (ii) support handover of the UE 505 between different radio cells for the NTN-DU 514 and between different NTN-DUs; and (iii) assist in the handover (or transfer) of NTN devices between different NTN gateways or different core networks. The NTN-CU 516 may hide or obscure specific aspects of the NTN devices from the network device 510, e.g., by interfacing to the network device 510 in the same way or in a similar way to a terrestrial network base station.

In the network architecture 550 of FIG. 5C, the NTN-DU 514 that communicates with and is accessible from an NTN-CU may change over time with LEO devices. With the split base station architecture, the network device 510 may connect to NTN-CUs that are fixed and that do not change over time, which may reduce difficulty with paging of the UE 505. As a non-limiting example, the network device 510 may not know which NTN-DU is used for paging the UE 505. The network architecture with regenerative payloads with a split base station architecture may thereby reduce the network device 510 impact at the expense of additional impact to the NTN-CU 516.

Support of regenerative payloads with a split base station architecture, as shown in FIG. 5C, may impact the network architecture 550 as follows. The impact to the network device 510 may be limited as to the transparent payloads (e.g., the NTN device 502) discussed above. As a non-limiting example, the network device 510 may treat a satellite RAT in the network architecture 550 as a new type of RAT with longer delay, reduced bandwidth and/or higher error rate. The impact on the NTN-DU 514 may be less than the impact on NTN device/base stations (e.g., the NTN device 502/base station with a non-split architecture), as discussed above in reference to FIG. 5B. The NTN-DU 514 may manage changing association with different (fixed) NTN-CUs. Further, the NTN-DU 514 may manage radio beams and radio cells. The NTN-CU 516 impacts may be similar to the impact of the base station 506 for a network architecture with transparent payloads, as discussed above, except for extra impacts to manage changing associations with different NTN-DUs and reduced impacts to support radio cells and radio beams, which may be transferred to the NTN-DU 514. In some aspects, the NTN device may correspond to a high altitude platform system (HAPS) that serves one or more UEs on the ground.

One or more satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses an airborne or spaceborne vehicle for transmission. An airborne vehicle may refer to High Altitude Platforms (HAPs) including Unmanned Aircraft Systems (UAS).

An NTN may be configured to help to provide wireless communication in un-served or underserved areas to upgrade the performance of terrestrial networks. As a non-limiting example, a communication satellite may provide coverage to a larger geographic region than a TN base station. The NTN may also reinforce service reliability by providing service continuity for UEs or for moving platforms (e.g., passenger vehicles-aircraft, ships, high speed trains, buses). The NTN may also increase service availability, including critical communications. The NTN may also enable network scalability through the provision of efficient multicast/broadcast resources for data delivery towards the network edges or even directly to the user equipment.

Figure 6:
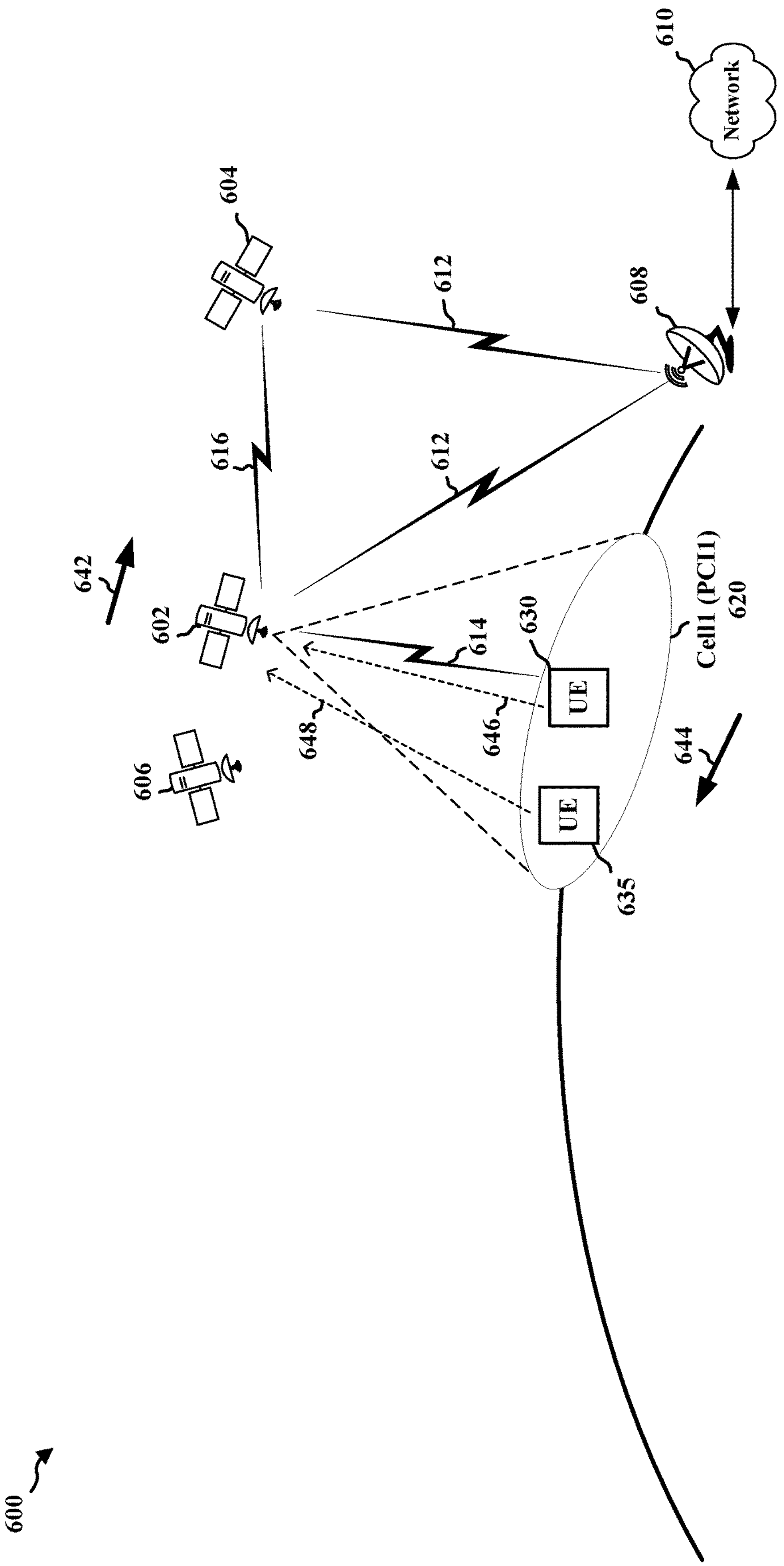
FIG. 6 illustrates A non-limiting example of an NTN configuration, in accordance with various aspects of the present disclosure.

FIG. 6 illustrates A non-limiting example of a configuration for an NTN 600. An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. As a non-limiting example, a communication satellite may include a GEO device that appears stationary with respect to the Earth. As such, a single GEO device may provide coverage to a geographic coverage area. In other non-limiting examples, a communication satellite may include a non-GEO device, such as a LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA), e.g., in altitudes typically between 8 and 50 km including High Altitude Platforms (HAPs).

In some aspects, the NTN 600 may include an NR-NTN. The non-limiting example of FIG. 6 provides that the NTN 600 may include an NTN device 602, an NTN device 604, an NTN device 606, an NTN gateway 608, a data network 610, and a UE 630 within a cell coverage of the NTN device 602. In some aspects, the UE 630 may include IoT devices, and the UE may be connected to the NTN 600 for wireless communication. The data network 610 may be any network capable of transmitting data with devices, such as a public data network, the access network 100 in FIG. 1, the core network 190 in FIG. 1, the core network 220 in FIG. 2, or the wireless communications system in FIG. 2.

The NTN gateway 608 may be one of one or more NTN gateways that may connect the NTN 600 to a public data network, as a non-limiting example, the data network 610. In some non-limiting examples, the NTN gateway 608 may support functions to forward a signal from the NTN device to a Uu interface, such as an NR-Uu interface. In other non-limiting examples, the NTN gateway 608 may provide a transport network layer node, and may support transport protocols, such as acting as an IP router. A satellite radio interface (SRI) may provide IP trunk connections between the NTN gateway 608 and the NTN device to transport NG or F1 interfaces, respectively. One or more NTN devices (e.g., which may be referred to herein as the NTN device 602, the NTN device 604, or the NTN device 606) may be fed by the NTN gateway 608, and the one or more NTN devices may be deployed across the satellite targeted coverage, which may correspond to regional coverage or even continental coverage. The NTN devices may include GEO devices or non-GEO devices, which may be served successively by one or more NTN gateways at a time, and the NTN 600 may be configured to provide service and feeder link continuity between the successive serving NTN gateways with time duration to perform mobility anchoring and handover.

The NTN device 602, including spaceborne vehicles or airborne vehicles, may communicate with the data network 610 through a feeder link 612 established between the NTN device 602 and the NTN gateway 608 in order to provide service to the UE 630 within the cell coverage, or a field-of-view of an NTN cell 620, of the NTN device 602 via a service link 614. The feeder link 612 may include a wireless link between an NTN gateway and an NTN device. The service link 614 may refer to a radio link between an NTN device (e.g., the NTN device 602) and the UE 630. As described in connection with FIG. 2, the NTN device 602 may use one or more directional beams, e.g., beamforming, to exchange communication with the UE 630. A beam may refer to a wireless communication beam generated by an antenna on-board an NTN device.

In some non-limiting examples, the UE 630 may communicate with the NTN device 602 via the service link 614. The NTN device 604 may relay the communication for the NTN device 602 through an inter-satellite link (ISL) 616, and the NTN device 604 may communicate with the data network 610 through the feeder link 612 established between the NTN device 604 and the NTN gateway 608. The ISL links may be provided between a constellation of satellites and may involve the use of transparent payloads on-board the NTN devices. The ISL may operate in an RF frequency or an optical band.

In the illustrated non-limiting example of FIG. 6, the NTN device 602 may provide the NTN cell 620 with a first physical cell ID (PCI) ("PCI1"). In one aspect, the NTN device 602 may be a GEO device that appears stationary with respect to the Earth. In such A non-limiting example, the NTN device 602 may not move in the direction 642 with respect to objects located on the surface of the Earth, such as the UE 630. In other aspects, a constellation of satellites may provide coverage to the NTN cell 620. As a non-limiting example, the NTN device 602 may include a non-GEO device that does not appear stationary with respect to the Earth. In such A non-limiting example, the NTN device 602 may move in the direction 642 with respect to objects located on the surface of the Earth, such as the UE 630, or the UE 630 may move in the direction 644 with respect to the NTN device 602. As such, a satellite constellation (e.g., one or more satellites) may be configured to provide coverage to the NTN cell 620. As a non-limiting example, the NTN device 602 and the NTN device 606 may be part of a satellite constellation that provides coverage to the NTN cell 620.

In some non-limiting examples, an NTN deployment may provide different services based on the type of payload on-board the NTN device. The type of payload may determine whether the NTN device acts as a relay node or a base station. As a non-limiting example, a transport payload may implement frequency conversion and an RF amplifier in both UL and DL directions and may correspond to an analog RF repeater. A transparent payload, as a non-limiting example, may receive UL signals from all served UEs and may redirect the combined signals DL to an earth station without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

Wireless communication between a UE and a base station may experience a propagation delay between the time that a UE transmits an uplink transmission and the time that the uplink transmission is expected to be received at the base station. This time difference may be referred to a timing error. In other words, a timing error may be a difference between a time when a UE transmission is received by a wireless device (e.g., a symbol or a frame) of a transmission, and a time when the UE transmission is scheduled to be received by the wireless device. Such timing errors may cause a transmission of the UE to the wireless device to interfere with another transmission to the same wireless device if the UE transmission is received later than when it is scheduled to be received (interfering with a later transmission to the wireless device) or if the UE transmission is received earlier than when it is scheduled to be received (interfering with an earlier transmission to the wireless device). Such timing errors may occur when either the UE or the network node travel in an unexpected direction or at an unexpected differential speed, causing the transmission from the UE to the wireless device to occur in a shorter or longer time period than expected. In some aspects, different UEs may experience different propagation delays, and that may cause time misalignment of the uplink transmissions from different UEs at the base station. Such misalignment, if large enough, may cause interferences among uplink transmissions, e.g., transmissions based on OFDM. The base station may provide the UE with a TAC that indicates for the UE to adjust the timing of uplink transmissions to compensate for the propagation delay. Thus, the network may use a TAC to control uplink signal transmission timing.

As a non-limiting example, the UE 630 may be located closer to the NTN device 602 than the UE 635. Since the UE 635 is located further from the NTN device 602 than the UE 630, the UE 635 may use a larger TA to transmit signals to the NTN device 602 than the UE 630. The UE 630 may use a smaller TA to transmit signals to the NTN device 602 than the UE 635. In other words, when the UE 630 transmits a signal 646 to the NTN device 602, the UE 630 may use a first TA, and when the UE 635 transmits a signal 648 to the NTN device 602, the UE 635 may use a second TA larger than the first TA. Since the signal 646 takes less time to travel to the NTN device 602 than the signal 648, the UE 630 may use a first TA smaller than the second TA when transmitting the signal 646 to ensure that the signal 646 does not interfere with the signal 648. Since the signal 648 takes more time to travel to the NTN device 602 than the signal 646, the UE 635 may use a second TA larger than the first TA when transmitting the signal 648 to ensure that the signal 648 does not interfere with the signal 646

Figure 7C:
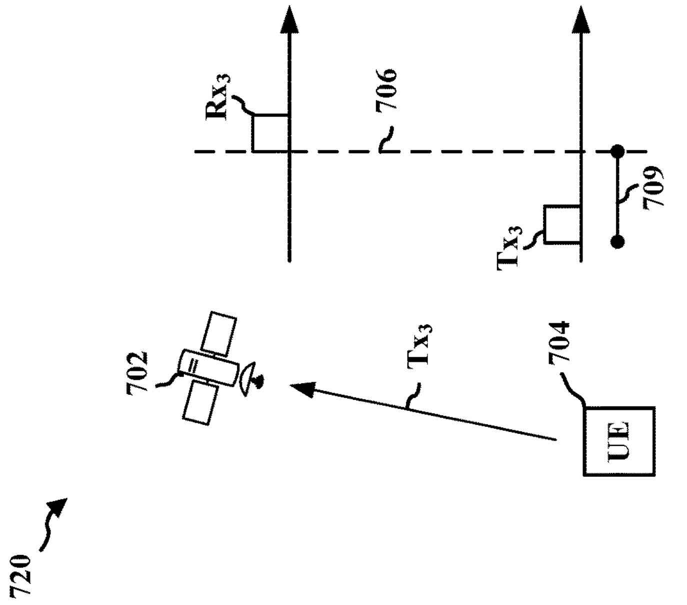
FIG. 7C illustrates A non-limiting example of a UE transmitting a signal to an NTN device after updating its timing advance (TA) offset, in accordance with various aspects of the present disclosure.
Figure 7B:
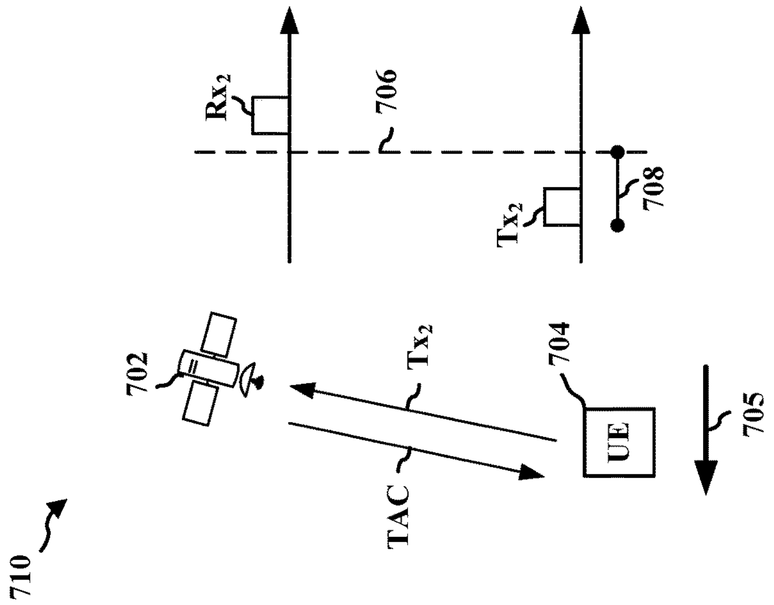
FIG. 7B illustrates A non-limiting example of a UE transmitting a signal to an NTN device after moving in a direction relative to the NTN device, triggering a timing advance command (TAC), in accordance with various aspects of the present disclosure.
Figure 7A:
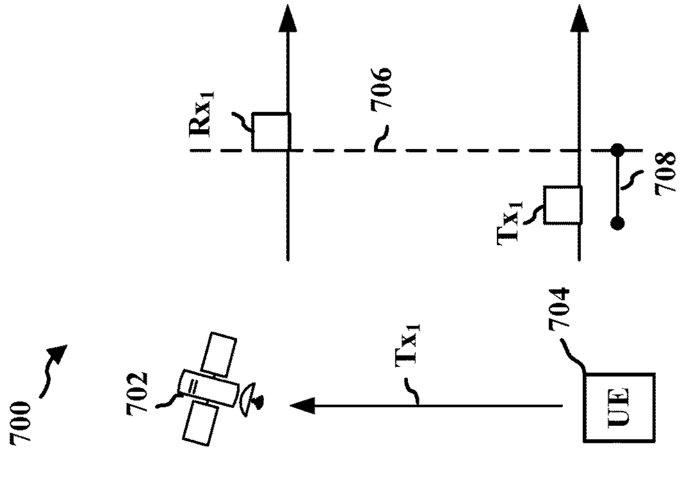
FIG. 7A illustrates A non-limiting example of a UE transmitting a signal to an NTN device, in accordance with various aspects of the present disclosure.

FIG. 7A is a diagram 700 illustrating a UE 704 that transmits a transmission $Tx_1$ to the NTN device 702. The NTN device 702 may be, as a non-limiting example, a GEO device, an MEO device, an LEO device, an airplane device, a balloon device, or a UAV device. The UE 704 may communicate with another wireless device, such as a base station or another UE, via the NTN device 702. The UE 704 may transmit the signal $Tx_1$ to the NTN device 702 using a TA 708 (also referred to as a TA offset). By transmitting the signal $Tx_1$ to the NTN device 702 using the TA 708, the UE 704 ensures that the signal $Tx_1$ is received at the NTN device 702 as the signal $Rx_1$ at the expected time 706.

FIG. 7B is a diagram 710 illustrating the UE 704 and the NTN device 702 of FIG. 7A, where the UE 704 may have moved relative to the NTN device 702 in a direction 705. The move in the direction 705 may have been an unexpected move from the perspective of the NTN device 702. As a non-limiting example, the UE 704 may have accelerated to a higher speed on a freeway without first notifying the NTN device 702, or the UE 704 may have moved from a parked state to a moving state without first notifying the NTN device 702. The distance between the UE 704 and the NTN device 702 in FIG. 7B may be greater than the distance between the UE 704 and the NTN device 702 in FIG. 7A as a result of the movement of the UE 704 in the direction 705 relative to the NTN device 702.

The UE 704 may transmit the signal $Tx_2$ to the NTN device 702 using the TA 708. However, since the distance between the UE 704 and the NTN device 702 in FIG. 7B is greater than the distance between the UE 704 and the NTN device 702 in FIG. 7A, the TA 708 may not be large enough to ensure that the signal $Tx_2$ is received at the NTN device 702 as the signal $Rx_2$ at the expected time 706. As a result, the NTN device 702 may receive the signal $Rx_2$ after the expected time 706. The NTN device 702 may determine that the time between when the NTN device 702 received the signal $Rx_2$ and the expected time 706 is greater than a timing error threshold, and in response may transmit a TAC to the UE 704 indicating the difference between the time between when the NTN device 702 received the signal $Rx_2$ and the expected time 706. The TAC may include an integer that the UE 704 may multiply against a TAC granularity to determine the value of the time period indicated by the NTN device 702.

FIG. 7C is a diagram 720 illustrating the UE 704 and the NTN device 702 of FIG. 7B after the UE 704 receives the TAC from the NTN device 702. The UE 704 may update its TA using the TAC received from the NTN device 702. The UE 704 may use the TA 709 to transmit signals to the NTN device 702 instead of the UE 704 after receiving the TAC from the NTN device 702.

The UE 704 may transmit the signal $Tx_3$ to the NTN device 702. The UE 704 may transmit the signal $Tx_3$ to the NTN device 702 using the TA 709 calculated based on the TAC received from the NTN device 702. By transmitting the signal $Tx_3$ to the NTN device 702 using the TA 709, the UE 704 may ensure that the signal $Tx_3$ is received at the NTN device 702 as the signal $Rx_3$ at the expected time 706.

The NTN device 702 in FIG. 7B may measure the time difference between uplink reception of the signal $Rx_2$ and the expected time 706 and may send a TAC to the UE 704 to change the timing of the UE 704's uplink transmission in FIG. 7C to provide for reception at the NTN device 702 that is better aligned with the timing at the network side. As a non-limiting example, since the signal $Rx_2$ arrived at the NTN device 702 too late (i.e., after the expected time 706 greater than a timing error threshold value), the NTN device 702 may indicate for the UE 704 to transmit its signals earlier by an indicated amount. In contrast, if the signal $Rx_2$ arrived at the NTN device 702 too early (i.e., before the expected time 706 greater than a timing error threshold value), the NTN device 702 may indicate for the UE 704 to transmit its signals earlier by an indicated amount.

Each of the signals $Tx_1$ in FIG. 7A, $Tx_2$ in FIG. 7B, and $Tx_3$ in FIG. 7C may be transmitted according to a schedule. As a non-limiting example, the signals may include PUSCH, PUCCH, or SRS transmissions.

The total timing advance ($T_{TA}$, or transmission timing advance) applied by a UE, such as the UE 704 in FIGS. 7A-7C, communicating with an NTN, such as via the NTN device 702 in FIGS. 7A-7C, may be based on:

$$T_{TA} = (N_{TA} + N_{TA,UE\text{-}specific} + N_{TA,common} + N_{TA,offset}) \times T_C.$$

When referring to a TA used by a UE to transmit a signal, such as the TA 708 in FIG. 7A used by the UE 704 to transmit the signal $Tx_1$ or the TA 709 in FIG. 7C used by the UE 704 to transmit the signal $Tx_3$, the TA refers to the $T_{TA}$, which may be calculated as $(N_{TA}+N_{TA,UE\text{-}specific}+N_{TA,common}+N_{TA,offset})\times T_C$. In some aspects, $+N_{TA,UE\text{-}specific}$ may be referred to as $$N_{TA,adj}^{UE}.$$

In some embodiments, $N_{TA,common}$ may be referred to as $$N_{TA,adj}^{common}.$$

$N_{TA}$ may include a cumulative timing advance value based on an accumulation of TA commands from the network. $N_{TA}$ may equal 0 for a PRACH transmission and may be updated based on a TAC field in random access msg2/msgB and/or in a MAC-CE TA command. The network-provided timing advance may be referred to as a closed-loop timing advance. A network entity may provide an $N_{TA}$ value to a UE via an NTN device, such as the base station 102 to the UE 104 via satellite 107 of FIG. 1, or base station 506 to the UE 630 via NTN gateway 608.

$N_{TA,UE\text{-}specific}$ may include a UE self-estimated timing advance amount that pre-compensates for a service link delay (e.g., a propagation delay between the UE 704 and the NTN device 702 in FIG. 7B). A non-limiting example service link 614 is illustrated in FIG. 6. The UE may estimate this TA based on its location (e.g., obtained using a global navigation satellite system (GNSS)) relative to an NTN device (e.g. a satellite) of an NTN. In other words, the UE may estimate this TA based on an estimate of the service link distance and an estimate of the feeder link distance. A satellite location may be provided by an ephemeris. Such a TA calculated by the UE may be referred to as an open-loop timing advance. A UE may calculate its $N_{TA,UE\text{-}specific}$ value without first performing a GNSS fix, which may result in an estimated $N_{TA,UE\text{-}specific}$ value having a timing error based on the last known location of the UE instead of a present location of the UE.

As a non-limiting example, with respect to FIG. 7B, in some aspects, the NTN device 702 may determine that the time between when the NTN device 702 received the signal $Rx_2$ and the expected time 706 is less than a timing error threshold. In such an aspect, the NTN device 702 may not transmit the TAC to the UE 704, so the UE 704 may not know the difference between the time between when the NTN device 702 received the signal $Rx_2$ and the expected time 706. However, the UE 704 may perform a GNSS fix to determine that its location has moved since the time the last time the UE 704 received a TAC from the NTN device 702. The UE 704 may then calculate $N_{TA,UE\text{-}specific}$ to compensate for its new location, increasing the TA to a time longer than the TA 708 used in FIG. 7A.

$N_{TA,common}$ may include a network-controlled common TA, and may include a timing offset considered necessary by the network. This common TA may be based on a delay at a feeder link, e.g., between a satellite and base station. FIG. 6 illustrates A non-limiting example of a feeder link 612. In some aspects, the common TA may be zero. An $N_{TA,common}$ value may also be referred to as an open-loop timing advance together with the $N_{TA,UE\text{-}specific}$ value. A network entity may provide an $N_{TA,common}$ value to a UE via an NTN device, such as the base station 102 to the UE 104 via the satellite 107 of FIG. 1, or NTN gateway 608 to the UE 630 via NTN device 602. In some aspects, $N_{TA,common}$ may be computed by the UE based on a model constructed by the UE using one or more parameters (e.g., coefficients in a Taylor series) signaled by the network. In some aspects, the signaling of the parameters may be via system information.

$N_{TA}$ offset may include a fixed offset used to calculate the timing advance. In some aspects, $N_{TA,offset}$ may be used to ensure coexistence with LTE. A network entity may provide an $N_{TA,offset}$ value to a UE via an NTN device, such as the base station 102 to the UE 104 via the satellite 107 of FIG. 1, or NTN gateway 608 to the UE 630 via NTN device 602.

$T_C$ may equal 1/(480000×4096) seconds.

A UE may apply the TA in an idle RRC state (e.g., an "RRC_IDLE" state), an inactive RRC state (e.g., an "RRC_INACTIVE" state), or in an RRC connected state (e.g., an "RRC_CONNECTED" state). A UE may be in a connected state (e.g., an "RRC_CONNECTED" state) or an inactive state (e.g., an "RRC_INACTIVE" state) when the UE has established an RRC connection with a base station. If an RRC connection has not been established, the UE is in an idle state (e.g., an "RRC_IDLE" state). While in the idle state, the UE and the base station may establish an RRC connection and the UE may transition to the connected state. While in the connected state, the UE and/or base station may release the RRC connection and the UE may transition to the idle state. In other non-limiting examples, while in the connected state, the UE and/or the base station may release with suspend the RRC connection and the UE may transition to the inactive state. While in the inactive state, the UE and/or the base station may resume the RRC connection and the UE may transition to the connected state. In other non-limiting examples, while in the inactive state, the UE and/or the base station may release the RRC connection and the UE may transition to the idle state.

In some aspects, the TAC from the network may become outdated, e.g., based on the amount of time since the TAC was received by the UE. In other words, the open-loop component of the calculated TA may be calculated frequency by the UE, but the closed-loop component of the calculated TA may be calculated when the network transmits a TAC. In some aspects, the timing advance calculation may lead to a double adaptation in which a propagation delay is addressed by both the network controlled TA (e.g., the accumulated TA based on the TA commands from the network, $N_{TA}$) that attempts to mitigate the UE's use of a prior GNSS fix, which becomes duplicative when the UE performs a new GNSS fix and updates the self-estimated timing advance value $N_{TA,UE\text{-}specific}$. Double adaption may be also called double correction.

Figure 8:
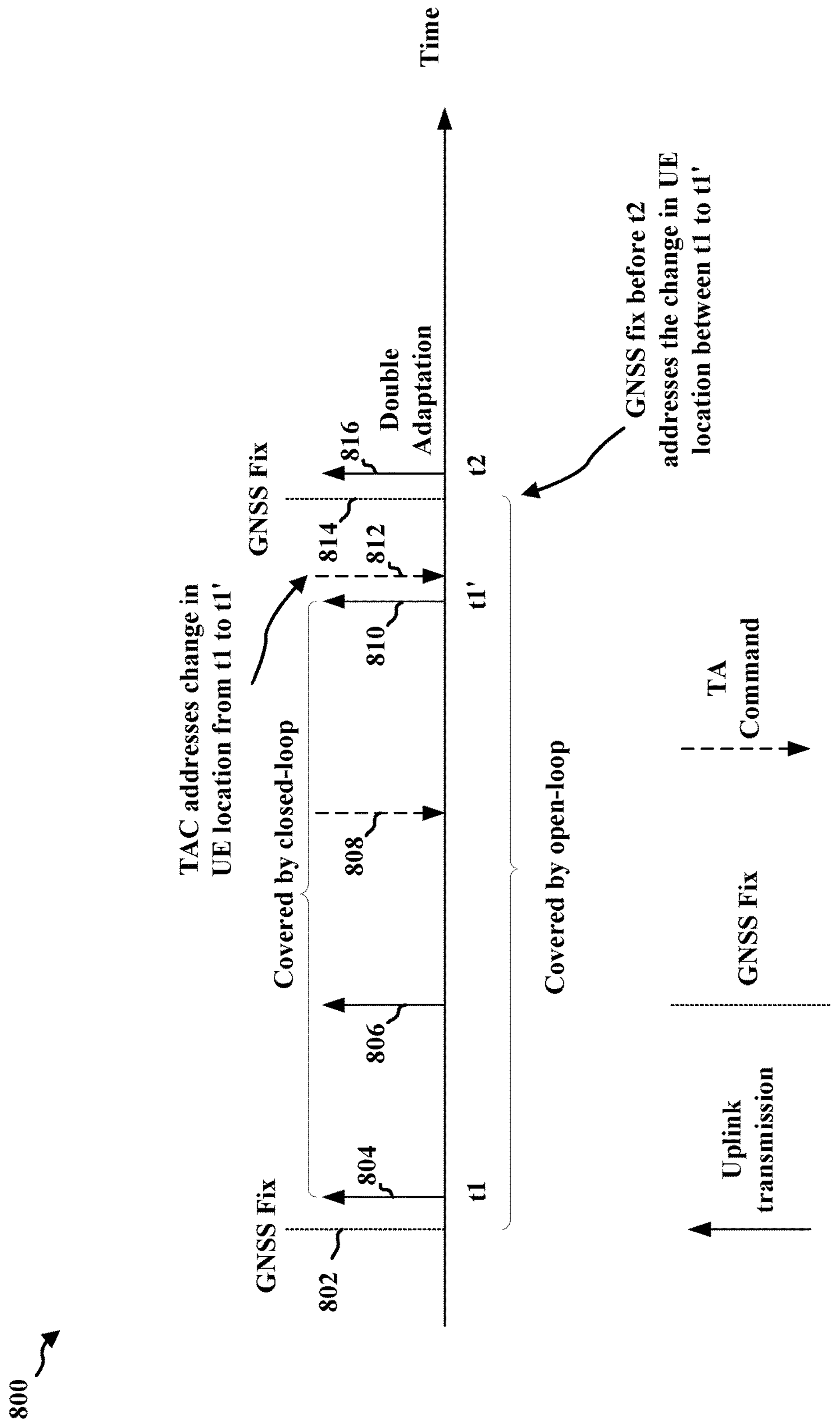
FIG. 8 illustrates a timing diagram illustrating non-limiting example aspects of timing advance calculation in accordance with aspects presented herein.

FIG. 8 illustrates a time diagram 800 that shows A non-limiting example of a double adaptation for a timing advance. The UE may be configured to perform a GNSS fix 802 and use the GNSS location reading resulting from the GNSS fix and the GNSS satellite location to determine $N_{TA,UE\text{-}specific}$. The UE transmits an uplink transmission 804 at time t1 and uplink transmission 806 at time t1' based, at least in part, on the $N_{TA,UE\text{-}specific}$ for the GNSS fix 802. The uplink transmissions 804 and 806 may also have a timing advance based on accumulated timing advance commands (e.g., $N_{TA}$), $N_{TA,Common}$, and/or $N_{TA,Offset}$. The network provides a timing advance commands 808 and 812, based on the UE's prior transmissions. As a non-limiting example, the timing advance command 808 and/or 812 may be based on a propagation delay observed for uplink transmissions 804, 806, or 810 that are based on the GNSS fix 802. Thus, the timing advance commands 808 or 812 may address the movement of the UE relative to the satellite after the GNSS fix 802. The UE applies an accumulation of the timing advance commands 808, 812, etc. when transmitting uplink transmissions. As a non-limiting example, the uplink transmissions 804 and 806 may have a first value $N_{TA1}$, and the uplink transmission 810 may have an accumulated value $N_{TA1}$+timing advance command 808. The uplink transmission 816 may have an accumulated value $N_{TA1}$+timing advance command 808+timing advance command 812. The closed-loop timing advance based on the accumulated timing advance commands from the network provides a timing advance that addresses the movement of the UE relative to the satellite between GNSS fixes. The UE performs another GNSS fix 814, and updates the self-estimated timing advance (e.g., open-loop timing advance value) $N_{TA,UE\text{-}specific}$ based on the UE's location relative to the satellite based on the GNSS fix 814. Thus, the self-estimated timing advance $N_{TA,UE\text{-}specific}$ also addresses the UE's movement between the GNSS fix 802 and the GNSS fix 814. The addition of the accumulated ($N_{TA}+N_{TA,UE\text{-}specific}$) provides for a double adaptation (which may be also called double correction) based on the UE's movement relative to the satellite. As time t2, when the uplink transmission 816 is transmitted, is close to time t1' when the uplink transmission 810 is transmitted and to the GNSS fix, the self-estimated timing advance ($N_{TA,UE\text{-}specific}$) based on the GNSS fix 814 captures the change in location between t1 and t1' in addition to the timing advance commands 808, 812 from the network that address the change in location.

An NTN deployment may be associated with long delays (e.g., a long latency and/or a long RTT) relative to a terrestrial network due at least in part to the long distance between the UE and the NTN node. Furthermore, the delay in a transparent satellite deployment (e.g., a satellite that uses a transparent repeater that re-directs a signal from a UE to a wireless receiver without demodulating the signal) may exceed the delay in a regenerative satellite deployment (e.g., a satellite that uses a regenerative repeater that demodulates a signal from a UE to a wireless receiver and re-modulates the signal for transmission to the wireless receiver) because any communication between the UE and a base station or gateway may travel from the UE to the NTN node over a service link and then from the NTN node to the base station or gateway over a feeder link, where both the service link and the feeder link may be associated with a longer delay than a terrestrial network. Accordingly, in an NTN, a UE may generally apply a TA to an uplink transmission performed in an RRC idle or inactive state and/or an uplink transmission performed in an RRC connected state. As a non-limiting example, a TA applied by a UE may have a value that corresponds to a length of time that a signal takes to travel from the base station to the UE and back to the base station (which may be included in the NTN node in a regenerative satellite deployment or a gateway in a transparent satellite deployment). As a non-limiting example, the TA applied by the UE may correspond to a round-trip time (RTT) between the base station and the UE (a time between when a transmission is sent from the base station to the UE and a response is received from the UE to the base station in response, or a time between when a transmission is sent from the UE to the base station and a response is received from the base station to the UE in response) because the TA is relative to a downlink frame at the UE, which is already a single-trip delay relative to the same downlink frame at the base station. In this way, the TA applied by the UE may align uplink reception timing implemented at the base station to enable communication with different UEs that may be located at various distances from the base station.

In some cases, the UE may self-estimate the open-loop $N_{TA,UE\text{-}specific}$ value based at least in part on a position of the UE and a satellite position (e.g., a position of the NTN device), where the position of the UE may be estimated based at least in part on a current or most recent GNSS position fix, which the UE may update every few seconds (e.g., in 10 second intervals). The open-loop $N_{TA,UE\text{-}specific}$ value may be a TA calculation that is not based on feedback, as opposed to a closed-loop calculation. Accordingly, during the interval between GNSS position fixes, the UE location that the UE uses to calculate the UE-specific TA may be inaccurate (e.g., when the UE is in motion and has not performed a GNSS position fix). In some aspects, the inaccuracy in the UE location used to calculate the $N_{TA,UE\text{-}specific}$ value may be corrected in a closed-loop timing offset (e.g., a base station may measure the uplink reception timing error and transmit a TA command containing an $N_{TA}$ value that indicates a closed-loop timing offset to be used to calculate the overall TA that the UE is to apply for an uplink transmission). As a result, when the UE calculates a new open-loop $N_{TA,UE\text{-}specific}$ value following an updated GNSS position fix, the new $T_{TA}$ value may correct for a change in the UE location twice-once in the $N_{TA}$ value and another time in the $N_{TA,UE\text{-}specific}$ value. This may cause a double correction problem, whereby the TA (e.g., $T_{TA}$) that the UE applies to an uplink transmission after updating a GNSS position fix is calculated based at least in part on a closed-loop value (e.g., $N_{TA}$) and an open-loop value (e.g. $N_{TA,UE\text{-}specific}$) may double-correct for an error in the UE location. The double-correction issue may cause the UE-specific timing error to increase at ever-increasing rates until the network transmits a TAC to the UE, allowing the UE to correct the UE-specific TA's closed-loop timing offset.

Figure 9:
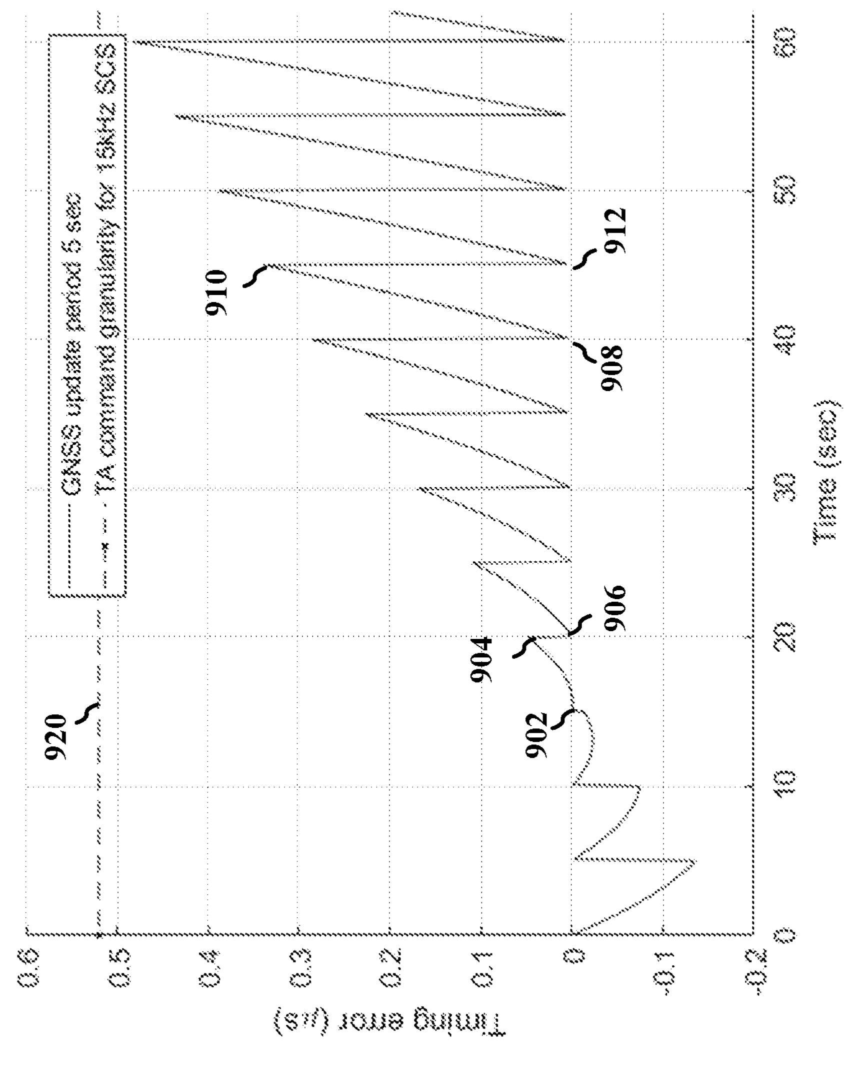
FIG. 9 illustrates another timing diagram showing differential UE specific timing error values for a TA used for communication between a UE and an NTN node.

FIG. 9 illustrates a timing diagram 900 showing differential UE-specific timing error values for a TA used for communication between a UE and a network node. The network node may be a satellite located at 600 km altitude moving north, and the UE may be a land-based UE moving north at 30 m/second. The UE may be configured to update its location via a GNSS fix every 5 seconds.

At time 0, the UE may have processed a TAC, synchronizing the calculated TA variables at both the closed-loop component of the calculated TA (calculated at the network node) and the open-loop component of the calculated TA (calculated at the UE). At time 0, the calculated timing error at the UE may be zero.

Every 5 seconds, the UE may perform a GNSS fix to correct the open-loop component of the calculated TA. As a non-limiting example, at time 15 seconds, the calculated timing error at the UE may be zero at point 902, as the UE may have performed a GNSS fix to correct the open-loop component of the calculated TA. From time 15 to time 20 seconds, the timing error may grow to about 0.05 μs at point 904. At time 20 seconds, the UE may perform a GNSS fix to correct the open-loop component of the calculated TA, bringing the timing error down to zero at point 906. Over time, the timing error at the UE may grow at a faster rate, since the UE calculates the open-loop component of the calculated TA every 5 seconds, but does not synchronize the calculated TA variables at both the closed-loop component of the calculated TA and the open-loop component of the calculated TA until the UE receives a TAC from the network node.

As a non-limiting example, at time 40 seconds, the calculated timing error at the UE may be zero at point 908, as the UE may have performed a GNSS fix to correct the open-loop component of the calculated TA. From time 40 seconds to time 45 seconds, the timing error may grow to about 0.35 μs at point 910. At time 45 seconds, the UE may perform a GNSS fix to correct the open-loop component of the calculated TA, bringing the timing error down to zero at point 912.

Between time 15 seconds to time 20 seconds, the timing error grew to about 0.5 μs at point 904, however between time 40 to time 45 seconds, the timing error grew to about 0.35 μs at point 910. The timing error may continue to grow at a faster rate until the timing error reaches the timing error threshold line 920, which may be 0.52 μs. When the timing error meets or exceeds the timing error threshold line 920, the network node may transmit a TAC to the UE, which may then synchronize the calculated TA variables at both the closed-loop component of the calculated TA and the open-loop component of the calculated TA, ensuring that the timing error does not grow as rapidly as before the UE received the TAC command.

The TAC may include an indication of the delay at the closed-loop component of the calculated TA at the network node. The indication may be an integer that, when multiplied by the TAC granularity, equals the delay at the closed-loop component (e.g., $N_{TA,common}$). The TAC granularity may be calculated based on the subcarrier spacing (SCS) for a frame. As a non-limiting example, the TAC granularity may be calculated as 16 $T_s/2^{\mu}$, where $T_s=1/(15000\times2048)$ see and $\mu=0$ for SCS 15 kHz, 1 for SCS 30 kHz, 2 for 60 kHz, and so on (see Table 1). In other words, for SCS 15 kHz, the granularity may be calculated to be 0.52 μs. However, in some aspects, the timing error limit for a frame with SCS 15 kHz may be 29 $T_s$=0.94 μs for both SSB signals and UL signals. If the TAC granularity is 0.52 μs and the timing error limit is 0.94 μs, the TAC must be accurate by an integer in order to prevent the timing error from exceeding the timing error threshold. If the TAC is inaccurate by two or more integers, then the timing error may easily exceed the timing error threshold, since twice the TAC granularity is 1.04 μs, which is greater than 0.94 μs. As a result, such a coarse granularity with respect to the timing error limit may hinder the network from activating the closed-loop timing control.

Figure 10:
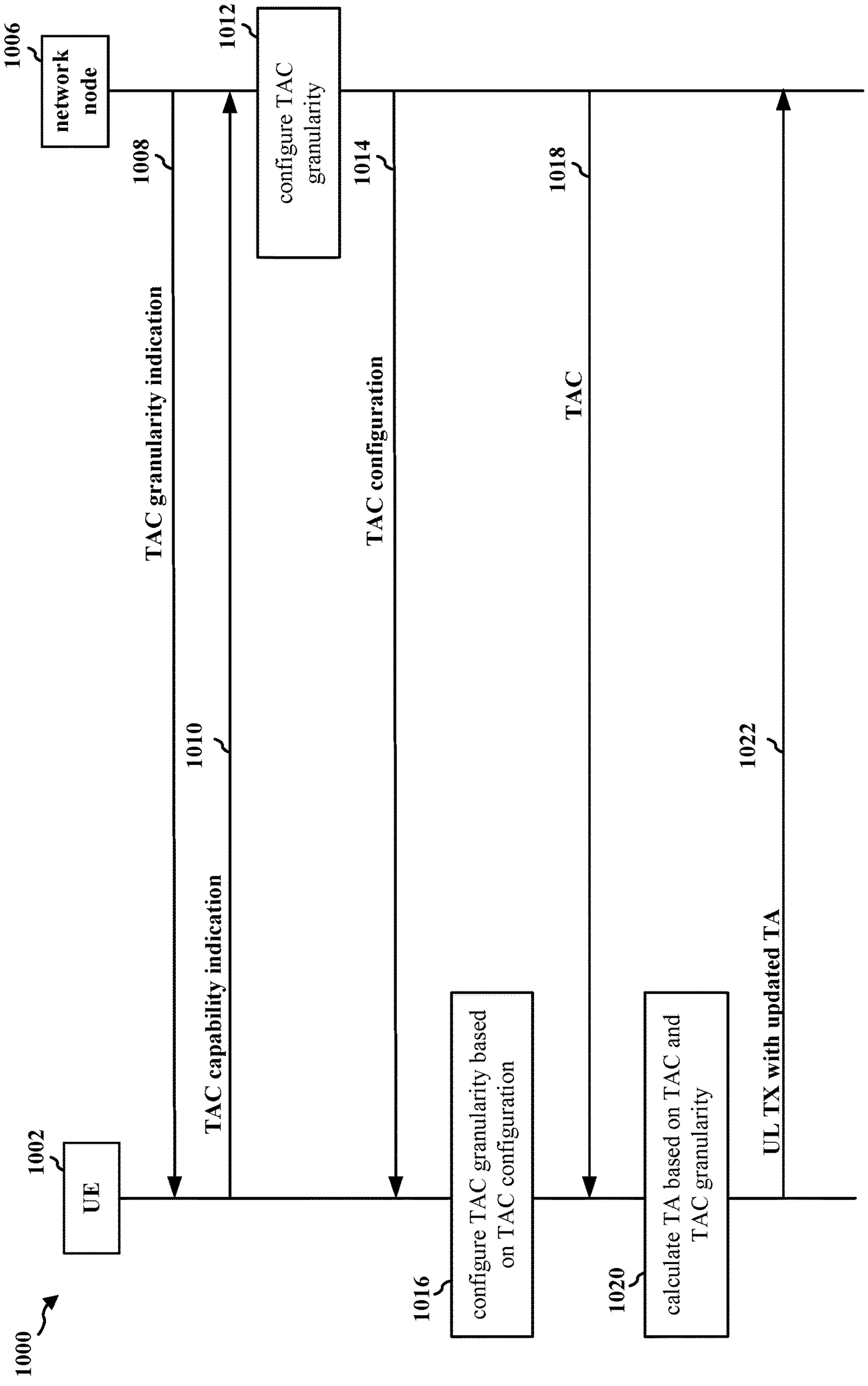
FIG. 10 shows a connection flow diagram having a UE configured to transmit an uplink transmission to a network entity via an NTN device.

In FIG. 10, a connection flow diagram 1000 has a UE 1002 configured to transmit an uplink transmission to a network node 1006 using a calculated TA value. The calculated TA value may compensate for a propagation delay between the UE 1002 and the network node 1006. The network node 1006 may include an NTN node, as a non-limiting example, the base station 506, the NTN device 502, the NTN-DU 514, the NTN-CU 516, or the base station 202 in FIG. 2.

The network node 1006 may be configured to transmit a TAC granularity indication message 1008 to the UE 1002. The UE 1002 may be configured to receive the TAC granularity indication message 1008. The TAC granularity indication message 1008 may be a system information block (SIB) that includes the indication of the availability of one or more granularities of the TAC that the network node 1006 may support. The SIB may include one or more of an indication that the network node 1006 may support a plurality of TAC granularities (i.e., additional TAC granularities value beyond a default TAC granularity value), an indication of what TAC granularities the network node 1006 may support (e.g., a set of TAC granularities), a number of ways for the UE 1002 to indicate its request for specific TAC granularities and/or capability of supporting additional TAC granularities, and/or how to interpret the TAC configuration message 1014 from the network node 1006.

The TAC granularity indication message 1008 may indicate a set of TAC granularities that the network node 1006 may support. In some aspects, the TAC granularity indication message 1008 may provide bitmap indicator of support of the network node 1006 for a set of TAC granularities. In some aspects, the network node 1006 may support two TAC granularities, as a non-limiting example, a default TAC granularity and a TAC granularity half the size of the default TAC granularity. In such aspects, the TAC granularity indication message 1008 may include a binary indication. As a non-limiting example, 0 may indicate that the network node 1006 supports a single TAC granularity value, and 1 may indicate that the network node 1006 supports a plurality of predefined TAC granularity values. In some aspects, the network node may support more than two TAC granularities. A multi-digit bitmap indicator may indicate support of the network node 1006 for a set of TAC granularities. As a non-limiting example, 00 may indicate that the network node 1006 supports a single default TAC granularity value, O1 may indicate that the network node 1006 supports a first plurality of predefined TAC granularity values, 10 may indicate that the network node 1006 supports a second plurality of predefined TAC granularity values different from the first plurality of predefined TAC granularity values, and 11 may indicate that the network node 1006 supports a third plurality of predefined TAC granularity values.

In some aspects, the network node 1006 may be configured to use a default TAC value that is associated with an SCS, as a non-limiting example, a TAC granularity that is calculated as 16 $T_s/2^\mu$. The TAC granularity indication message 1008 may indicate TAC granularity values other than the default TAC value, as the UE 1002 may already know the default TAC value as being predefined, as a non-limiting example, in a specification shared by the network node 1006 and the UE 1002. In some aspects, the network node 1006 may indicate each of the set of TAC granularities in terms of a scaling factor with respect to the default granularity. As a non-limiting example, if the default TAC value is 0.52 μs, and the set of TAC granularities includes [0.13 μs, 0.26 μs, 0.39 μs], then the TAC granularity indication message 1008 may indicate the scaling factors of [0.25, 0.5, 0.75] as a set of scaling factors that may be multiplied against the default TAC value to produce the set of TAC granularities, or may indicate the scaling factors of [1, 2, 3] as a set of scaling factors divided by four that may then be multiplied against the default TAC value to produce the set of TAC granularities. In other aspects, the TAC granularity indication message 1008 may directly include a set of TAC granularity values listed in μs.

In some aspects, the TAC granularity indication message 1008 may indicate to the UE 1002 one or more transmission formats that the UE 1002 may use to indicate its request for, and/or capability of supporting, the one or more TAC granularities that the network node 1006 may support. In other words, the TAC granularity indication message 1008 may indicate to the UE 1002 one or more transmission formats that the UE 1002 may use to transmit the TAC capability indication message 1010. As a non-limiting example, the indication may be a binary indication that the UE 1002 may or may not support one or more TAC granularities other than a default TAC granularity value. The indication may include an indication of which TAC granularity the UE 1002 may wish to use. The UE 1002 may select the TAC granularity from a set of TAC granularities provided by the network node 1006 in the TAC granularity indication message 1008.

In some aspects, the transmission format may indicate a type of message that the UE 1002 may transmit to the network node 1006 that contains an indication of the UE's TAC capability/requests. In one aspect, the TAC granularity indication message 1008 may indicate to the UE 1002 that the UE 1002 may transmit the TAC capability indication message 1010 in an uplink (UL) medium access control (MAC) control element (MAC-CE) format. In other words, the UE 1002 may transmit the TAC granularity indication message 1008 as an UL MAC-CE that includes the indication of the UE's TAC capability. In one aspect, the TAC granularity indication message 1008 may indicate to the UE 1002 that the UE 1002 may transmit the TAC capability indication message 1010 in an UL radio resource control (RRC) format. As a non-limiting example, the UE 1002 may transmit the TAC capability indication message 1010 as a UE capability report. The UL RRC (e.g., the UE capability report) may include the indication of the UE's TAC capability. In one aspect, the TAC granularity indication message 1008 may indicate to the UE 1002 that the UE 1002 may transmit the TAC capability indication message 1010 in an uplink control information (UCI) format. In other words, the UE 1002 may transmit the TAC granularity indication message 1008 as an UL MAC-CE that includes the indication of the UE's TAC capability.

In some aspects, the UE 1002 may be configured to indicate the UE's TAC capability/requests during a random access event, as a non-limiting example, in a message 1 (Msg1) transmission (e.g., a physical random access channel (PRACH) message). An attribute of the Msg1 transmission may indicate the UE 902's TAC capability/requests to the network node 1006. In one aspect, the TAC granularity indication message 1008 may indicate to the UE 1002 that the UE 1002 may transmit the TAC capability indication message 1010 in a physical random access channel (PRACH) format. The network node 1006 may indicate a particular PRACH format that indicates to the network node 1006 that the UE 1002 requests a particular TAC granularity. As a non-limiting example, the network node 1006 may indicate to the UE 1002 to transmit the TAC granularity indication message 1008 using a format 1A if the UE 1002 requests a smaller TAC granularity value than the default TAC granularity value, and to transmit the TAC granularity indication message 1008 using a format 1B if the UE 1002 requests to use the default TAC granularity value. The network node 1006 may indicate a set of PRACH formats to the UE 1002 that the UE 1002 may use, where at least a first subset of the set PRACH formats corresponds with a first TAC granularity value and a second subset of the set of PRACH formats corresponds with a second TAC granularity value different than the first TAC granularity value. In one aspect, the TAC granularity indication message 1008 may indicate to the UE 1002 that the UE 1002 may transmit the TAC capability indication message 1010 in a subset of physical random access channel (PRACH) sequences. As a non-limiting example, the network node 1006 may indicate to the UE 1002 to transmit the TAC granularity indication message 1008 using a first subset of PRACH sequences if the UE 1002 requests to use a smaller TAC granularity value than the default TAC granularity value, and to transmit the TAC granularity indication message 1008 using a second subset of PRACH sequences if the UE 1002 requests to use the default TAC granularity value. The network node 1006 may indicate a plurality of subsets of PRACH sequences to the UE 1002 that the UE 1002 may use for a Msg1 transmission, where a first subset of the plurality of subsets of PRACH sequences corresponds with a first TAC granularity value and a second subset of the plurality of subsets of PRACH sequences corresponds with a second TAC granularity value different than the first TAC granularity value. In one aspect, the TAC granularity indication message 1008 may indicate to the UE 1002 that the UE 1002 may transmit the TAC capability indication message 1010 in a subset of random access channel (RACH) occasions. As a non-limiting example, the network node 1006 may indicate to the UE 1002 to transmit the TAC granularity indication message 1008 using a first subset of RACH occasions if the UE 1002 requests to use a smaller TAC granularity value than the default TAC granularity value, and to transmit the TAC granularity indication message 1008 using a second subset of RACH occasions if the UE 1002 requests to use the default TAC granularity value. The network node 1006 may indicate a plurality of subsets of RACH occasions to the UE 1002 that the UE 1002 may use for a Msg1 transmission, where a first subset of the plurality of subsets of RACH occasions corresponds with a first TAC granularity value and a second subset of the plurality of subsets of RACH occasions corresponds with a second TAC granularity value different than the first TAC granularity value.

In some aspects, the UE 1002 may be configured to indicate the UE's TAC capability requests in a message 3 (Msg3) transmission (e.g., an RRC setup request). An characteristic of the Msg3 transmission may indicate the UE 902's TAC capability requests to the network node 1006, or a value of one or more fields of the Msg3 transmission may indicate the UE 902's TAC capability requests to the network node 1006. In one aspect, the TAC granularity indication message 1008 may indicate a set of demodulation reference signal (DMRS) port numbers of the Msg3 message, where at least some of the port numbers may be associated with an indication of the UE's TAC capability requests. As a non-limiting example, the DMRS port number 0 may be used to indicate a DMRS. Another port number, such as DMRS port number 1, may be used to indicate that the UE 1002 requests to use a smaller TAC granularity value than the default TAC granularity value. Another port number, such as the DMRS port number 2, may be used to indicate that the UE 1002 requests to use the default TAC granularity value. In some aspects, each DMRS port number of a set of DMRS port numbers indicated in the TAC granularity indication message 1008 may correspond with a TAC granularity value, where at least two TAC granularity values are different. In another non-limiting example, the TAC granularity indication message 1008 may indicate that a way to generate the DMRS sequence of the Msg3 message may be used to indicate the UE's TAC capability requests. As a non-limiting example, if the UE 1002 initializes the DMRS sequence using a default random seed, the UE 1002 may indicate to the network node 1006 that the UE 1002 wishes to use a default TAC granularity value. On the other hand, if the UE 1002 initializes the DMRS sequence using a different random seed, the UE 1002 may indicate to the network node 1006 that the UE 1002 wishes to use a TAC granularity value other than the default TAC granularity value. The network node 1006 may provide a set of random seeds that the UE 1002 may use to initialize the DMRS sequence, where each random seed may correspond with a TAC granularity value. In some aspects, the ways to generate the DMRS sequence may use different initialization values for a random seed from one another, while in other aspects, the ways to generate the DMRS sequence may use a different cyclic shift from one another. The TAC granularity indication message 1008 may include a set of DMRS generation functions, where each DMRS generation function may correspond with a TAC granularity value. In other words, the DMRS generation functions may be used to indicate the TAC granularity capability/request. In another non-limiting example, the TAC granularity indication message 1008 may indicate that a way of doing PUSCH scrambling for the Msg3 message may be used to indicate the UE's TAC capability requests. One way may indicate to the network node 1006 that the UE 1002 requests to use a smaller TAC granularity value than the default TAC granularity value, while another way may indicate to the network node 1006 that the UE 1002 requests to use the default TAC granularity value. In some aspects, the TAC granularity indication message 1008 may indicate a set of PUSCH scrambling functions that the UE 1002 may use, where each of the set of PUSCH scrambling functions may correspond with a TAC granularity value. In other words, the TAC granularity indication message 1008 may include one or more PUSCH scrambling functions used to indicate the TAC granularity capability/request.

In some aspects, a value of a field in the Msg3 message may indicate the UE's TAC capability requests to the network node 1006. As a non-limiting example, one value may indicate that the UE 1002 wishes to use a smaller TAC granularity value, while another value may indicate that the UE 1002 wishes to use the default TAC granularity value. In some aspects, the value may indicate which TAC granularity value the UE 1002 requests to use from a set of TAC granularity values. As a non-limiting example, the TAC granularity indication message 1008 may indicate a set of reserved logical channel identifier (LCID) codepoints for UL common control channel (CCCH) data of the Msg3 message. The UE 1002 may use the set of LCID checkpoints to indicate the UE's TAC capability requests to the network node 1006. In some aspects, the UE 1002 may define a set of new LCID codepoints for UL CCCH data of the Msg3 message. The UE 1002 may use the set of new LCID codepoints to indicate the UE's TAC capability requests to the network node 1006. In another non-limiting example, the TAC granularity indication message 1008 may indicate a set of reserved fields in a MAC subheader used for UL CCCH data of the Msg3 message. The UE 1002 may use the set of reserved fields to indicate the UE's TAC capability requests to the network node 1006.

In some aspects, the TAC granularity indication message 1008 may indicate to the UE 1002 how to interpret the bits for the configuration of the TAC granularity. As a non-limiting example, the TAC granularity indication message 1008 may include a TAC configuration table for interpreting the TAC configuration message 1014. The TAC configuration table may include a bitmap that may be used to associate a bit configuration with a TAC granularity value. As a non-limiting example, the TAC configuration table may associate O1 with 0.13 μs, 10 with 0.26 μs, 11 with 0.39 μs, and 00 with 0.52 μs (the default value).

The UE 1002 may transmit the TAC capability indication message 1010 to the network node 1006. The network node 1006 may receive the TAC capability indication message 1010 from the UE 1002. The TAC capability indication message 1010 may be transmitted using a transmission format indicated by the TAC granularity indication message 1008 to indicate the capability/requests of the UE 1002 to the network node 1006.

At 1012, the network node 1006 may configure the TAC granularity value for the UE 1002 based on the indication of the TAC capability indication message 1010. As a non-limiting example, the network node 1006 may select a default value for the TAC granularity value, or may select a TAC granularity value for the UE 1002 based on the indication of the TAC capability indication message 1010. In another non-limiting example, the network node 1006 may select a TAC granularity value from a set of TAC granularity values based on the indication of the TAC capability indication message 1010.

The network node 1006 may transmit a TAC configuration message 1014 to the UE 1002. The UE 1002 may receive the TAC configuration message 1014 from the network node 1006. The TAC configuration message 1014 may be transmitted in a plurality of ways. In one aspect, the TAC configuration message 1014 may include a downlink (DL) medium access control (MAC) control element (MAC-CE). The DL MAC-CE may include the TAC configuration configured at 1012. In one aspect, the TAC configuration message 1014 may include a DL radio resource control (RRC) message. The DL RRC message may include the TAC configuration configured at 1012. In one aspect, the TAC configuration message 1014 may include downlink control information (DCI). The DCI may include the TAC configuration configured at 1012. In one aspect, the network node 1006 may repurpose a set of bits in the DCI to indicate the TAC configuration. In one aspect, the network node 1006 may use a set of reserved bits in the DCI to indicate the TAC configuration. As a non-limiting example, the network node 1006 may use a set of bits reserved for a downlink assignment index (DAI) for scheduling a message 4 (Msg4) transmission to indicate the TAC configuration. The Msg4 transmission may include a DCI format 1_0 with a cyclic redundancy check (CRC) scrambled by a temporary cell ($T_C$) radio network temporary identifier ($T_C$-RNTI). In another non-limiting example, the network node 1006 may use a set of bits reserved for scheduling a message 2 (Msg2) transmission to indicate the TAC configuration. The Msg2 transmission may include a DCI format 1_0 with a cyclic redundancy check (CRC) scrambled by a random access (RA) radio network temporary identifier (RA-RNTI). In one aspect, the TAC configuration message 1014 may be transmitted as a random access response (RAR) uplink (UL) grant. The RAR UL grant may include the TAC configuration configured at 1012. The channel state information (CSI) request bit in the RAR UL grant may be used to indicate whether or not the UE 1002 should use a smaller TAC granularity to calculate its TA.

At 1016, the UE 1002 may configure its TAC granularity based on the TAC configuration message 1014. As a non-limiting example, the UE 1002 may set its TAC granularity to one of the plurality of TAC granularities supported by the network node 1006, as indicated by the TAC configuration message 1014.

Later, the UE 1002 may use the new TAC granularity to calculate its TA. The network node 1006 may transmit a TAC message 1018 to the UE 1002. The UE 1002 may receive the TAC message 1018 from the network node 1006. The TAC message 1018 may include an indication of the delay at the closed-loop component of the calculated TA at the network node. The indication may be an integer that, when multiplied by the TAC granularity, equals the delay at the closed-loop component (e.g., $N_{TA,common}$). The UE 1002 may multiply the integer with the new TAC granularity. In response to receiving the TAC message 1018, at 1020 the UE 1002 may calculate its TA based on the TAC integer and the new TAC granularity. In other words, the UE 1002 may synchronize the calculated TA variables at both the closed-loop component of the calculated TA and the open-loop component of the calculated TA, reducing the timing error at the UE 1002 as the closed-loop component has been readjusted. As a non-limiting example, the UE 1002 may calculate the closed-loop component of the calculated TA by multiplying the TAC integer with the new TAC granularity, and may then calculate the open-loop component of the calculated TA by performing a GNSS fix using the closed-loop component of the calculated TA.

The network node 1006 may transmit the TAC more often using the new TAC granularity, as the TAC granularity may be set as the timing error threshold for trigging transmission of the TAC message 1018 at the network node 1006. Maintaining the low timing error may reduce the number of times the UE 1002 may perform a GNSS fix, as the network node 1006 transmits TACs more often with a smaller TAC granularity. This may not only ensure that the TA timing error does not increase past the timing error limit associated with the network node 1006, but this may also reduce the amount of energy used by the UE 1002 to perform GNSS fixes-particularly for lower power devices (e.g., internet of things devices).

The UE 1002 may transmit the UL transmission 1022 to the network node 1006 using the newly calculated TA. The network node 1006 may receive the UL transmission 1022.

Figure 11A:
FIG. 11A illustrates an uplink transmission format that a UE may use to indicate a TAC granularity capability to a network node, in accordance with various aspects of the present disclosure.

FIG. 11A illustrates an uplink transmission format 1100 that a UE, such as the UE 1002 in FIG. 10, may use to indicate a TAC granularity capability/preference to a network node, such as the network node 1006 in FIG. 10. As a non-limiting example, the network node 1006 in FIG. 10 may transmit a TAC granularity indication message 1008 to the UE 1002 as a downlink transmission including an indication of the uplink transmission format 1100 that the UE 1002 may use to transmit the TAC capability indication message 1010 to the network node 1006 as an uplink transmission including an indication of the TAC granularity capability/preference. The uplink transmission format 1100 may be, as a non-limiting example, an UL MAC-CE, an UL RRC (e.g., a UE capability report), or a UCI that the UE transmits to the network node. The uplink transmission may include an indication 1102 of the UE's TAC capability requests, as a non-limiting example, whether the UE requests a smaller TAC granularity value than the default TAC granularity value, or which TAC granularity value the UE has selected from a set of TAC granularity values transmitted to the UE by the network node. The indication 1102 may include a bitmap representation of the TAC granularity request by the UE.

Figure 11B:
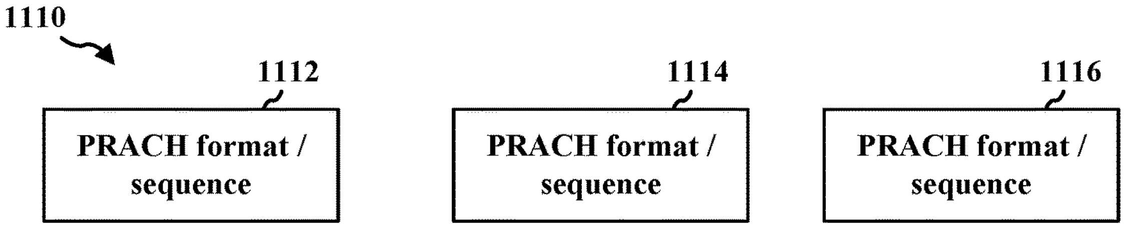
FIG. 11B illustrates a set of physical random access channel (PRACH) formats or sequences that a UE may use to indicate a TAC granularity capability to a network node, in accordance with various aspects of the present disclosure.

FIG. 11B is a diagram 1110 of a set of PRACH formats or sequences that a UE, such as the UE 1002 in FIG. 10, may use to indicate a TAC granularity capability/preference to a network node, such as the network node 1006 in FIG. 10. As a non-limiting example, the network node 1006 in FIG. 10 may transmit a TAC granularity indication message 1008 to the UE 1002 as a downlink transmission including an indication of the set of PRACH formats or sequences (the PRACH format/sequence 1112, the PRACH format/sequence 1114, and the PRACH format/sequence 1116) that the UE 1002 may use to transmit the TAC capability indication message 1010 to the network node 1006 as a PRACH uplink transmission that indicates the TAC granularity capability/preference. The network node may indicate the PRACH format/sequence 1112, the PRACH format/sequence 1114, and the PRACH format/sequence 1116 to the UE. As a non-limiting example, the PRACH format/sequence 1112 may be a format 1A, the PRACH format/sequence 1114 may be a format 1B, and the PRACH format/sequence 1116 may be a format 2A. In another non-limiting example, the PRACH format/sequence 1112 may be a first Zadoff-Chu sequence, the PRACH format/sequence 1114 may be a second Zadoff-Chu sequence different from the first Zadoff-Chu sequence, and the PRACH format/sequence 1116 may be a third Zadoff-Chu sequence different from the first and second Zadoff-Chu sequences. The network node may indicate that use of the PRACH format/sequence 1112 or the PRACH format/sequence 1114 may indicate to the network node that the UE requests a smaller TAC granularity value than the default TAC granularity value, and that use of the PRACH format/sequence 1116 may indicate to the network node that the UE does not request a smaller TAC granularity value than the default TAC granularity value (i.e., the UE requests use of the default TAC granularity value). In some aspects, the network node may indicate that use of the PRACH format/sequence 1112 may select a first fine TAC granularity value, and use of the PRACH format/sequence 1114 may select a second TAC granularity value different than the first TAC granularity value. A network node may indicate more or less formats or sequences to the UE. As a non-limiting example, the network node may indicate a first set of PRACH formats or sequences to the UE that may indicate that the UE requests a smaller TAC granularity than a default value, implying that any other PRACH formats or sequences that the UE uses indicates that the UE does not request a smaller TAC granularity than the default value. In another non-limiting example, the network node may indicate a set of PRACH formats or sequences to the UE for each TAC granularity that the network node supports.

Figure 11C:
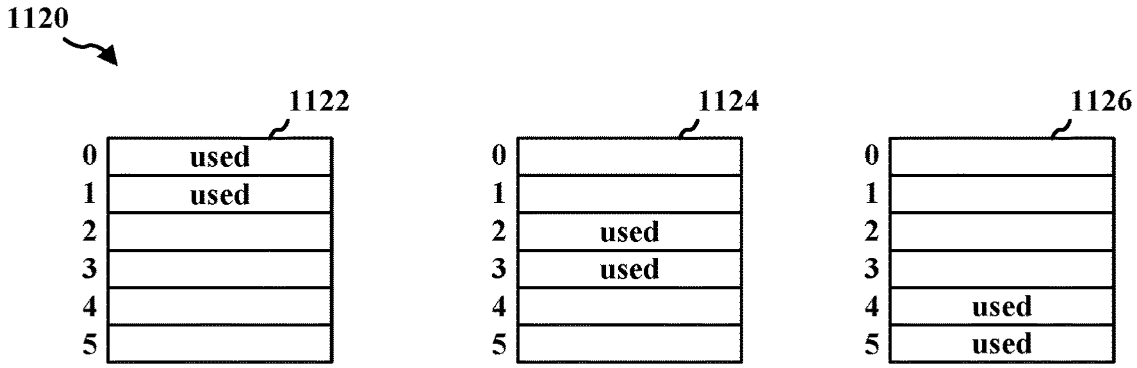
FIG. 11C illustrates a set of random access channel (RACH) occasions that a UE may use to indicate a TAC granularity capability to a network node, in accordance with various aspects of the present disclosure.

FIG. 11C is a diagram 1120 of a set of RACH occasions that a UE, such as the UE 1002 in FIG. 10, may use to indicate a TAC granularity capability/preference to a network node, such as the network node 1006 in FIG. 10. As a non-limiting example, the network node 1006 in FIG. 10 may transmit a TAC granularity indication message 1008 to the UE 1002 as a downlink transmission including an indication of the RACH occasions (the subset of RACH occasions 1122, the subset of RACH occasions 1124, and the subset of RACH occasions 1126) that the UE 1002 may use to transmit the TAC capability indication message 1010 to the network node 1006 as a uplink transmission that indicates the TAC granularity capability/preference. The network node may indicate the subset of RACH occasions 1122, the subset of RACH occasions 1124, and the subset of RACH occasions 1126 to the UE. Each subset is shown as a subset selected from a set of six RACH occasions, but a network node may indicate a subset of more or less RACH occasions. The network node may indicate that use of the RACH occasions 1122 or the RACH occasions 1124 may indicate to the network node that the UE requests a smaller TAC granularity value than the default TAC granularity value, and that use of the RACH occasions 1126 may indicate to the network node that the UE does not request a smaller TAC granularity value than the default TAC granularity value (i.e., the UE requests use of the default TAC granularity value). In some aspects, the network node may indicate that use of the RACH occasions 1122 may select a first TAC granularity value, and use of the RACH occasions 1124 may select a second TAC granularity value different than the first TAC granularity value. A network node may indicate more or less subsets of RACH occasions to the UE. As a non-limiting example, the network node may indicate a subset of RACH occasions to the UE that may indicate that the UE requests a smaller TAC granularity than a default value, implying that any other subsets of RACH occasions that the UE uses indicates that the UE does not request a smaller TAC granularity than the default value. In another non-limiting example, the network node may indicate a subset of RACH occasions to the UE for each TAC granularity that the network node supports.

Figure 11D:
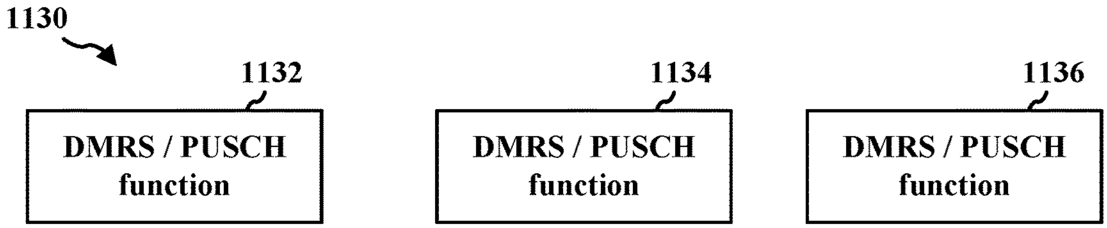
FIG. 11D illustrates a set of demodulation reference signal (DMRS) or physical uplink shared channel (PUSCH) functions that a UE may use to indicate a TAC granularity capability to a network node, in accordance with various aspects of the present disclosure.

FIG. 11D is a diagram 1130 of a set of DMRS or PUSCH functions that a UE, such as the UE 1002 in FIG. 10, may use to indicate a TAC granularity capability/preference to a network node, such as the network node 1006 in FIG. 10. As a non-limiting example, the network node 1006 in FIG. 10 may transmit a TAC granularity indication message 1008 to the UE 1002 as a downlink transmission including an indication of the set of DMRS or PUSCH functions (the DMRS or PUSCH function 1132, the DMRS or PUSCH function 1134, and the DMRS or PUSCH function 1136) that the UE 1002 may use to generate a DMRS or scramble a PUSCH for the TAC capability indication message 1010 transmitted to the network node 1006 as a uplink transmission that indicates the TAC granularity capability/preference. The network node may indicate the DMRS or PUSCH function 1132, the DMRS or PUSCH function 1134, and the DMRS or PUSCH function 1136 to the UE. As a non-limiting example, the DMRS or PUSCH function 1132 may be a way to generate the DMRS sequence using a first initialization of the random seed, the DMRS or PUSCH function 1134 may be a way to generate the DMRS sequence using a second initialization of the random seed, and the DMRS or PUSCH function 1136 may be a way to generate the DMRS sequence using a third initialization of the random seed. In another non-limiting example, the DMRS or PUSCH function 1132 may be a PUSCH scrambling function using a first scrambling identity, the DMRS or PUSCH function 1134 may be a PUSCH scrambling function using a second scrambling identity, and the DMRS or PUSCH function 1136 may be a PUSCH scrambling function using a third scrambling identity. The network node may indicate that use of the DMRS or PUSCH function 1132 or the DMRS or PUSCH function 1134 may indicate to the network node that the UE requests a smaller TAC granularity value than the default TAC granularity value, and that use of the DMRS or PUSCH function 1136 may indicate to the network node that the UE does not request a smaller TAC granularity value than the default TAC granularity value (i.e., the UE requests use of the default TAC granularity value). In some aspects, the network node may indicate that use of the DMRS or PUSCH function 1132 may select a first TAC granularity value, and use of the DMRS or PUSCH function 1134 may select a second TAC granularity value different than the first TAC granularity value. A network node may indicate more or less DMRS or PUSCH functions to the UE. As a non-limiting example, the network node may indicate a set of DMRS or PUSCH functions to the UE that may indicate that the UE requests a smaller TAC granularity than a default value, implying that any other sets of DMRS or PUSCH functions that the UE uses indicates that the UE does not request a smaller TAC granularity than the default value. In another non-limiting example, the network node may indicate a set of DMRS or PUSCH functions to the UE for each TAC granularity that the network node supports.

Figure 11E:
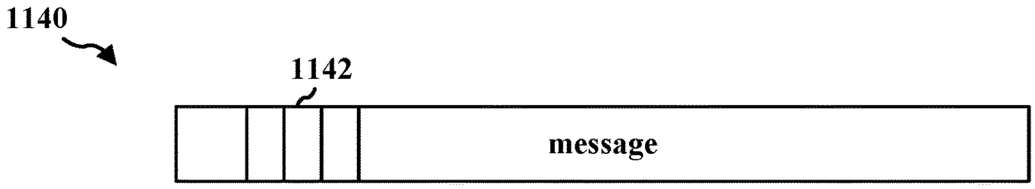
FIG. 11E illustrates a message having a set of bits that a wireless device may use to indicate a TAC granularity capability or TAC granularity, in accordance with various aspects of the present disclosure.

FIG. 11E illustrates a message 1140 having a set of bits 1142 that a wireless device may use to indicate a TAC granularity capability/preference or TAC granularity. While the set of bits 1142 is shown as a set of three bits in FIG. 11E, the set of bits 1142 may be more or less bits depending upon the configuration used by the network node. As a non-limiting example, the network node may indicate for the UE to use a binary indication of its capability to use a plurality of TAC granularity values, in which case the set of bits 1142 may be one bit (e.g., 0 to indicate that the UE does not have the capability, and 1 to indicate that the UE has the capability). In another non-limiting example, the network node may indicate for the UE to use a bitmap indication to select from a set of six TAC granularity values, in which case the set of bits 1142 may be three bits (e.g., 000, 001, 010, 011, 100, and 101 used to indicate which of the six TAC granularity values to request).

In one aspect, the message 1140 may be a Msg3 transmission that a UE, such as the UE 1002 in FIG. 10, may use to indicate a TAC granularity capability to a network node, such as the network node 1006 in FIG. 10, in an uplink transmission, such as the TAC capability indication message 1010. The set of bits 1142 may indicate a DMRS port number in a Msg3 transmission. If a specification (e.g., a wireless standard, a configuration of a network node) uses DMRS port 0 and no other DMRS ports, the UE may use the DMRS port number other than 0 to indicate whether the UE requests a smaller TAC granularity value than a default TAC granularity value. The DMRS port number may indicate which TAC granularity value the UE requests from a set of TAC granularity values the network node supports. The set of bits 1142 may be a set of reserved LCID code points for UL CCH data. The UE may indicate its TAC granularity capability using the set of reserved LCID code points, for example by using a bitmap indicator. The set of bits 1142 may be a set of new extended LCID (eLCID) code points defined by a new specification. The UE may indicate its TAC granularity capability using the set of new eLCID code points, for example by using a bitmap indicator. The set of bits 1142 may be a set of reserved fields (i.e., "R" fields) in a MAC subheader used for UL CCH data. The UE may indicate its TAC granularity capability using the set of reserved fields, for example by using a bitmap indicator.

In another aspect, the message 1140 may be a Msg2 or a Msg4 transmission that a network node, such as the network node 1006 in FIG. 10, may use to indicate a TAC granularity to a UE, such as the UE 1002 in FIG. 10, in a downlink transmission, such as the TAC granularity indication message 1008. The set of bits 1142 may be a set of repurposed bits in a DCI. The set of bits 1142 may be a set of new bits in a DCI. The set of bits 1142 may be a set of reserved bits in a DCI, such as the DAI bits in a DCI scheduling a Msg4 transmission (e.g., in DCI format 1_0 with CRC scrambled by $T_C$-RNTI) or a set of reserved bits in the DCI scheduling a Msg2 transmission (e.g., in DCI format 1_0 with CRC scrambled by RA-RNTI). The set of bits 1142 may be a CSI request bit in a RAR UL grant. The network node may indicate a TAC granularity using the set of bits 1142 in the message 1140, for example by using a bitmap indicator. The network node may indicate to the UE how to interpret the set of bits 1142 in a previous transmission, for example the TAC granularity indication message 1008 in FIG. 10.

Figure 12:
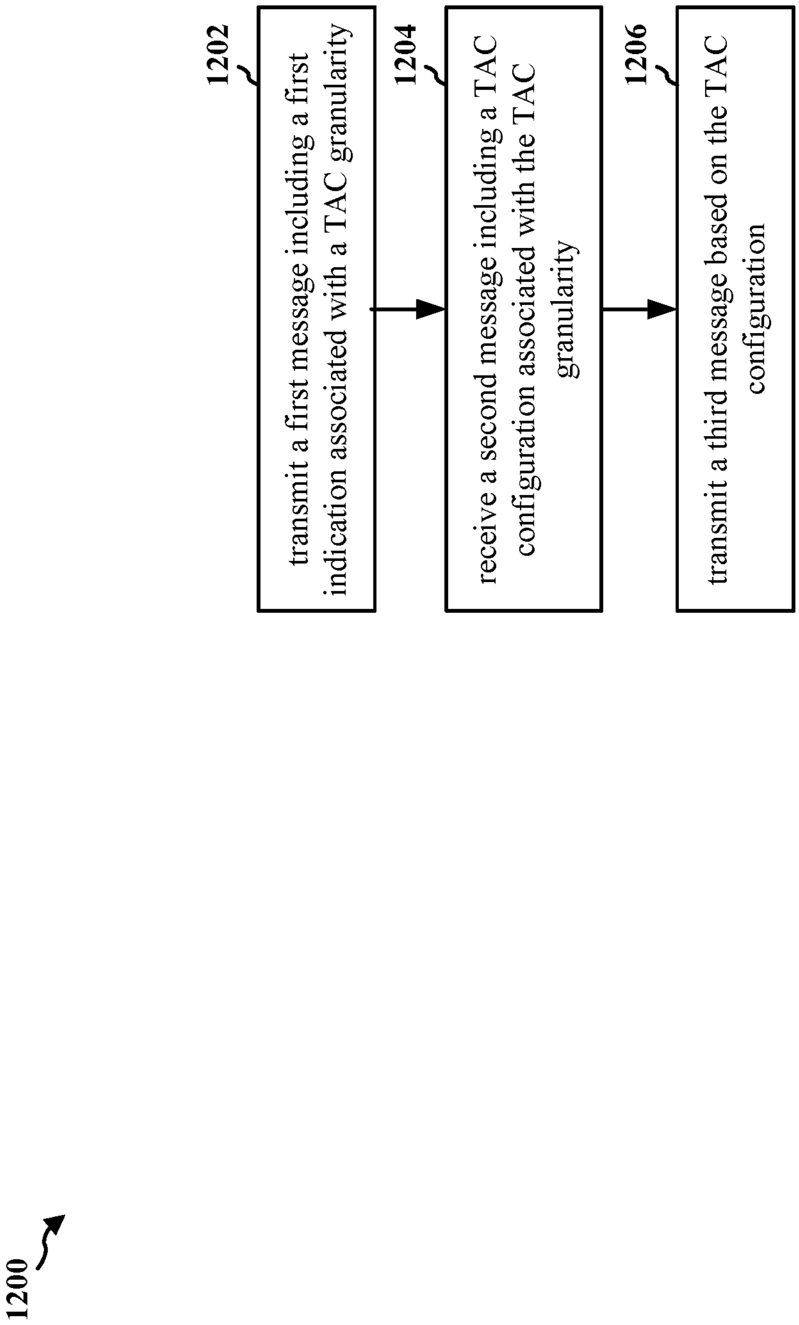
FIG. 12 is a flowchart of a method of wireless communication.

FIG. 12 is a flowchart 1200 of a method of wireless communication. The method may be performed by a UE (e.g., the UE 204, the UE 450, the UE 505, the UE 630, the UE 1002, the UE; the apparatus 1604). At 1202, the UE may transmit a first message including a first indication associated with a TAC granularity. As a non-limiting example, 1202 may be performed by the UE 1002 in FIG. 10, which may transmit the TAC capability indication message 1010 to the network node 1006 via the network node 1006. The TAC capability indication message 1010 may include a first indication associated with a TAC granularity for the UE 1002. Moreover, 1202 may be performed by the component 198 in FIG. 1, 2, 4, or 16.

At 1204, the UE may receive a second message including a TAC configuration associated with the TAC granularity. As a non-limiting example, 1204 may be performed by the UE 1002 in FIG. 10, which may receive the TAC configuration message 1014 from the network node 1006 via the network node 1006. The TAC configuration message 1014 may include a TAC configuration associated with the TAC granularity for the UE 1002. Moreover, 1204 may be performed by the component 198 in FIG. 1, 2, 4, or 16.

At 1206, the UE may transmit a third message based on the TAC configuration. As a non-limiting example, 1206 may be performed by the UE 1002 in FIG. 10, which may transmit the UL transmission 1022 to the network node 1006 via the network node 1006 based on the TAC configuration of the TAC configuration message 1014. Moreover, 1206 may be performed by the component 198 in FIG. 1, 2, 4, or 16.

Figure 13:
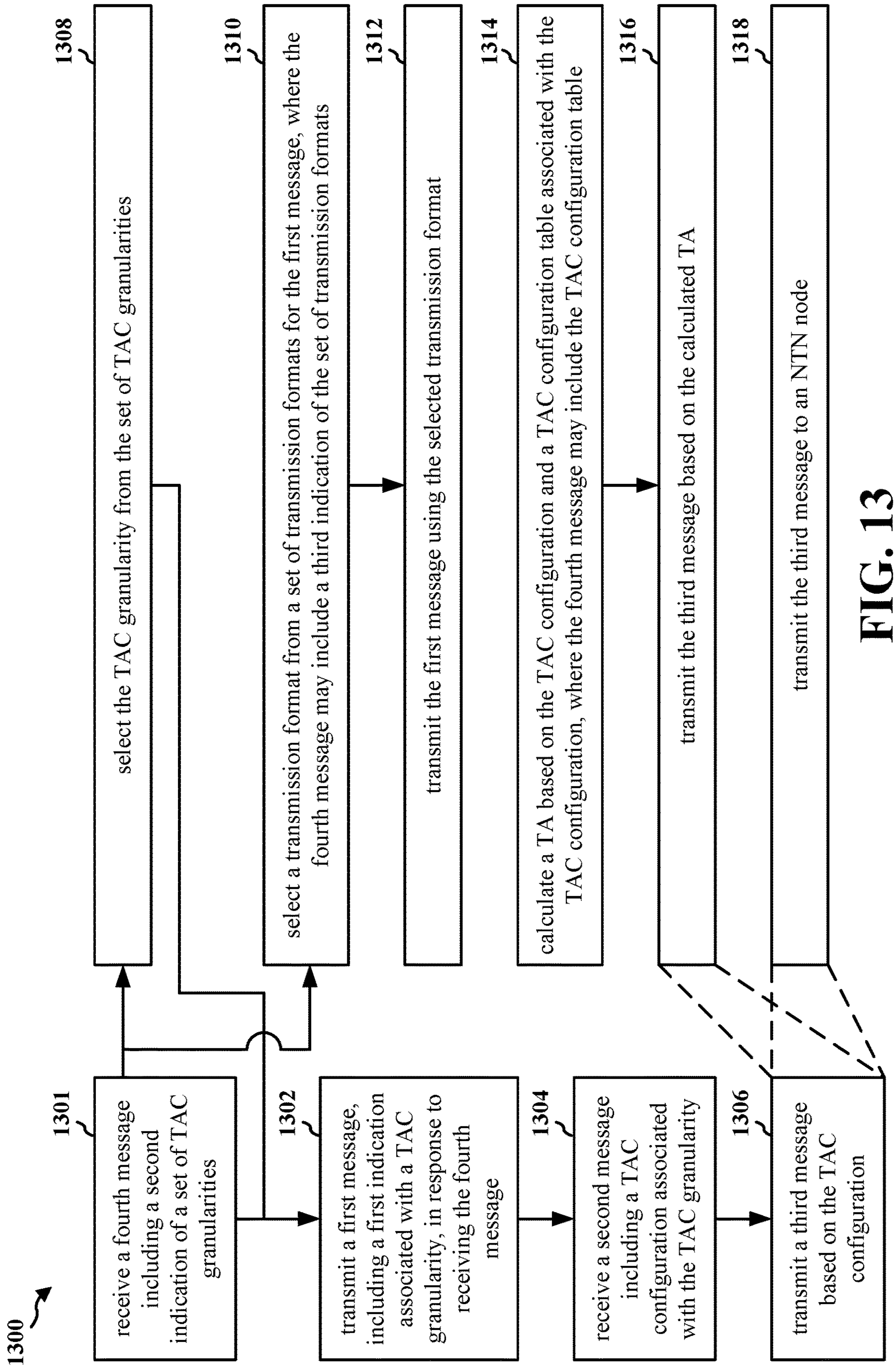
FIG. 13 is a flowchart of a method of wireless communication.

FIG. 13 is a flowchart 1300 of a method of wireless communication. The method may be performed by a UE (e.g., the UE 204, the UE 450, the UE 505, the UE 630, the UE 1002, the UE; the apparatus 1604). At 1301, the UE may receive a fourth message including a second indication of a set of TAC granularities. As a non-limiting example, 1301 may be performed by the UE 1002 in FIG. 10, which may receive the TAC granularity indication message 1008 including an indication of a set of TAC granularities. Moreover, 1301 may be performed by the component 198 in FIG. 1, 2, 4, or 16.

At 1302, the UE may transmit a first message, including a first indication associated with a TAC granularity, in response to receiving the fourth message. As a non-limiting example, 1302 may be performed by the UE 1002 in FIG. 10, which may transmit the TAC capability indication message 1010 to the network node 1006 via the network node 1006. The TAC capability indication message 1010 may include a first indication associated with a TAC granularity for the UE 1002. The UE 1002 may transmit the TAC capability indication message 1010 in response to receiving the TAC granularity indication message 1008. Moreover, 1302 may be performed by the component 198 in FIG. 1, 2, 4, or 16.

At 1304, the UE may receive a second message including a TAC configuration associated with the TAC granularity. As a non-limiting example, 1304 may be performed by the UE 1002 in FIG. 10, which may receive the TAC configuration message 1014 from the network node 1006 via the network node 1006. The TAC configuration message 1014 may include a TAC configuration associated with the TAC granularity for the UE 1002. Moreover, 1304 may be performed by the component 198 in FIG. 1, 2, 4, or 16.

At 1306, the UE may transmit a third message based on the TAC configuration. As a non-limiting example, 1306 may be performed by the UE 1002 in FIG. 10, which may transmit the UL transmission 1022 to the network node 1006 via the network node 1006 based on the TAC configuration of the TAC configuration message 1014. Moreover, 1306 may be performed by the component 198 in FIG. 1, 2, 4, or 16.

At 1308, the UE may select the TAC granularity from the set of TAC granularities. As a non-limiting example, 1308 may be performed by the UE 1002 in FIG. 10, which may select the TAC granularity from the set of TAC granularities indicated by the TAC granularity indication message 1008. Moreover, 1308 may be performed by the component 198 in FIG. 1, 2, 4, or 16.

At 1310, the UE may select a transmission format from a set of transmission formats for the first message, where the fourth message may include a third indication of the set of transmission formats. As a non-limiting example, 1310 may be performed by the UE 1002 in FIG. 10, which may select a transmission format from a set of transmission formats for the TAC capability indication message 1010. The TAC granularity indication message 1008 may indicate the set of transmission formats. Moreover, 1310 may be performed by the component 198 in FIG. 1, 2, 4, or 16.

At 1312, the UE may transmit the first message using the selected transmission format. As a non-limiting example, 1312 may be performed by the UE 1002 in FIG. 10, which may transmit the TAC capability indication message 1010 using the selected transmission format. Moreover, 1312 may be performed by the component 198 in FIG. 1, 2, 4, or 16.

At 1314, the UE may calculate a TA based on the TAC configuration and a TAC configuration table associated with the TAC configuration. The fourth message may include a TAC configuration table. As a non-limiting example, 1314 may be performed by the UE 1002 in FIG. 10, which may calculate a TA based on the TAC configuration and a TAC configuration table associated with the TAC configuration. The TAC granularity indication message 1008 may include the TAC configuration table. Moreover, 1314 may be performed by the component 198 in FIG. 1, 2, 4, or 16.

At 1316, the UE may transmit the third message based on the calculated TA. As a non-limiting example, 1316 may be performed by the UE 1002 in FIG. 10, which may transmit the UL transmission 1022 based on the calculated TA. Moreover, 1316 may be performed by the component 198 in FIG. 1, 2, 4, or 16.

At 1318, the UE may transmit the third message to an NTN node. As a non-limiting example, 1318 may be performed by the UE 1002 in FIG. 10, which may transmit the UL transmission 1022 to an NTN node. Moreover, 1318 may be performed by the component 198 in FIG. 1, 2, 4, or 16.

Figure 14:
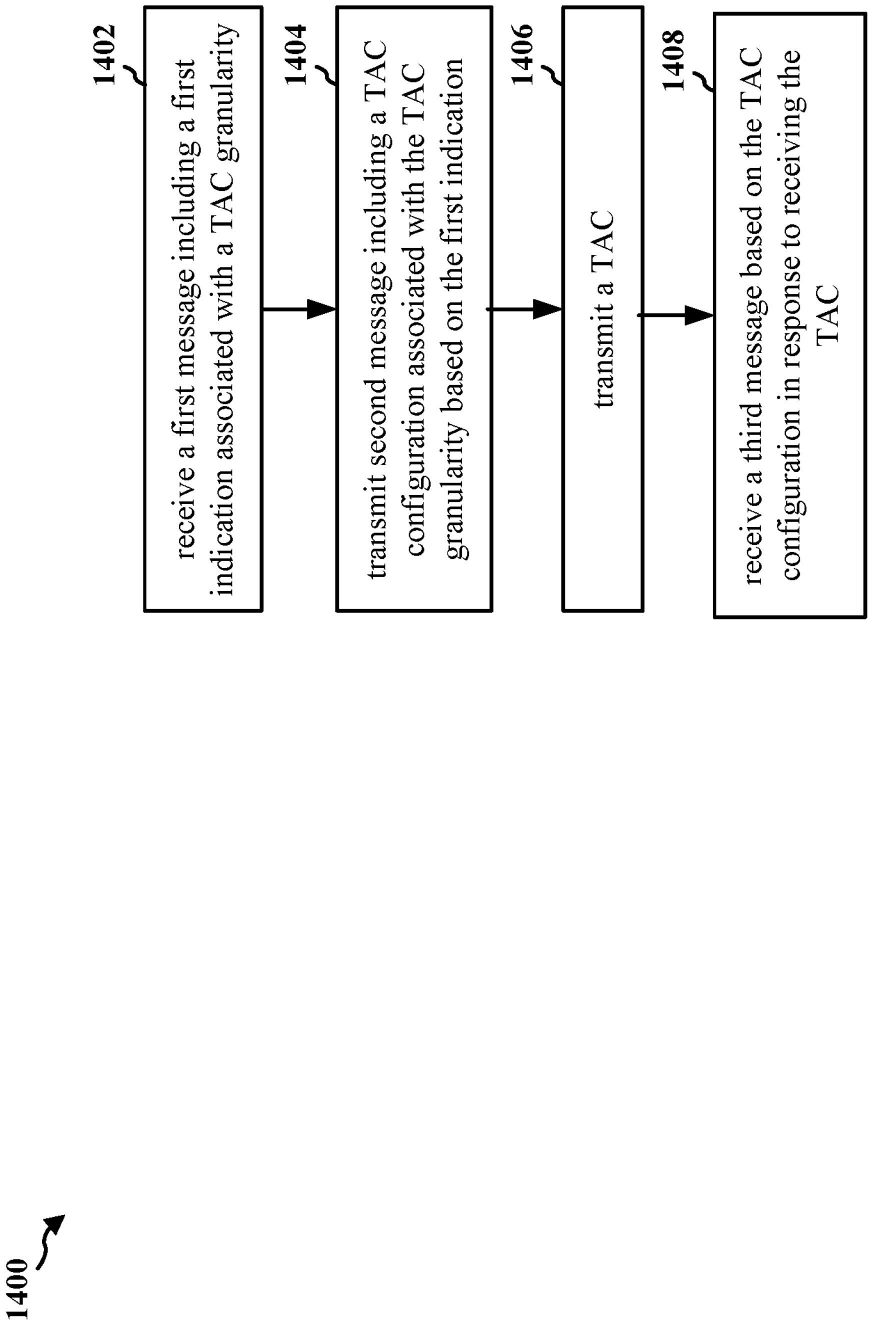
FIG. 14 is a flowchart of a method of wireless communication.

FIG. 14 is a flowchart 1400 of a method of wireless communication. The method may be performed by a network node (e.g., the base station 202, the base station 410, the base station 506, the network node 1006; the NTN device 502, the NTN device 602, the NTN device 604, the NTN device 606; the NTN gateway 504, the NTN gateway 608; the network device 510; the RAN 512; the data network 610; the network node 1006; the network entity 1602, the network entity 1702, the network entity 1860). At 1402, the network node may receive a first message including a first indication associated with a TAC granularity. As a non-limiting example, 1402 may be performed by the network node 1006 in FIG. 10, which may receive the TAC capability indication message 1010 from the UE 1002 via the network node 1006. The TAC capability indication message 1010 may include a first indication associated with a TAC granularity for the UE 1002. Moreover, 1402 may be performed by the component 199 in FIG. 1, 2, 4, 17, or 18.

At 1404, the network node may transmit second message including a TAC configuration associated with the TAC granularity based on the first indication. As a non-limiting example, 1404 may be performed by the network node 1006 in FIG. 10, which may transmit the TAC configuration message 1014 to the UE 1002 via the network node 1006. The TAC configuration message 1014 may include a TAC configuration associated with the TAC granularity based on the first indication received in the TAC capability indication message 1010. Moreover, 1404 may be performed by the component 199 in FIG. 1, 2, 4, 17, or 18.

At 1406, the network node may transmit a TAC. As a non-limiting example, 1406 may be performed by the network node 1006 in FIG. 10, which may transmit the TAC message 1018 to the UE 1002 via the network node 1006. Moreover, 1406 may be performed by the component 199 in FIG. 1, 2, 4, 17, or 18.

At 1408, the network node may receive a third message based on the TAC configuration in response to receiving the TAC. As a non-limiting example, 1408 may be performed by the network node 1006 in FIG. 10, which may receive the UL transmission 1022 from the UE 1002 via the network node 1006 based on the TAC configuration in response to receiving the TAC message 1018. Moreover, 1408 may be performed by the component 199 in FIG. 1, 2, 4, 17, or 18.

Figure 15:
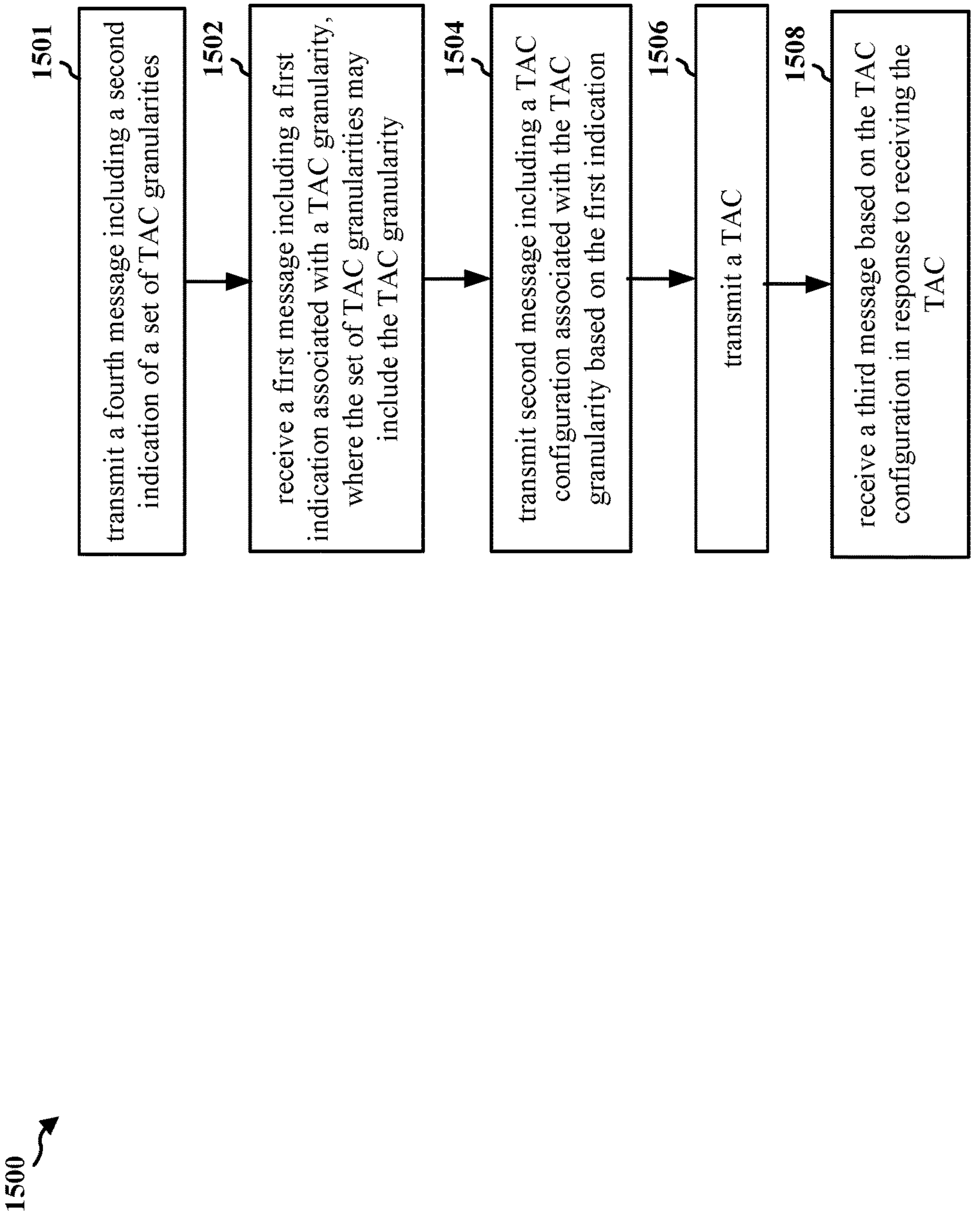
FIG. 15 is a flowchart of a method of wireless communication.

FIG. 15 is a flowchart 1500 of a method of wireless communication. The method may be performed by a network node (e.g., the base station 202, the base station 410, the base station 506, the network node 1006; the NTN device 502, the NTN device 602, the NTN device 604, the NTN device 606; the NTN gateway 504, the NTN gateway 608; the network device 510; the RAN 512; the data network 610; the network node 1006; the network entity 1602, the network entity 1702, the network entity 1860). At 1501, the network node may transmit a fourth message including a second indication of a set of TAC granularities. As a non-limiting example, 1501 may be performed by the network node 1006 in FIG. 10, which may transmit the TAC granularity indication message 1008 including an indication of a set of TAC granularities. Moreover, 1501 may be performed by the component 199 in FIG. 1, 2, 4, 17, or 18.

At 1502, the network node may receive a first message including a first indication associated with a TAC granularity. The set of TAC granularities may include the TAC granularity. As a non-limiting example, 1502 may be performed by the network node 1006 in FIG. 10, which may receive the TAC capability indication message 1010 from the UE 1002 via the network node 1006. The TAC capability indication message 1010 may include a first indication associated with a TAC granularity for the UE 1002. The set of TAC granularities from the TAC granularity indication message 1008 may include the TAC granularity from the TAC capability indication message 1010. Moreover, 1502 may be performed by the component 199 in FIG. 1, 2, 4, 17, or 18.

At 1504, the network node may transmit second message including a TAC configuration associated with the TAC granularity based on the first indication. As a non-limiting example, 1504 may be performed by the network node 1006 in FIG. 10, which may transmit the TAC configuration message 1014 to the UE 1002 via the network node 1006. The TAC configuration message 1014 may include a TAC configuration associated with the TAC granularity based on the first indication received in the TAC capability indication message 1010. Moreover, 1504 may be performed by the component 199 in FIG. 1, 2, 4, 17, or 18.

At 1506, the network node may transmit a TAC. As a non-limiting example, 1506 may be performed by the network node 1006 in FIG. 10, which may transmit the TAC message 1018 to the UE 1002 via the network node 1006. Moreover, 1506 may be performed by the component 199 in FIG. 1, 2, 4, 17, or 18.

At 1508, the network node may receive a third message based on the TAC configuration in response to receiving the TAC. As a non-limiting example, 1508 may be performed by the network node 1006 in FIG. 10, which may receive the UL transmission 1022 from the UE 1002 via the network node 1006 based on the TAC configuration in response to receiving the TAC message 1018. Moreover, 1508 may be performed by the component 199 in FIG. 1, 2, 4, 17, or 18.

Figure 16:
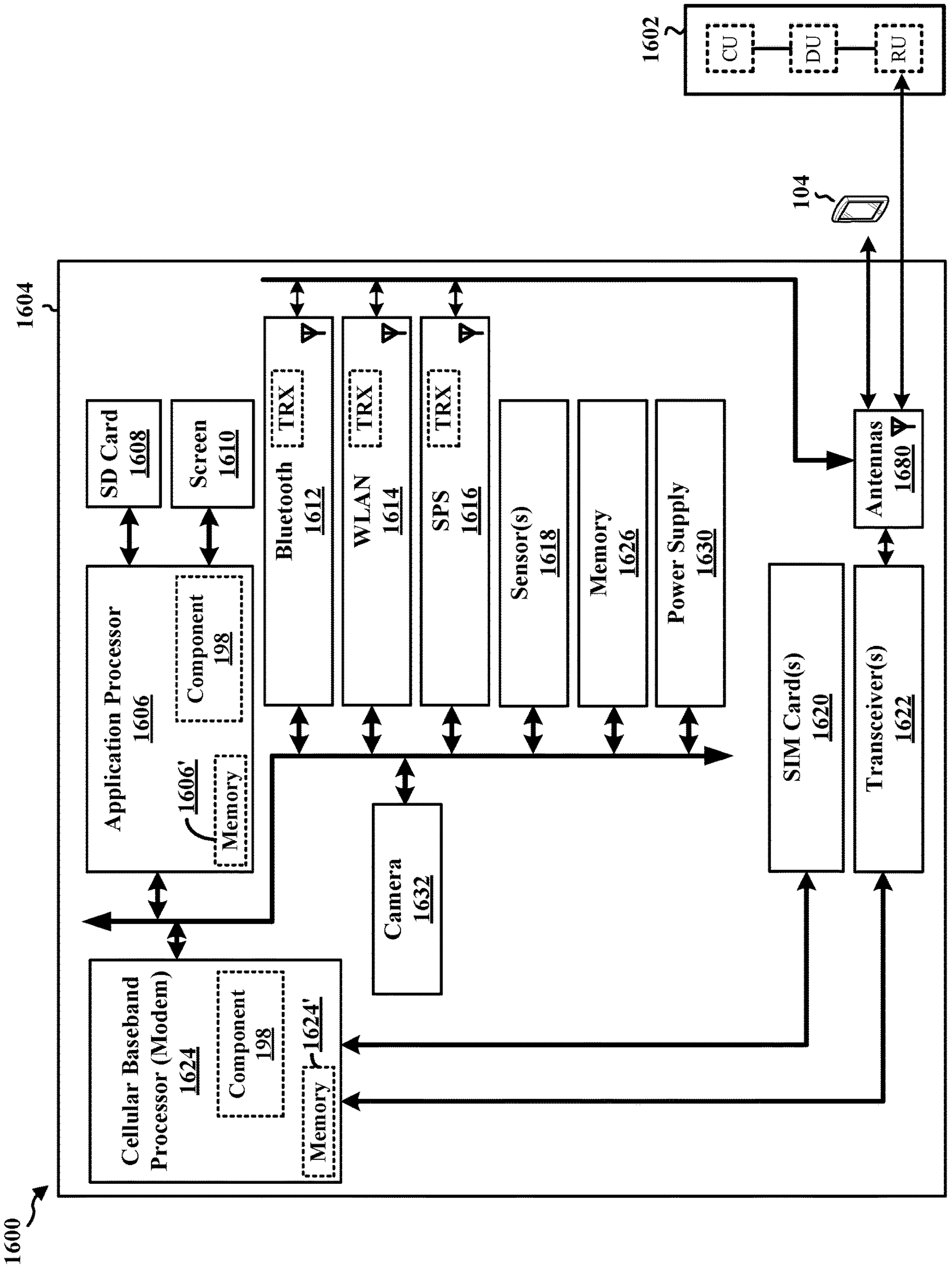
FIG. 16 is a diagram illustrating A non-limiting example of a hardware implementation for A non-limiting example apparatus and/or network entity.

FIG. 16 is a diagram 1600 illustrating A non-limiting example of a hardware implementation for an apparatus 1604. The apparatus 1604 may be a UE, a component of a UE, or may implement UE functionality. In some aspects, the apparatus 1304 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), memory 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 204 and/or with an RU associated with a network entity 1602. The cellular baseband processor 1624 and the application processor 1606 may each include a computer-readable medium/memory 1624', 1606', respectively. The memory 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 450 and may include the memory 460 and/or at least one of the TX processor 468, the RX processor 456, and the controller/processor 459. In one configuration, the apparatus 1604 may be a processor chip (modem and/or application) and include just the cellular baseband processor 1624 and/or the application processor 1606, and in another configuration, the apparatus 1604 may be the entire UE (e.g., see UE 450 of FIG. 4) and include the additional modules of the apparatus 1604.

As discussed supra, the component 198 may be configured to transmit a first message including a first indication associated with a TAC granularity. The component 198 may be configured to receive a second message including a TAC configuration associated with the TAC granularity. The component 198 may be configured to transmit a third message based on the TAC configuration. The component 198 may be within the cellular baseband processor 1624, the application processor 1606, or both the cellular baseband processor 1624 and the application processor 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, may include means for transmitting a first message including a first indication associated with a TAC granularity. The apparatus 1604 may include means for receiving a second message including a TAC configuration associated with the TAC granularity. The apparatus 1604 may include means for transmitting a third message based on the TAC configuration. The apparatus 1604 may include means for receiving a fourth message including a second indication of a set of TAC granularities. The apparatus 1604 may include means for transmitting the first message in response to receiving the fourth message. The apparatus 1604 may include means for receiving the fourth message by receiving a SIB including the fourth message. The apparatus 1604 may include means for selecting the TAC granularity from the set of TAC granularities. The fourth message may include a scaling factor associated with a second TAC granularity. The TAC granularity may be based on the second TAC granularity and the scaling factor. The fourth message may include a third indication of a set of transmission formats for the first message. The set of transmission formats may include a UL MAC-CE format. The UL MAC-CE format may include a first field for the first indication. The set of transmission formats may include a UL RRC format. The UL RRC format may include a second field for the first indication. The set of transmission formats may include a UCI format. The UCI format may include a third field for the first indication. The set of transmission formats may include a PRACH format. The PRACH format may be associated with the first indication. The set of transmission formats may include a fourth indication of a first subset of PRACH sequences. The first subset of PRACH sequences may be associated with the first indication. The set of transmission formats may include a fifth indication of a second subset of RACH occasions. The second subset of RACH occasions may be associated with the first indication. The set of transmission formats may include a sixth indication of a DMRS. The DMRS port number may be associated with the first indication. The set of transmission formats may include a seventh indication of a DMRS generation function. The DMRS generation function may be associated with the first indication. The set of transmission formats may include an eighth indication of a PUSCH scrambling function associated with the first indication. The PUSCH scrambling function may be associated with the first indication. The set of transmission formats may include a first format including a set of reserved LCID codepoints for the first indication. The set of transmission formats may include a second format including a set of reserved fields in a MAC subheader for the first indication. The first message may include at least one of (a) the PRACH format associated with the first indication, (b) the first subset of PRACH sequences associated with the first indication, (c) the second subset of RACH occasions associated with the first indication, (d) the DMRS port number associated with the first indication, (e) a DMRS sequence, or (f) a PUSCH message. The apparatus 1604 may include means for generating the DMRS sequence based on the DMRS generation function associated with the first indication. The apparatus 1604 may include means for scrambling the PUSCH message based on the PUSCH scrambling function associated with the first indication. The fourth message may include a set of transmission formats for the first message. The set of transmission formats may include a UL MAC-CE format. The set of transmission formats may include a UL RRC format. The set of transmission formats may include a UCI format. The set of transmission formats may include a PRACH format. The set of transmission formats may include a third indication of a first subset of PRACH sequences. The set of transmission formats may include a fourth indication of a second subset of RACH occasions. The set of transmission formats may include a Msg3 format. The apparatus 1604 may include means for generating the first indication by selecting a first value for the Msg3 format from a set of Msg3 DMRS port numbers. The fourth message may include the set of Msg3 DMRS port numbers. The apparatus 1604 may include means for generating the first indication by calculating a second value for the Msg3 format using a DMRS generation function. The fourth message may include the DMRS generation function. The apparatus 1604 may include means for generating the first indication by calculating a third value for the Msg3 format using a PUSCH scrambling function. The fourth message may include the PUSCH scrambling function. The apparatus 1604 may include means for generating the first indication by setting a fourth value for a set of reserved LCID codepoints for UL CCCH data of the Msg3 format. The fourth message may include a fifth indication of the set of LCID codepoints. The apparatus 1604 may include means for generating the first indication by setting a fifth value for a set of reserved fields in a MAC subheader used for UL CCCH data of the Msg3 format. The fourth message may include a sixth indication of the set of reserved fields. The apparatus 1604 may include means for selecting the transmission format from the set of transmission formats. The apparatus 1604 may include means for transmitting the first message by transmitting the first message using the selected transmission format. The fourth message may include a TAC configuration table associated with the TAC configuration. The apparatus 1604 may include means for transmitting the third message based on the TAC configuration by calculating a TA based on the TAC configuration and the TAC configuration table. The apparatus 1604 may include means for transmitting the third message based on the TAC configuration by transmitting the third message based on the calculated TA. The fourth message may include a TAC configuration table for interpreting the TAC configuration. The apparatus 1604 may include means for transmitting the third message based on the TAC configuration by calculating a TA based on the TAC configuration table. The apparatus 1604 may include means for transmitting the third message based on the TAC configuration by transmitting the third message based on the calculated TA. The apparatus 1604 may include means for transmitting the third message by transmitting the third message to an NTN node. The apparatus 1604 may include means for receiving the TAC configuration by receiving a DL MAC-CE including the TAC configuration. The apparatus 1604 may include means for receiving the TAC configuration by receiving a DL RRC message including the TAC configuration. The apparatus 1604 may include means for receiving the TAC configuration by receiving DCI including the TAC configuration. The apparatus 1604 may include means for receiving the TAC configuration by receiving a RAR UL grant including the TAC configuration. The DCI may include at least one of a set of repurposed bits or a set of reserved bits including the TAC configuration. The set of reserved bits may include a first set of bits reserved for a DAI for scheduling a first transmission. The set of reserved bits may include a second set of bits reserved for scheduling a second transmission. The DCI may include a DCI format 1_0 with a CRC scrambled by a TC-RNTI. The DCI may include the first set of bits. The set of reserved bits may include the first set of bits. The DCI may include a DCI format 1_0 with a CRC scrambled by an RA-RNTI. The DCI may include the second set of bits. The set of reserved bits may include the second set of bits. The set of reserved bits may include a first set of bits reserved for a DAI for scheduling a Msg4 transmission. The set of reserved bits may include a second set of bits reserved for scheduling a Msg2 transmission. The Msg4 transmission may include a DCI format 1_0 with a CRC scrambled by a TC-RNTI. The Msg2 transmission may include a DCI format 1_0 with a CRC scrambled by an RA-RNTI. The RAR UL grant may include a set of CSI request bits including the TAC configuration. The means may be the component 198 of the apparatus 1604 configured to perform the functions recited by the means. As described supra, the apparatus 1604 may include the TX processor 468, the RX processor 456, and the controller/processor 459. As such, in one configuration, the means may be the TX processor 468, the RX processor 456, and/or the controller/processor 459 configured to perform the functions recited by the means.

Figure 17:
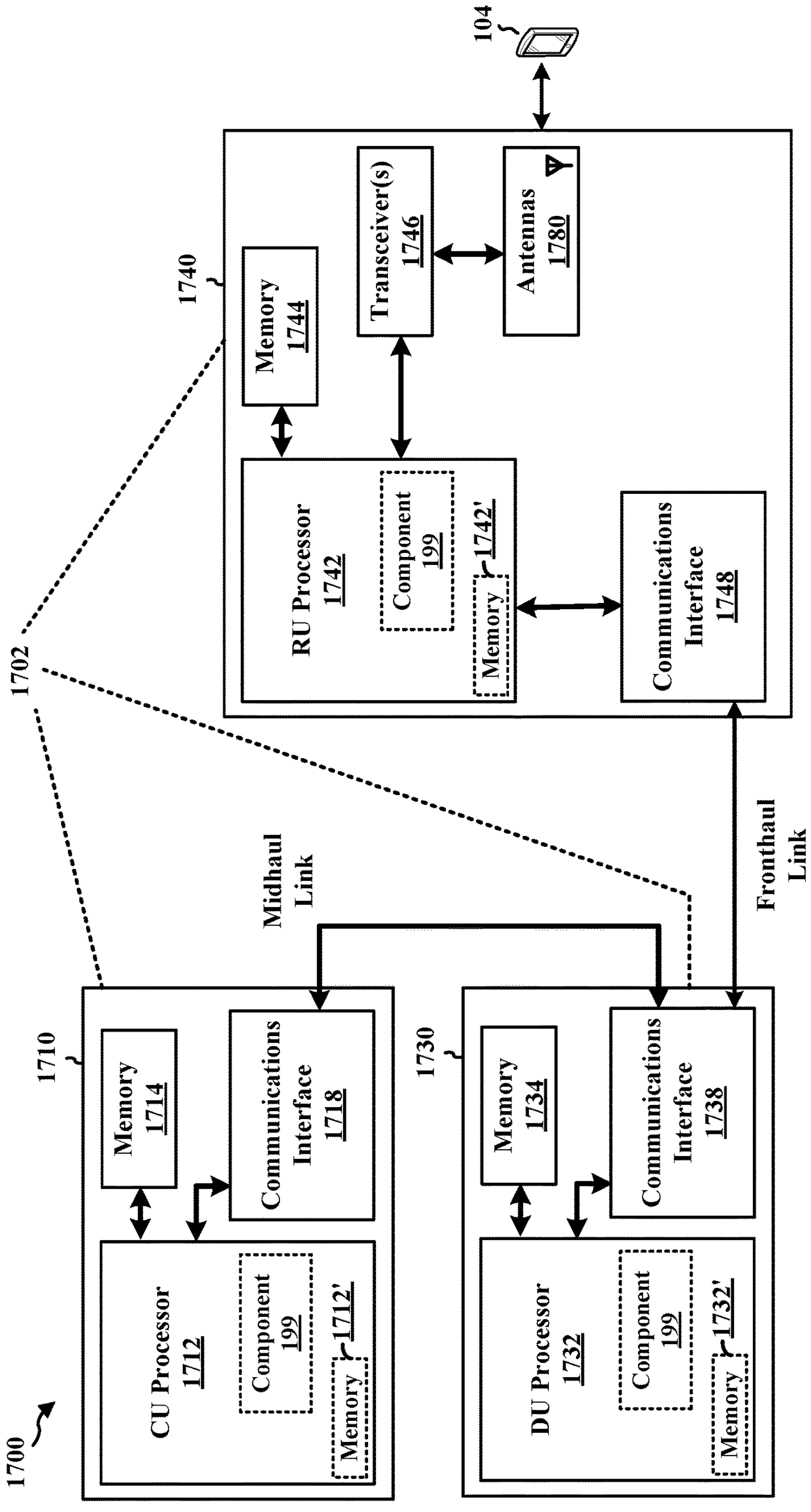
FIG. 17 is a diagram illustrating A non-limiting example of a hardware implementation for A non-limiting example network entity.

FIG. 17 is a diagram 1700 illustrating A non-limiting example of a hardware implementation for a network entity 1702. The network entity 1702 may be a BS, a component of a BS, or may implement BS functionality. The network entity 1702 may include at least one of a CU 1710, a DU 1730, or an RU 1740. As a non-limiting example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 204. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a first message including a first indication associated with a TAC granularity. The component 199 may be configured to transmit second message including a TAC configuration associated with the TAC granularity based on the first indication. The component 199 may be configured to transmit a TAC. The component 199 may be configured to receive a third message based on the TAC configuration in response to receiving the TAC. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for receiving a first message including a first indication associated with a TAC granularity. The network entity 1702 may include means for transmitting second message including a TAC configuration associated with the TAC granularity based on the first indication. The network entity 1702 may include means for transmitting a TAC. The network entity 1702 may include means for receiving a third message based on the TAC configuration in response to receiving the TAC. The network entity 1702 may include means for transmitting a fourth message including a second indication of a set of TAC granularities. The set of TAC granularities may include the TAC granularity. The network entity 1702 may include means for transmitting the fourth message by transmitting a SIB including the fourth message. The fourth message may include a scaling factor associated with a second TAC granularity. The TAC granularity may be based on the second TAC granularity and the scaling factor. The fourth message may include a third indication of a set of transmission formats for the first message. The set of transmission formats may include a UL MAC-CE format. The UL MAC-CE format may include a first field for the first indication. The set of transmission formats may include a UL RRC format. The UL RRC format may include a second field for the first indication. The set of transmission formats may include a UCI format. The UCI format may include a third field for the first indication. The set of transmission formats may include a PRACH format. The PRACH format may be associated with the first indication. The set of transmission formats may include a fourth indication of a first subset of PRACH sequences. The first subset of PRACH sequences may be associated with the first indication. The set of transmission formats may include a fifth indication of a second subset of RACH occasions. The second subset of RACH occasions may be associated with the first indication. The set of transmission formats may include a sixth indication of a DMRS. The DMRS port number may be associated with the first indication. The set of transmission formats may include a seventh indication of a DMRS generation function. The DMRS generation function may be associated with the first indication. The set of transmission formats may include an eighth indication of a PUSCH scrambling function associated with the first indication. The PUSCH scrambling function may be associated with the first indication. The set of transmission formats may include a first format including a set of reserved LCID codepoints for the first indication. The set of transmission formats may include a second format including a set of reserved fields in a MAC subheader for the first indication. The first message may include at least one of (a) the PRACH format associated with the first indication, (b) the first subset of PRACH sequences associated with the first indication, (c) the second subset of RACH occasions associated with the first indication, (d) the DMRS port number associated with the first indication, (e) a DMRS sequence, or (f) a PUSCH message. The network entity 1702 may include means for generating the DMRS sequence based on the DMRS generation function associated with the first indication. The network entity 1702 may include means for scrambling the PUSCH message based on the PUSCH scrambling function associated with the first indication. The set of transmission formats may include a transmission format of the first message. The fourth message may include a TAC configuration table associated with the TAC configuration. The fourth message may include a set of transmission formats for the first message. The set of transmission formats may include an UL MAC-CE format. The set of transmission formats may include an UL RRC format. The set of transmission formats may include a UCI format. The set of transmission formats may include a PRACH format. The set of transmission formats may include a third indication of a subset of PRACH sequences. The set of transmission formats may include a fourth indication of a subset of RACH occasions. The set of transmission formats may include a Msg3 format. The fourth message may include a set of Msg3 DMRS port numbers that each correspond with one of the set of TAC granularities. The fourth message may include a DMRS generation function that generates a DMRS sequence of the Msg3 format based on one of the set of TAC granularities. The fourth message may include a PUSCH scrambling function that scrambles a PUSCH message of the Msg3 format based on one of the set of TAC granularities. The fourth message may include a fifth indication of a set of LCID codepoints for UL CCCH data of the Msg3 format. The set of LCID codepoints may indicate the TAC granularity. The fourth message may include a sixth indication of a set of reserved fields of the Msg3 format. The set of reserved fields may indicate the TAC granularity. The set of transmission formats may include a transmission format of the first message. The fourth message may include a TAC configuration table for interpreting the TAC configuration. The network node may include an NTN node or a base station communicating with a UE via an NTN node. The network entity 1702 may include means for transmitting the TAC configuration by transmitting a DL MAC-CE including the TAC configuration. The network entity 1702 may include means for transmitting the TAC configuration by transmitting a DL RRC message including the TAC configuration. The network entity 1702 may include means for transmitting the TAC configuration by transmitting DCI including the TAC configuration. The network entity 1702 may include means for transmitting the TAC configuration by transmitting a RAR UL grant including the TAC configuration. The DCI may include at least one of a set of repurposed bits or a set of reserved bits including the TAC configuration. The set of reserved bits may include a first set of bits reserved for a DAI for scheduling a first transmission. The set of reserved bits may include a second set of bits reserved for scheduling a second transmission. The DCI may include a DCI format 1_0 with a CRC scrambled by a $T_C$-RNTI. The DCI may include the first set of bits. The set of reserved bits may include the first set of bits. The DCI may include a DCI format 1_0 with a CRC scrambled by an RA-RNTI. The DCI may include the second set of bits. The set of reserved bits may include the second set of bits. The set of reserved bits may include a first set of bits reserved for a DAI for scheduling a Msg4 transmission. The set of reserved bits may include a second set of bits reserved for scheduling a Msg2 transmission. The Msg4 transmission may include a DCI format 1_0 with a CRC scrambled by a $T_C$-RNTI. The Msg2 transmission may include a DCI format 1_0 with a CRC scrambled by an RA-RNTI. The RAR UL grant may include a set of CSI request bits including the TAC configuration. The means may be the component 199 of the network entity 1702 configured to perform the functions recited by the means. As described supra, the network entity 1702 may include the TX processor 416, the RX processor 470, and the controller/processor 475. As such, in one configuration, the means may be the TX processor 416, the RX processor 470, and/or the controller/processor 475 configured to perform the functions recited by the means.

Figure 18:
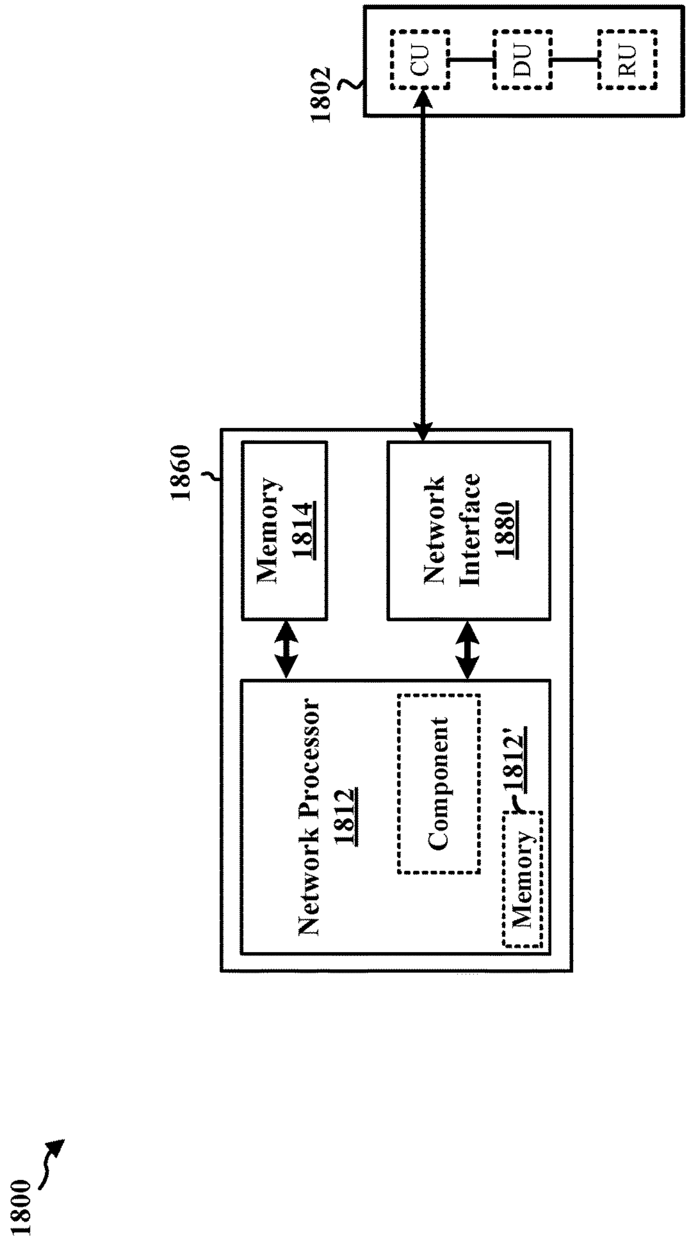
FIG. 18 is a diagram illustrating A non-limiting example of a hardware implementation for A non-limiting example network entity.

FIG. 18 is a diagram 1800 illustrating A non-limiting example of a hardware implementation for a network entity 1860. In one example, the network entity 1860 may be within the core network 220. The network entity 1860 may include a network processor 1812. The network processor 1812 may include on-chip memory 1812'. In some aspects, the network entity 1860 may further include additional memory modules 1814. The network entity 1860 communicates via the network interface 1880 directly (e.g., backhaul link) or indirectly (e.g., through a RIC) with the CU 1802. The on-chip memory 1812' and the additional memory modules 1814 may each be considered a computer-readable medium/memory. Each computer-readable medium/memory may be non-transitory. The processor 1812 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a first message including a first indication associated with a TAC granularity. The component 199 may be configured to transmit second message including a TAC configuration associated with the TAC granularity based on the first indication. The component 199 may be configured to transmit a TAC. The component 199 may be configured to receive a third message based on the TAC configuration in response to receiving the TAC. The component 199 may be within the processor 1812. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1860 may include a variety of components configured for various functions. In one configuration, the network entity 1860 may include means for receiving a first message including a first indication associated with a TAC granularity. The network entity 1860 may include means for transmitting second message including a TAC configuration associated with the TAC granularity based on the first indication. The network entity 1860 may include means for transmitting a TAC. The network entity 1860 may include means for receiving a third message based on the TAC configuration in response to receiving the TAC. The network entity 1860 may include means for transmitting a fourth message including a second indication of a set of TAC granularities. The set of TAC granularities may include the TAC granularity. The network entity 1860 may include means for transmitting the fourth message by transmitting a SIB including the fourth message. The fourth message may include a scaling factor associated with a second TAC granularity. The TAC granularity may be based on the second TAC granularity and the scaling factor. The fourth message may include a set of transmission formats for the first message. The set of transmission formats may include an UL MAC-CE format. The set of transmission formats may include an UL RRC format. The set of transmission formats may include a UCI format. The set of transmission formats may include a PRACH format. The set of transmission formats may include a third indication of a subset of PRACH sequences. The set of transmission formats may include a fourth indication of a subset of RACH occasions. The set of transmission formats may include a Msg3 format. The fourth message may include a set of Msg3 DMRS port numbers that each correspond with one of the set of TAC granularities. The fourth message may include a DMRS generation function that generates a DMRS sequence of the Msg3 format based on one of the set of TAC granularities. The fourth message may include a PUSCH scrambling function that scrambles a PUSCH message of the Msg3 format based on one of the set of TAC granularities. The fourth message may include a fifth indication of a set of LCID codepoints for UL CCCH data of the Msg3 format. The set of LCID codepoints may indicate the TAC granularity. The fourth message may include a sixth indication of a set of reserved fields of the Msg3 format. The set of reserved fields may indicate the TAC granularity. The set of transmission formats may include a transmission format of the first message. The fourth message may include a TAC configuration table for interpreting the TAC configuration. The network node may include an NTN node or a base station communicating with a UE via an NTN node. The network entity 1860 may include means for transmitting the TAC configuration by transmitting a DL MAC-CE including the TAC configuration. The network entity 1860 may include means for transmitting the TAC configuration by transmitting a DL RRC message including the TAC configuration. The network entity 1860 may include means for transmitting the TAC configuration by transmitting DCI including the TAC configuration. The network entity 1860 may include means for transmitting the TAC configuration by transmitting a RAR UL grant including the TAC configuration. The DCI may include at least one of a set of repurposed bits or a set of reserved bits including the TAC configuration. The set of reserved bits may include a first set of bits reserved for a DAI for scheduling a Msg4 transmission. The set of reserved bits may include a second set of bits reserved for scheduling a Msg2 transmission. The Msg4 transmission may include a DCI format 1_0 with a CRC scrambled by a $T_C$-RNTI. The Msg2 transmission may include a DCI format 1_0 with a CRC scrambled by an RA-RNTI. The RAR UL grant may include a set of CSI request bits including the TAC configuration. The means may be the component 199 of the network entity 1860 configured to perform the functions recited by the means. The means may be the component 199 of the network entity 1860 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as a non-limiting example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive the data, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, where the method may include transmitting a first message including a first indication associated with a TAC granularity. The method may include receiving a second message including a TAC configuration associated with the TAC granularity. The method may include transmitting a third message based on the TAC configuration.

Aspect 2 is the method of aspect 1, where the method may include receiving a fourth message including a second indication of a set of TAC granularities. Transmitting the first message may be in response to receiving the fourth message.

Aspect 3 is the method of aspect 2, where receiving the fourth message may include receiving a SIB including the fourth message.

Aspect 4 is the method of either of aspects 2 or 3, where the method may include selecting the TAC granularity from the set of TAC granularities.

Aspect 5 is the method of any of aspects 2 to 4, where the fourth message may include a scaling factor associated with a second TAC granularity.

Aspect 6 is the method of aspect 5, where the TAC granularity may be based on the second TAC granularity and the scaling factor.

Aspect 7 is the method of any of aspects 2 to 6, where the fourth message may include a third indication of a set of transmission formats for the first message.

Aspect 8 is the method of aspect 7, where the set of transmission formats may include a UL MAC-CE format. The UL MAC-CE format may include a first field for the first indication. The set of transmission formats may include a UL RRC format. The UL RRC format may include a second field for the first indication. The set of transmission formats may include a UCI format. The UCI format may include a third field for the first indication. The set of transmission formats may include a PRACH format. The PRACH format may be associated with the first indication. The set of transmission formats may include a fourth indication of a first subset of PRACH sequences. The first subset of PRACH sequences may be associated with the first indication. The set of transmission formats may include a fifth indication of a second subset of RACH occasions. The second subset of RACH occasions may be associated with the first indication. The set of transmission formats may include a sixth indication of a DMRS. The DMRS port number may be associated with the first indication. The set of transmission formats may include a seventh indication of a DMRS generation function. The DMRS generation function may be associated with the first indication. The set of transmission formats may include an eighth indication of a PUSCH scrambling function associated with the first indication. The PUSCH scrambling function may be associated with the first indication. The set of transmission formats may include a first format including a set of reserved LCID codepoints for the first indication. The set of transmission formats may include a second format including a set of reserved fields in a MAC subheader for the first indication.

Aspect 9 is the method of any of aspects 1 to 8, where the first message may include at least one of (a) the PRACH format associated with the first indication, (b) the first subset of PRACH sequences associated with the first indication, (c) the second subset of RACH occasions associated with the first indication, (d) the DMRS port number associated with the first indication, (e) a DMRS sequence, or (f) a PUSCH message. The method may include generating the DMRS sequence based on the DMRS generation function associated with the first indication. The method may include scrambling the PUSCH message based on the PUSCH scrambling function associated with the first indication.

Aspect 10 is the method of any of aspects 7 to 9, where the method may include selecting the transmission format from the set of transmission formats. Transmitting the first message may include transmitting the first message using the selected transmission format.

Aspect 11 is the method of any of aspects 2 to 10, where the fourth message may include a TAC configuration table associated with the TAC configuration. Transmitting the third message based on the TAC configuration may include calculating a TA based on the TAC configuration and the TAC configuration table. Transmitting the third message based on the TAC configuration may include transmitting the third message based on the calculated TA.

Aspect 12 is the method of any of aspects 1 to 11, where transmitting the third message may include transmitting the third message to an NTN node.

Aspect 13 is the method of any of aspects 1 to 12, where receiving the TAC configuration may include receiving a DL MAC-CE including the TAC configuration. Receiving the TAC configuration may include receiving a DL RRC message including the TAC configuration. Receiving the TAC configuration may include receiving DCI including the TAC configuration. Receiving the TAC configuration may include receiving a RAR UL grant including the TAC configuration.

Aspect 14 is the method of aspect 13, where the DCI may include at least one of a set of repurposed bits or a set of reserved bits including the TAC configuration.

Aspect 15 is the method of aspect 14, where the set of reserved bits may include a first set of bits reserved for a DAI for scheduling a first transmission. The set of reserved bits may include a second set of bits reserved for scheduling a second transmission.

Aspect 16 is the method of aspect 15, where the DCI may include a DCI format 1_0 with a CRC scrambled by a TC-RNTI. The DCI may include the first set of bits. The set of reserved bits may include the first set of bits.

Aspect 17 is the method of either of aspects 15 or 16, where the DCI may include a DCI format 1_0 with a CRC scrambled by an RA-RNTI. The DCI may include the second set of bits. The set of reserved bits may include the second set of bits.

Aspect 18 is the method of any of aspects 13 to 17, where the RAR UL grant may include a set of CSI request bits including the TAC configuration.

Aspect 19 is a method of wireless communication at a network node, where the method may include receiving a first message including a first indication associated with a TAC granularity. The method may include transmitting second message including a TAC configuration associated with the TAC granularity based on the first indication. The method may include transmitting a TAC. The method may include receiving a third message based on the TAC configuration in response to receiving the TAC.

Aspect 20 is the method of aspect 19, where the method may include transmitting a fourth message including a second indication of a set of TAC granularities. The set of TAC granularities may include the TAC granularity.

Aspect 21 is a method of aspect 20, where transmitting the fourth message may include transmitting a SIB including the fourth message.

Aspect 22 is the method of either of aspects 20 or 21, where the fourth message may include a scaling factor associated with a second TAC granularity.

Aspect 23 is the method of aspect 22, where the TAC granularity may be based on the second TAC granularity and the scaling factor.

Aspect 24 is the method of any of aspects 20 to 23, where the fourth message may include a third indication of a set of transmission formats for the first message.

Aspect 25 is the method of aspect 24, where the set of transmission formats may include a UL MAC-CE format. The UL MAC-CE format may include a first field for the first indication. The set of transmission formats may include a UL RRC format. The UL RRC format may include a second field for the first indication. The set of transmission formats may include a UCI format. The UCI format may include a third field for the first indication. The set of transmission formats may include a PRACH format. The PRACH format may be associated with the first indication. The set of transmission formats may include a fourth indication of a first subset of PRACH sequences. The first subset of PRACH sequences may be associated with the first indication. The set of transmission formats may include a fifth indication of a second subset of RACH occasions. The second subset of RACH occasions may be associated with the first indication. The set of transmission formats may include a sixth indication of a DMRS. The DMRS port number may be associated with the first indication. The set of transmission formats may include a seventh indication of a DMRS generation function. The DMRS generation function may be associated with the first indication. The set of transmission formats may include an eighth indication of a PUSCH scrambling function associated with the first indication. The PUSCH scrambling function may be associated with the first indication. The set of transmission formats may include a first format including a set of reserved LCID codepoints for the first indication. The set of transmission formats may include a second format including a set of reserved fields in a MAC subheader for the first indication.

Aspect 26 is the method of aspect 25, where the first message may include at least one of (a) the PRACH format associated with the first indication, (b) the first subset of PRACH sequences associated with the first indication, (c) the second subset of RACH occasions associated with the first indication, (d) the DMRS port number associated with the first indication, (e) a DMRS sequence generated based on the DMRS generation function associated with the first indication, or (f) a PUSCH message generated based on the PUSCH scrambling function associated with the first indication.

Aspect 27 is the method of any of aspects 24 to 26, where the set of transmission formats may include a transmission format of the first message.

Aspect 28 is the method of any of aspects 20 to 27, where the fourth message may include a TAC configuration table associated with the TAC configuration.

Aspect 29 is the method of any of aspects 19 to 28, where the network node may include an NTN node or a base station communicating with a UE via an NTN node.

Aspect 30 is the method of any of aspects 19 to 29, where the second message comprises at least one of (a) a DL MAC-CE including the TAC configuration, (b) a DL RRC message including the TAC configuration, (c) DCI including the TAC configuration, or (d) a RAR UL grant including the TAC configuration.

Aspect 31 is the method of aspect 30, where the DCI may include at least one of a set of repurposed bits or a set of reserved bits including the TAC configuration.

Aspect 32 is the method of aspect 31, where the set of reserved bits may include a first set of bits reserved for a DAI for scheduling a first transmission. The set of reserved bits may include a second set of bits reserved for scheduling a second transmission.

Aspect 33 is the method of aspect 32, where the DCI may include a DCI format 1_0 with a CRC scrambled by a TC-RNTI. The DCI may include the first set of bits. The set of reserved bits may include the first set of bits.

Aspect 34 is the method of either of aspects 32 or 33, where the DCI may include a DCI format 1_0 with a CRC scrambled by an RA-RNTI. The DCI may include the second set of bits. The set of reserved bits may include the second set of bits.

Aspect 35 is the method of any of aspects 30 to 34, where the RAR UL grant may include a set of CSI request bits including the TAC configuration.

Aspect 36 is an apparatus for wireless communication, including: a memory; and at least one processor coupled to the memory, the at least one processor configured to implement any of aspects 1 to 35.

Aspect 37 is the apparatus of aspect 36, further including at least one of an antenna or a transceiver coupled to the at least one processor.

Aspect 38 is an apparatus for wireless communication including means for implementing any of aspects 1 to 35.

Aspect 39 is a computer-readable medium (e.g., a non-transitory computer-readable medium) storing computer executable code, where the code when executed by a processor causes the processor to implement any of aspects 1 to 35.

What is claimed is:

1. An apparatus for wireless communication at a user equipment (UE), comprising:
- one or more memories; and
- one or more processors coupled to the one or more memories, configured to:
  - receive a fourth message comprising a second indication of a set of timing advance command (TAC) granularities and a third indication of a set of transmission formats for a first message;
  - transmit, in response to receipt of the fourth message, the first message comprising a first indication associated with a TAC granularity;
  - receive a second message comprising a TAC configuration associated with the TAC granularity; and
  - transmit, a third message based on the TAC configuration.

2. The apparatus of claim 1, wherein the fourth message comprises a system information block (SIB) comprising the second indication.

3. The apparatus of claim 1, wherein the one or more processors are further configured to:
- select the TAC granularity from the set of TAC granularities.

4. The apparatus of claim 1, wherein the fourth message comprises a scaling factor associated with a second TAC granularity.

5. The apparatus of claim 4, wherein the TAC granularity is based on the second TAC granularity and the scaling factor.

6. The apparatus of claim 1, wherein the set of transmission formats comprises at least one of:
- an uplink (UL) medium access control (MAC) control element (MAC-CE) format comprising a first field for the first indication;
- a UL radio resource control (RRC) format comprising a second field for the first indication;
- a UL control information (UCI) format comprising a third field for the first indication;
- a physical random access channel (PRACH) format associated with the first indication;
- a fourth indication of a first subset of physical random access channel (PRACH) sequences associated with the first indication;
- a fifth indication of a second subset of random access channel (RACH) occasions associated with the first indication;
- a sixth indication of a demodulation reference signal (DMRS) port number associated with the first indication;
- a seventh indication of a DMRS generation function associated with the first indication;
- an eighth indication of a physical uplink shared channel (PUSCH) scrambling function associated with the first indication;
- a first format comprising a set of reserved logical channel identifier (LCID) codepoints for the first indication; or
- a second format comprising a set of reserved fields in a MAC subheader for the first indication.

7. The apparatus of claim 6, wherein the first message comprises at least one of:
- the PRACH format associated with the first indication;
- the first subset of PRACH sequences associated with the first indication;
- the second subset of RACH occasions associated with the first indication;
- the DMRS port number associated with the first indication;
- a DMRS sequence, wherein the one or more processors are configured to generate the DMRS sequence based on the DMRS generation function associated with the first indication; or
- a PUSCH message, wherein the one or more processors are configured to scramble the PUSCH message based on the PUSCH scrambling function associated with the first indication.

8. The apparatus of claim 1, wherein the one or more processors are further configured to:
- select a transmission format from the set of transmission formats, wherein, to transmit the first message, the one or more processors are configured to transmit the first message using the selected transmission format.

9. The apparatus of claim 1, wherein the fourth message comprises a TAC configuration table associated with the TAC configuration, wherein, to transmit the third message based on the TAC configuration, the one or more processors are configured to:
- calculate a timing advance (TA) based on the TAC configuration and the TAC configuration table; and
- transmit the third message based on the calculated TA.

10. The apparatus of claim 1, further comprising a transceiver coupled to the one or more processors, wherein, to transmit the third message, the one or more processors are configured to:
- transmit, via the transceiver, the third message to a non-terrestrial network (NTN) node.

11. The apparatus of claim 1, wherein the second message comprises at least one of:
- a downlink (DL) medium access control (MAC) control element (MAC-CE) comprising the TAC configuration;
- a DL radio resource control (RRC) message comprising the TAC configuration;
- downlink control information (DCI) comprising the TAC configuration; or
- a random access response (RAR) uplink (UL) grant comprising the TAC configuration.

12. An apparatus for wireless communication at a user equipment (UE), comprising:
- one or more memories; and
- one or more processors coupled to the one or more memories, configured to:
  - transmit a first message comprising a first indication associated with a TAC granularity;

receive a second message comprising a TAC configuration associated with the TAC granularity, the second message comprising at least a downlink control information (DCI) that comprises at least one of a set of repurposed bits or a set of reserved bits comprising the TAC configuration; and
transmit a third message based on the TAC configuration.

13. The apparatus of claim 12, wherein the set of reserved bits comprises at least one of:
a first set of bits reserved for a downlink assignment index (DAI) for scheduling a first transmission; or
a second set of bits reserved for scheduling a second transmission.

14. The apparatus of claim 13, wherein the DCI comprises a DCI format 1_0 with a cyclic redundancy check (CRC) scrambled by a temporary cell (TC) radio network temporary identifier (TC-RNTI) comprising the first set of bits.

15. The apparatus of claim 13, wherein the DCI comprises a DCI format 1_0 with a cyclic redundancy check (CRC) scrambled by a random access (RA) radio network temporary identifier (RA-RNTI) comprising the second set of bits.

16. The apparatus of claim 11, wherein the RAR UL grant comprises a set of channel state information (CSI) request bits comprising the TAC configuration.

17. An apparatus for wireless communication at a network node, comprising:
one or more memories; and
one or more processors coupled to the one or more memories, configured to:
transmit a fourth message comprising a second indication of a set of timing advance command (TAC) granularities and a third indication of a set of transmission formats for a first message;
receive the first message comprising a first indication associated with a TAC granularity of the set of TAC granularities;
transmit a second message comprising a TAC configuration associated with the TAC granularity based on the first indication;
transmit a TAC; and
receive a third message based on the TAC configuration in response to the TAC.

18. The apparatus of claim 17, wherein the fourth message comprises a system information block (SIB) comprising the second indication.

19. The apparatus of claim 17, wherein the fourth message comprises a scaling factor associated with a second TAC granularity.

20. The apparatus of claim 19, wherein the TAC granularity is based on the second TAC granularity and the scaling factor.

21. The apparatus of claim 17, wherein the set of transmission formats comprises at least one of:
an uplink (UL) medium access control (MAC) control element (MAC-CE) format comprising the first indication;
a UL radio resource control (RRC) format comprising the first indication;
a UL control information (UCI) format comprising the first indication;
a physical random access channel (PRACH) format associated with the first indication;
a fourth indication of a first subset of physical random access channel (PRACH) sequences associated with the first indication;
a fifth indication of a second subset of random access channel (RACH) occasions associated with the first indication;
a sixth indication of a demodulation reference signal (DMRS) port number associated with the first indication;
a seventh indication of a DMRS generation function associated with the first indication;
an eighth indication of a physical uplink shared channel (PUSCH) scrambling function associated with the first indication;
a first format comprising a set of reserved logical channel identifier (LCID) codepoints for UL common control channel (CCCH) data comprising the first indication; or
a second format comprising a set of reserved fields in a MAC subheader used for UL CCCH data comprising the first indication.

22. The apparatus of claim 21, wherein the first message comprises at least one of:
the PRACH format associated with the first indication;
the first subset of PRACH sequences associated with the first indication;
the second subset of RACH occasions associated with the first indication;
the DMRS port number associated with the first indication;
a DMRS sequence generated based on the DMRS generation function associated with the first indication; or
a PUSCH message generated based on the PUSCH scrambling function associated with the first indication.

23. The apparatus of claim 17, wherein the set of transmission formats comprises a transmission format of the first message.

24. The apparatus of claim 17, wherein the fourth message further comprises a TAC configuration table associated with the TAC configuration.

25. A method of wireless communication at a user equipment (UE), comprising:
receiving a fourth message comprising a second indication of a set of timing advance command (TAC) granularities and a third indication of a set of transmission formats for a first message;
transmitting, in response to receiving the fourth message, the first message comprising a first indication associated with a TAC granularity;
receiving a second message comprising a TAC configuration associated with the TAC granularity; and
transmitting a third message based on the TAC configuration.

26. The method of claim 25, wherein the fourth message comprises a system information block (SIB) comprising the second indication.

27. The method of claim 25, wherein the fourth message comprises a scaling factor associated with a second TAC granularity, and wherein the TAC granularity is based on the second TAC granularity and the scaling factor.

28. A method of wireless communication at a network node, comprising:
transmitting a fourth message comprising a second indication of a set of timing advance command (TAC) granularities and a third indication of a set of transmission formats for a first message;
receiving the first message comprising a first indication associated with a TAC granularity, wherein the set of TAC granularities comprises the TAC granularity;

transmitting a second message comprising a TAC configuration associated with the TAC granularity based on the first indication;

transmitting a TAC; and receiving a third message based on the TAC configuration in response to receiving the TAC.

29. The method of claim 28, wherein the fourth message comprises a system information block (SIB) comprising the second indication.

30. The method of claim 28, wherein the fourth message comprises a scaling factor associated with a second TAC granularity, and wherein the TAC granularity is based on the second TAC granularity and the scaling factor.

* * * * *